United States Patent
Brown et al.

(10) Patent No.: US 11,775,891 B2
(45) Date of Patent: Oct. 3, 2023

(54) OMNICHANNEL, INTELLIGENT, PROACTIVE VIRTUAL AGENT

(71) Applicant: Telepathy Labs, Inc., Tampa, FL (US)

(72) Inventors: Stephen Brown, Singapore (SG); Martin Reber, Remetschwil (CH); Vijeta Avijeet, Dübendorf (CH); Josselyn Boudett, Clearwater, FL (US)

(73) Assignee: Telepathy Labs, Inc., Tampa, FL (US)

( * ) Notice: Subject to any disclaimer, the term of this patent is extended or adjusted under 35 U.S.C. 154(b) by 0 days.

(21) Appl. No.: 16/050,181

(22) Filed: Jul. 31, 2018

(65) Prior Publication Data

US 2019/0042988 A1     Feb. 7, 2019

Related U.S. Application Data

(60) Provisional application No. 62/687,870, filed on Jun. 21, 2018, provisional application No. 62/540,911, filed on Aug. 3, 2017.

(51) Int. Cl.
| | |
|---|---|
| *G06Q 10/0631* | (2023.01) |
| *G06N 5/022* | (2023.01) |
| *G06F 9/54* | (2006.01) |
| *G06N 20/00* | (2019.01) |
| *G06F 16/9535* | (2019.01) |

(52) U.S. Cl.
CPC ......... *G06Q 10/0631* (2013.01); *G06F 9/547* (2013.01); *G06F 16/9535* (2019.01); *G06N 5/022* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,076,088 A * | 6/2000 | Paik | G06F 16/367 |
| 6,839,670 B1 | 1/2005 | Stammler et al. | |
| 7,958,066 B2 | 6/2011 | Pinckney et al. | |
| 8,694,537 B2 | 4/2014 | Mohajer | |
| 8,903,727 B2 | 12/2014 | Comerford et al. | |
| 9,189,742 B2 * | 11/2015 | London | G06N 5/04 |
| 9,275,341 B2 | 3/2016 | Cruse et al. | |
| 9,318,108 B2 * | 4/2016 | Gruber | G06F 16/9537 |

(Continued)

FOREIGN PATENT DOCUMENTS

| | | | |
|---|---|---|---|
| EP | 3642835 A1 | 4/2020 | |
| WO | WO-03001413 A1 * | 1/2003 | G06F 16/24575 |

(Continued)

OTHER PUBLICATIONS

Canbek, Nil Goksel, and Mehmet Emin Mutlu. "On the track of artificial intelligence: Learning with intelligent personal assistants." Journal of Human Sciences 13.1 (2016): 592-601. (Year: 2016).*

(Continued)

*Primary Examiner* — Thomas L Mansfield
(74) *Attorney, Agent, or Firm* — GTC Law Group PC & Affiliates

(57) ABSTRACT

An omni-channel, intelligent, proactive virtual agent system and method of use are provided by which a user may engage in a conversation with the agent to interact with structured and unstructured data of an enterprise that is stored in a domain-specific world model for the enterprise.

24 Claims, 43 Drawing Sheets

(56) References Cited

U.S. PATENT DOCUMENTS

| | | | |
|---|---|---|---|
| 9,324,025 B2 | 4/2016 | Byron et al. | |
| 10,192,550 B2* | 1/2019 | Froelich | G10L 15/22 |
| 2003/0126136 A1 | 7/2003 | Omoigui | |
| 2004/0117189 A1* | 6/2004 | Bennett | G09B 7/00 |
| | | | 704/270.1 |
| 2009/0030800 A1* | 1/2009 | Grois | G06Q 30/02 |
| | | | 705/14.52 |
| 2010/0318348 A1* | 12/2010 | Chelba | G06F 40/40 |
| | | | 704/9 |
| 2013/0095864 A1* | 4/2013 | Marovets | H04L 51/08 |
| | | | 455/466 |
| 2014/0278435 A1* | 9/2014 | Ganong, III | G10L 15/22 |
| | | | 704/275 |
| 2014/0350924 A1* | 11/2014 | Zurek | G10L 15/22 |
| | | | 704/231 |
| 2015/0006437 A1* | 1/2015 | Byron | G06F 40/55 |
| | | | 706/11 |
| 2015/0127677 A1 | 5/2015 | Wang et al. | |
| 2015/0348548 A1* | 12/2015 | Piernot | G10L 15/22 |
| | | | 704/235 |
| 2016/0117593 A1 | 4/2016 | London | |
| 2016/0119582 A1* | 4/2016 | Smurro | H04L 65/403 |
| | | | 348/14.08 |
| 2017/0006135 A1 | 1/2017 | Siebel et al. | |
| 2017/0091312 A1* | 3/2017 | Ajmera | G06F 16/3329 |
| 2018/0075335 A1* | 3/2018 | Braz | G06F 16/24522 |
| 2018/0158125 A1* | 6/2018 | Perelman | G06Q 30/0625 |

FOREIGN PATENT DOCUMENTS

| | | |
|---|---|---|
| WO | 2013042116 A1 | 3/2013 |
| WO | 2015077398 A1 | 5/2015 |
| WO | 2019027992 A1 | 2/2019 |

OTHER PUBLICATIONS

PCT/US18/44560, "International Application Serial No. PCT/US18/44560, International Search Report and Written Opinion dated Nov. 14, 2018", Telepathy Labs, Inc., 31 Pages.

PCT/US18/44560, "International Application Serial No. PCT/US18/44560, International Preliminary Report on Patentability dated Feb. 13, 2020", Telepathy Labs, Inc., 26 pages.

PCT/US18/44560, Jul. 31, 2018, Pending, Brown, Stephen, et al.

* cited by examiner

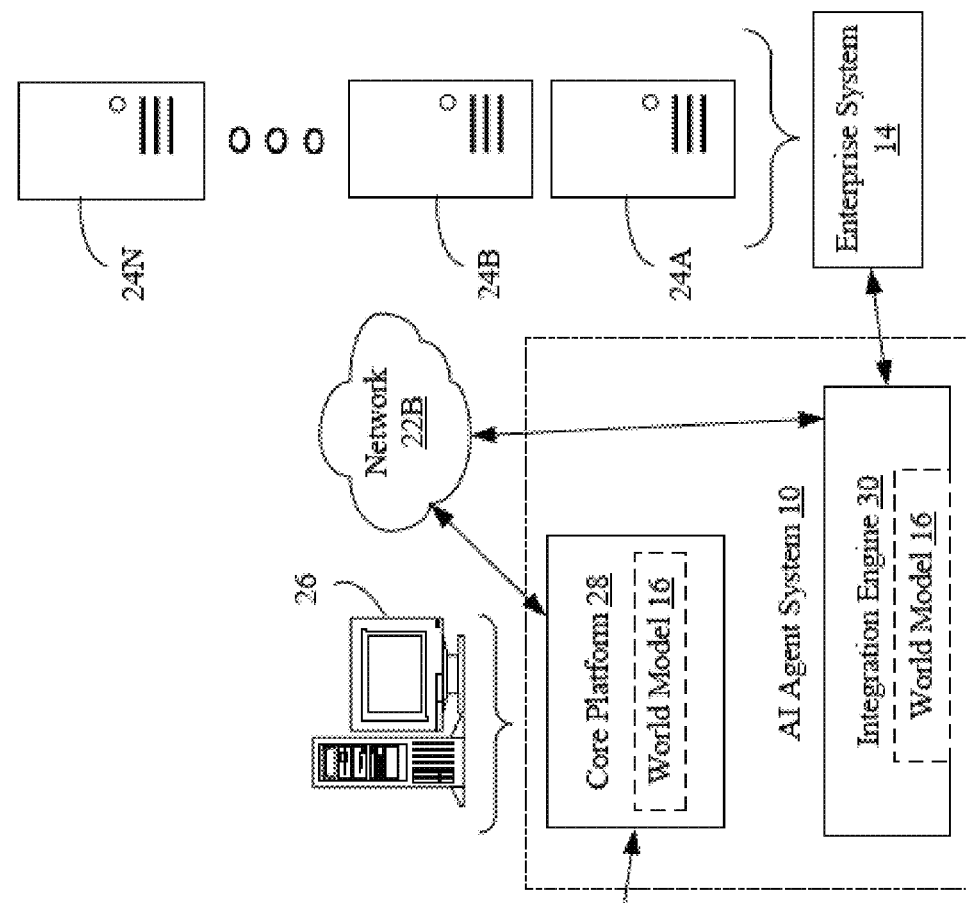
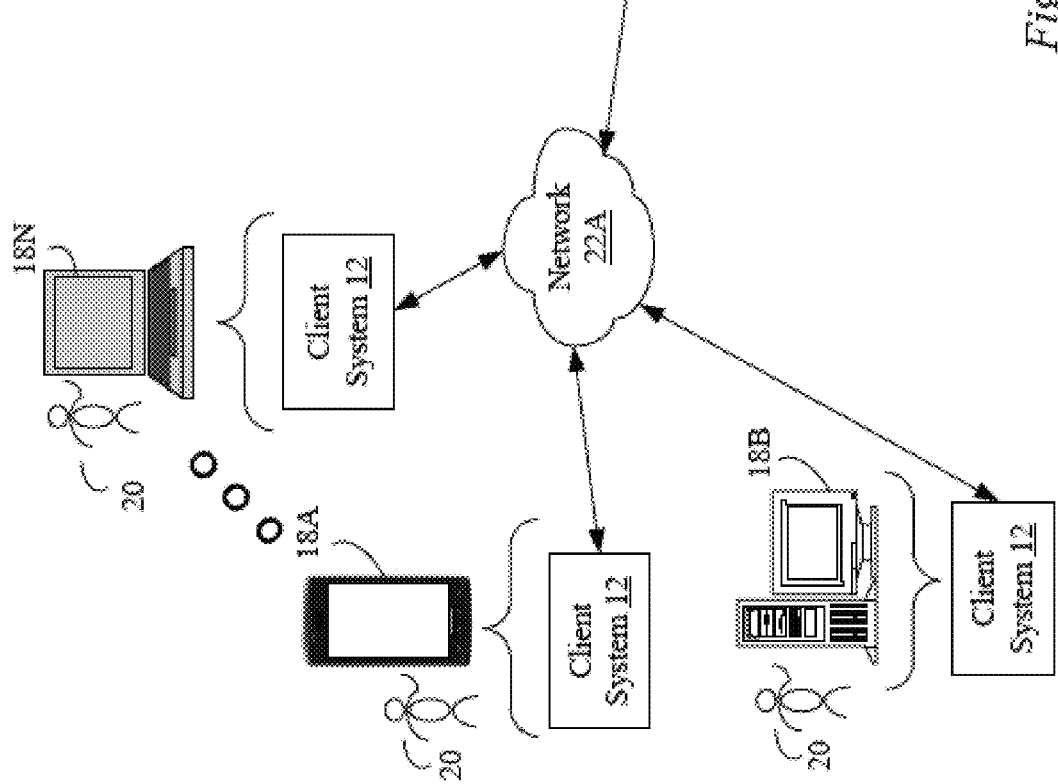
Fig. 2D

OMNICHANNEL, INTELLIGENT, PROACTIVE VIRTUAL AGENT

CLAIM TO PRIORITY

This application claims the benefit of the following provisional applications, each of which is hereby incorporated by reference in its entirety: U.S. Provisional Application Ser. No. 62/540,911, OMNICHANNEL, INTELLIGENT, PROACTIVE VIRTUAL AGENT AND METHOD OF USE, filed Aug. 3, 2017; and U.S. Provisional Application Ser. No. 62/687,870, OMNICHANNEL, INTELLIGENT, PROACTIVE VIRTUAL AGENT, filed Jun. 21, 2018.

BACKGROUND

Typically, a conversational agent is a computer system that communicates with a user. Conversational agents have employed various types of communication e.g., text, speech, graphics, haptics, gestures, and other modes in order to communicate with users. A need exists for improved conversational agents.

SUMMARY

In embodiments, an omnichannel, intelligent, proactive virtual agent system may include an enterprise system including enterprise knowledge stored on at least one server; an artificial intelligence agent system having a world model that comprises a knowledge graph representing a portion of the enterprise knowledge of the enterprise system such that elements in the knowledge graph are linked based on logical and semantic relationships; wherein the artificial intelligence agent system is configured to: communicate with an Internet of Things (IoT) client system using one or more communication channels; and use the knowledge graph of the world model to at least one of respond to a query and initiate an action based on communication with the client system. In the system, the world model is embodied as a knowledge graph representing an enterprise domain. In the system, the knowledge graph facilitates mapping an intent of the query with enterprise-specific information. In the system, the knowledge graph facilitates mapping information accessible in the enterprise system with at least one fact accessible in the world model that is relevant to an intent of the query. In the system, the world model facilitates semantic understanding of uses of words and terms of an enterprise. In the system, the world model is a semantic model that facilitates the artificial intelligence agent system responding to the query based on semantic relationships of the enterprise specific information representing the portion of the enterprise knowledge. In the system, the client system uses a speech-related interface for communication by a user with the artificial intelligence agent system. In the system, the speech-related interface is configured to recognize speech and/or synthesize speech.

In embodiments, an omnichannel, intelligent, proactive virtual agent system may include an artificial intelligence agent system that uses a world model to facilitate responding to a query, ingesting unstructured data, and enabling enterprise domain-directed dialogue using a natural language speech processing system; an enterprise system in communication with the artificial intelligence agent system and for providing enterprise specific information for the enterprise domain-directed dialogue associated with the query being processed by the artificial intelligence agent system; and a client system that facilitates human interaction with the artificial intelligence agent system by enabling dialogue with the natural language speech processing system. In the system, the world model is embodied as a knowledge graph representing an enterprise domain. In the system, the knowledge graph facilitates mapping an intent of the query with enterprise-specific information. In the system, the knowledge graph facilitates mapping information accessible in the enterprise system with at least one fact accessible in the world model that is relevant to an intent of the query. In the system, the world model organizes a semantic understanding of terminology used by an enterprise. In the system, the world model is a semantic model that facilitates the artificial intelligence agent system responding to a query based on semantic relationships of the enterprise specific information. In the system, the enterprise system comprises a set of systems including two or more systems selected from the list of systems consisting of an information technology system, a software system, an operating system, a database system, and an enterprise-class computing server. In the system, the enterprise system comprises a plurality of functional elements selected from a list of system elements consisting of a file server, application server, web server, proxy server, appliance, network appliance, gateway, gateway server, database server, platform-as-a-service server, infrastructure-as-a-service server, cloud computing server, web services server, virtualization server, deployment server, SSL VPN server, and firewall. In the system, the enterprise system comprises a plurality of enterprise servers communicating via a network. In the system, at least one of the plurality of enterprise servers is configured as at least one of an enterprise network node and an enterprise remote machine. In the system, the network comprises an area network selected from the list of area networks consisting of a body area network, a personal area network, a local area network, an Intranet, and a metropolitan area network. In the system, the artificial intelligence agent system is deployed on at least one of the enterprise system, the client system, and a cloud-based system. In the system, the artificial intelligence agent system is deployed as modules executing on two or more of the enterprise system, the client system, and a cloud-based system. In the system, the artificial intelligence agent system is deployed on the client system and interacts with the enterprise system via a network. In the system, the artificial intelligence agent system is deployed on the client system and interacts with the world model via a network. In the system, the artificial intelligence agent system is deployed with the enterprise system on one or more enterprise servers for direct interaction between the artificial intelligence agent system and resources of the enterprise system and interacts with the client system via a network. In the system, the artificial intelligence agent system is deployed on a cloud-based computing server and interacts with the enterprise system and the client system over a network. In the system, the client system comprises an item of equipment that performs a non-communication function selected from the list of functions consisting of sensing, security, and home automation. In the system, the client system comprises an Internet-of-Things operational device. In the system, the artificial intelligence agent system operates the world model by expanding the world model based on at least one of a query and the ingested unstructured data. In the system, the system further comprises a set of application programming interfaces (APIs) that facilitate interfacing the artificial intelligence agent system with the client device. In the system, the set of APIs includes a query API that facilitates coordination of the world model and enterprise system resources to at least one of prepare and obtain information for responding to the query. In the system, the query API uses at least one system service when preparing and/or obtaining information for responding to the query, the at least one system service is selected from the list of system services consisting of a natural language understanding service, a natural language query service, an enterprise data access service, a contextual disambiguating service, and a dialogue manager service. In the system, the set of APIs includes a cloud-based call initiating API that facilitates real-time, event-based notification of users of an enterprise system that is coupled to the artificial intelligence agent system. In the system, the cloud-based, call initiating API communicates changes in at least one of data in the world model and data in the enterprise data domain to at least one user based on an association of a role of the at least one user with the changes in the data. In the system, the set of APIs includes a workflow API that facilitates coordination and integration of automated external systems. In the system, the workflow API uses at least one system service when coordinating automated external systems, the at least one system service selected from the list of system services consisting of access database/web services, contextual disambiguation services using a dialogue manager service, and services for executing scripted customer-specific actions. In the system, the set of APIs includes a get things done API that facilitates tracking and measuring achievement of goals associated with one or more enterprise data domains. In the system, the get things done API performs a plurality of functions selected from the list of functions consisting of capturing, anticipating, adjusting, and managing group and individual goals; documenting the goals, timeline, steps, and stakeholders; updating and monitoring KPIs, action items and status; proactively checking in, updating, motivating, training, and reminding stakeholders; tracking progress and statistics regarding the goals; and executing commands and workflow procedures that facilitate accomplishing the goal. In the system, the artificial intelligence agent system comprises a platform portion that operates the world model and an integration engine portion that facilitates interaction between the platform portion and enterprise specific information sources of the enterprise system to respond to queries about enterprise specific information from the enterprise specific information sources. In the system, the integration engine is deployed with the enterprise system. In the system, the integration engine further facilitates interaction between the world model and the enterprise specific information sources. In the system, the integration engine converts enterprise specific information from the enterprise specific information sources to knowledge and stores the knowledge in the world model. In the system, the integration engine links portions of the world model to sources of enterprise specific information. In the system, the platform portion accesses portions of the world model, thereby activating the integration engine to provide access to a corresponding source of enterprise specific information. In the system, the integration engine is responsive to the platform portion accessing portions of the world model by retrieving enterprise specific information from an enterprise specific information source that corresponds to the accessed portion of the world model. In the system, the client system facilitates human interaction with the artificial intelligence agent system via at least one interface selected from the list of interfaces consisting of a phone interface, an application executing on a mobile device, an interface application of an enterprise system, a text message interface, a chat interface, an email interface, a video interface, and a social media interface. In the system, the artificial intelligence agent system exchanges data with the client system using a plurality of media forms, including at least two of audio, text, video, image, speech, sensor, haptic interface, structured data, and unstructured data.

In embodiments, an omnichannel, intelligent, proactive virtual agent method may include operating an artificial intelligence agent system that interacts with a client system via a natural language processing facility; and based on at least one of an intent and an entity of the interaction automatically querying a knowledge graph organized as a world model of enterprise domain information, the artificial intelligence agent system further producing a response to the query that the natural language processing facility converts into natural language speech for the artificial intelligence agent system, thereby completing the interaction with the client system.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2D is a diagrammatic view of a hybrid deployment example of the AI agent system with respect to the client systems and the enterprise system;

DETAILED DESCRIPTION OF THE PREFERRED EMBODIMENTS

Figure 1:
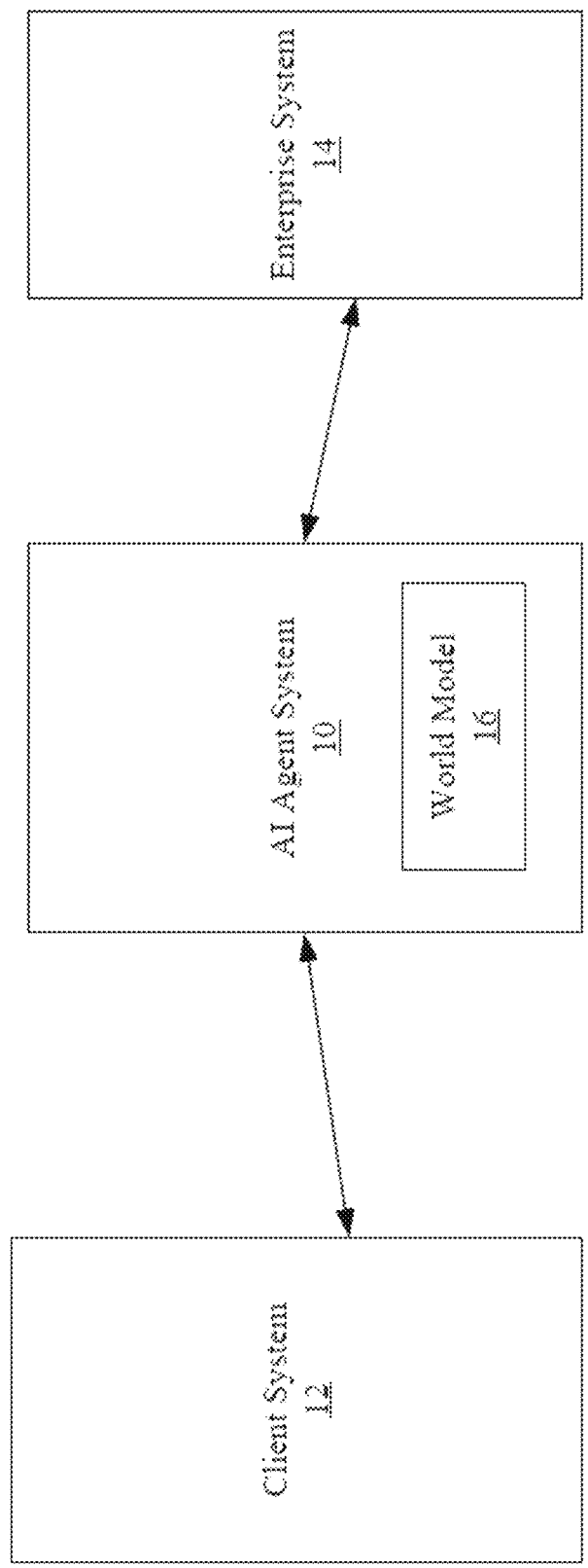
FIG. 1 is an example diagrammatic view of an artificial intelligence (AI) agent system positioned to interact and provide an interface with a client system and an enterprise system.

The AI agent system and related technologies now will be described more fully hereinafter with reference to the accompanying drawings, in which illustrative embodiments are shown. The AI agent system and technologies may, however, be embodied in many different forms and should not be construed as limited to the embodiments set forth herein; rather, these embodiments are provided so that this disclosure will be thorough and complete, and will fully convey the scope of the disclosure and inventions to those skilled in the art.

The present invention may provide the following capabilities and benefits, among others: help computers understand users, speed up extraction of enterprise data (e.g., from text, structured data sources, unstructured data sources, and the like), increase the amount of the enterprise data that can be unlocked, make data from different media forms (e.g., text and voice) actionable, make computer-generated, direct answers to questions happen, etc. In embodiments, the present disclosure provides for methods and systems that limit the need to exclusively access enterprise services to obtain answers to questions from employees of companies, customers and other users that need information from or about an enterprise.

The present invention offers an artificial intelligence (AI) agent system. The AI agent system may provide adaptive features (e.g., adjusts behavior over time to improve how AI agent system reacts/responds to users), stateful features (e.g., past conversations with users are remembered and are part of context of AI agent system when interacting with user), scalable features (e.g., flexible deployment options for the AI agent system allow for on-client deployment, cloud based deployment, on-enterprise deployment, and hybrid deployment), and/or security features (e.g., product security may be architected into basic structure of AI agent system to allow full enterprise control and visibility over usage, rights control, and authentication methods).

The AI agent system may generally function as an interface between a user (via a client device) and a wide range of enterprise data and information (e.g., via an enterprise information technology system, database, or the like, such as via one or more interfaces, including human and application programming interfaces, publication and/or subscription services, database interfaces, and the like) (e.g., functions as a natural language interface either in speech or text forms for the purpose of command or query interactions with the enterprise system). Other interesting features of the AI agent system may include the ability to ingest unstructured data, use of a world model (e.g., semantic representation), and connecting the world model to speech technology (e.g., integrating speech technology with semantic representation).

The above and other features of the AI agent system referred to in some cases herein as the "platform," including various novel details of construction and combinations of components, processes, methods, sub-systems, parts, features and capabilities thereof, and other advantages, will now be more particularly described with reference to the accompanying drawings and pointed out in the claims. It will be understood that the particular method and system embodying the invention are shown by way of illustration and not as a limitation of the invention. The principles and features of this invention may be employed in various and numerous embodiments without departing from the scope of the invention.

FIG. 1 is an example diagrammatic view of an artificial intelligence (AI) agent system 10 providing an interface between a client system 12 and an enterprise system 14. The AI Agent system may be an enterprise-grade virtual agent that provides businesses with a conversational interface to their business data, business processes, and business applications.

As shown in FIGS. 2A-2D, the client system 12 may be defined as a software system, operating system, or other type of system running on a client device 18A-18N. The client device, for example, may be a smart/data enabled cellular phone (e.g., client device 18A), a personal computer (e.g., client device 18B), a laptop computer (e.g., client device 18N), a notebook computer, a tablet, a server, a television, a smart television, a media (e.g., video, photo, etc.) capturing device, a landline phone device, a dedicated network device, or a telephone. The client device may include a microphone and/or a speaker. In embodiments, the client system 12 may comprise a product, an item of hardware, an item of equipment or the like that performs a non-communications function (e.g., sensors, appliances, security system devices, home automation devices), but is enabled with a communications and/or network interface, such as an "Internet of Things (IoT)" device.

The enterprise system 14 may comprise a set of systems, such as including one or more of an information technology system, software system, operating system, database system, or other type of system (e.g., operating system running on one or more enterprise servers 24A-24N) operating across an enterprise (such as a business organization, corporation, company, institution, government body, partnership, venture, or the like). Each enterprise server 24 may be a file server, application server, web server, proxy server, appliance, network appliance, gateway, gateway server, database server, platform-as-a-service server, infrastructure-as-a-service server, cloud computing server, web services server, virtualization server, deployment server, SSL VPN server, or firewall. In one embodiment, each enterprise server 24 may be referred to as a remote machine or a node. In another embodiment, a plurality of nodes may be in the path between any two communicating enterprise servers 24A, 24B. In an example, the enterprise system 14 may be deployed as a cloud-based delivery system and, for example, may use/require Platform as a Service (PaaS) technologies and/or Infrastructure as a Service (IaaS) technologies.

The AI agent system 10 generally functions as an interface to all, or a subset of, enterprise data, information and system functionality (e.g., via the enterprise system 14). The AI agent system 10 interacts with the enterprise system 14 for accessing a variety of enterprise data and information as well as affecting change within the enterprise. The AI agent system 10 may use this enterprise data (and optionally externally available data) and information to generate a world model 16 or expand a pre-built world model 16. The world model 16 may comprise a semantic model that ties various types of data to each other based on, for example, logic and rules, semantic relationships and the like. The world model 16 may be monolithic or segmented/partitioned and may comprise language specific/language independent elements. The world model 16 may provide a description and/or map of pieces of information relevant to an enterprise and may be monolithic, or may be segmented, and may comprise language-specific and/or language-independent elements. The world model 16 may map generic or abstract concepts to real world concepts, describe relationships within business concepts and systems, and provide understanding of how words or terms, etc. are used, such as by a person, groups of persons, and the like. The understanding may further be classifiable to characteristics that identify a person or groups of persons and the like, such as a person's native language, a person's education, a person's current role in an enterprise, demographics of the person, and the like. In this way, understanding of how words or terms are used may be enriched even with restricted access to knowledge of a person, such as might occur when protecting personally identifying information of a person, and the like. The world model 16 may incorporate how a business or company uses terms/words and in what contexts the terms/words may be used. The world model 16 may comprise a business- and application-specific knowledge graph that the AI agent system 10 can use for general knowledge query, customer-specific master data/facts, identification/contextualization of mapped external data sources for access, as well as elements to support reasoning, disambiguation, etc.

The AI agent system 10 may generally function as an omni-channel, intelligent, proactive virtual agent with respect to the client system 12. The AI agent system 10 may receive queries, commands, or other requests from the client system 12 via a variety of communication channels. The AI agent system 10 may use the world model 16 to respond to the queries, commands, or other requests from the client system 12. For example, with queries, the AI agent system 10 can refer to or look to the world model 16 in order to obtain answers to the queries. The AI agent system 10 can also initiate communication to the client system 12 regarding workflow (e.g., initiate meeting reminders or contact client system 12 regarding status of a project) via a variety of communication channels.

The AI agent system 10 may be used with enterprise systems 14 of a variety of industries e.g., aerospace, manufacturing, agriculture, shipping, oil and gas, mining, construction, etc. Embodiments of the world model 16, such as a semantic world model 16 embodiment, may reflect the unique terminology used in a particular industry, within a particular enterprise in the industry, within a particular enterprise independent of its industry, and the like. In embodiments, the world model may reflect how terms relate to each other in a hierarchy or other semantic organization, such as represented by a graph. As appreciated by one of ordinary skill in the art, the AI agent system 10 may be used with other industries, independent of use of the enterprise system 14 in the other industries.

The AI agent system 10 may, without limitation, provide the following functionalities: obtain answers to questions from client system 12 about a business (such as metrics about the business, knowledge of how and where the business conducts business, information about product and services of a business, information about the market or industry of the business, information about how a business is organized, and the like), engage in conversation with users via client system 12, provide assistance with workflows, listen to requests from client system 12, take actions based on requests, initiate communication with employees of an enterprise, with customers of the enterprise (including to implement complex speech dialogs) and with others that have some relationship to the enterprise (such as contractors, prospective customers, partners, investors, board members, managers, vendors, suppliers, service providers, and many others), and the like. References to "users" of the AI agent system should be understood to encompass these and other types of users. The AI agent system 10 may initiate suggested actions to client system 12 (e.g., AI agent system can send a hint of suggested actions to client system 12).

The AI agent system 10 may be optimized over time as new amounts of data are incorporated into the world model 16. In embodiments, the system may evolve and become smarter in terms of industry and customer knowledge, user behaviors, preferences, use of words and terms, and additional languages. This may, for example, result in faster response times, greater relevance of responses, fewer exchanges to satisfy an inquiry, and the like.

FIGS. 2A-2D show various examples of how the AI agent system 10 may be deployed.

Figure 2A:
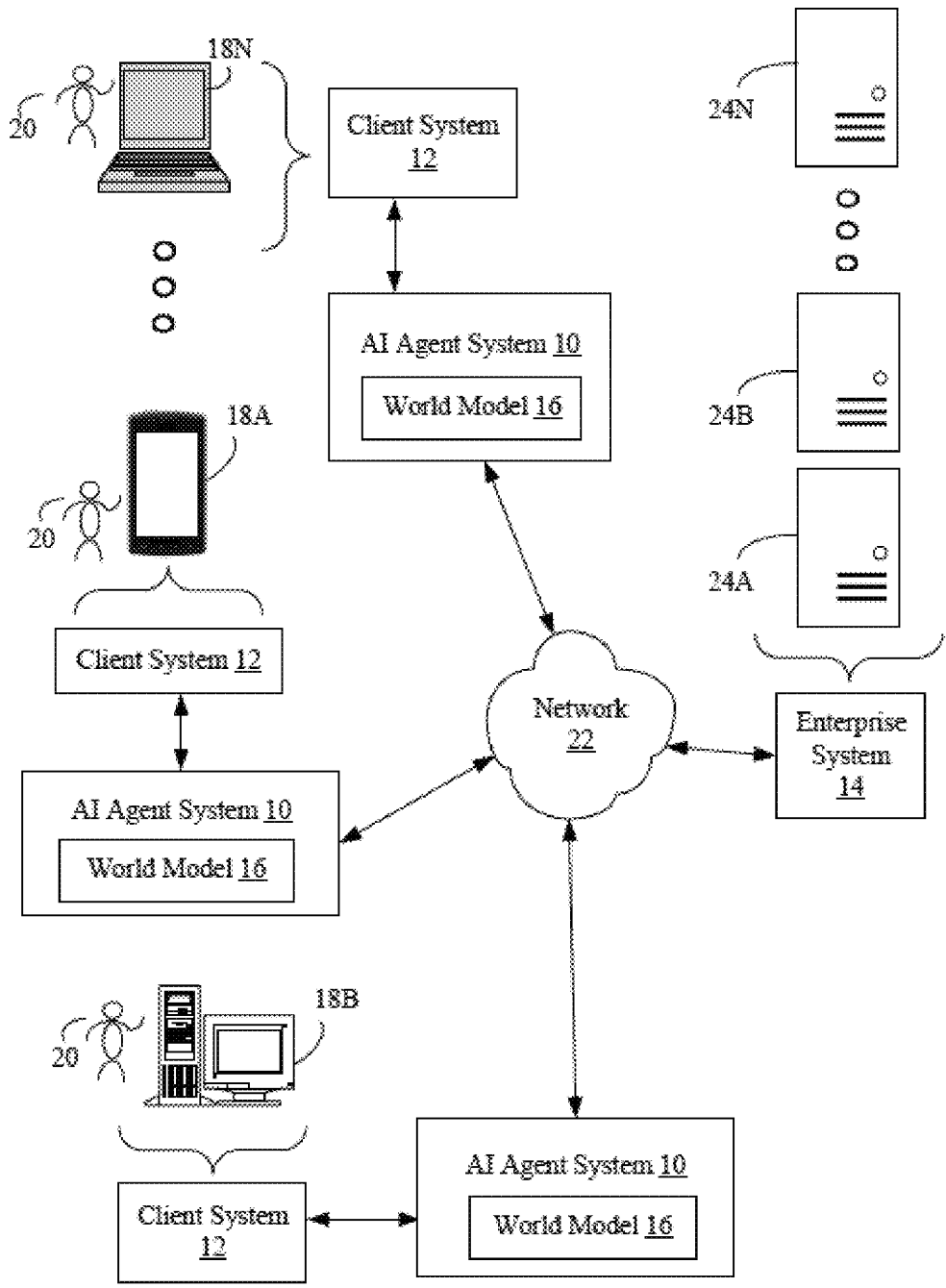
FIGS. 2A-2C are diagrammatic views of different examples of how the AI agent system may be deployed with respect to client systems and the enterprise system.
Figure 2B:
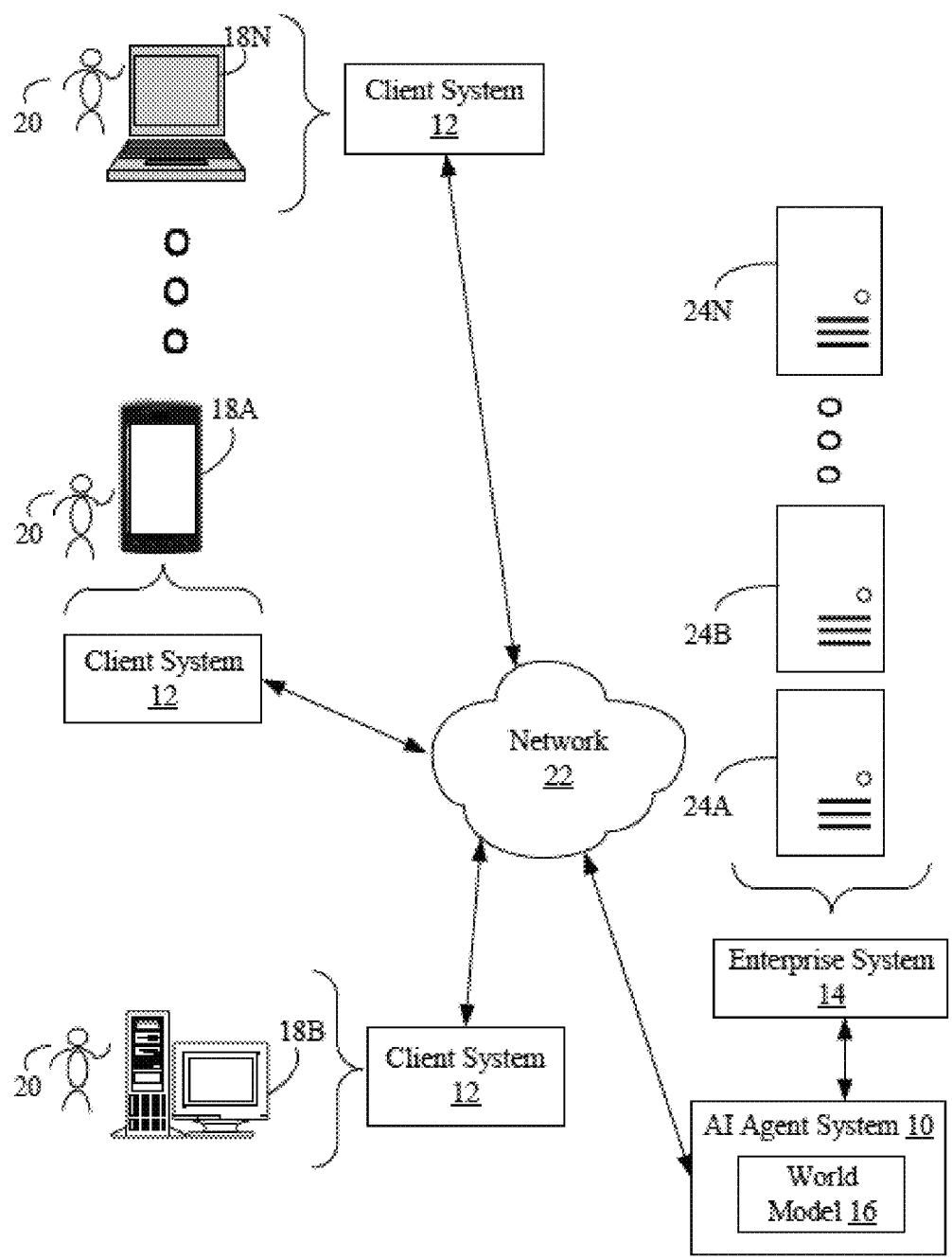

Referring to FIGS. 2A-2B, embodiments of a network environment are depicted. In brief overview, the network environment includes one or more client devices 18A-18N (also generally referred to, without limitation, as local machine(s) 18, client(s) 18, client node(s) 18, client machine(s) 18, client computer(s) 18, endpoint(s) 18, or endpoint node(s) 18) in communication with one or more enterprise servers 24A-24N (also generally referred to, without limitation, as enterprise server(s) 24, enterprise node(s) 24, or enterprise remote machine(s) 24) via one or more networks 22. Collectively, or at least in selected combinations, these elements may generally be referred to, without limitation, as an enterprise system 14 or enterprise systems 14, and the like. In embodiments, an enterprise server 24 may embody functionality of an enterprise system 14.

Although FIGS. 2A-2B show a single network 22 between the client devices 18 and the enterprise servers 24, the client devices 18 and the enterprise servers 24 may be on the same network 22. In some embodiments, there may be multiple networks 22 between the client devices 18 and the enterprise servers 24 that are interconnected. The network 22 may be a private network, a public network, or a hybrid network. The network 22 may be a local area network or wide area network.

The network 22 may be connected via wired or wireless links. Wired links may include Digital Subscriber Line (DSL), coaxial cable lines, Ethernet, fiber-optic or other links used for network infrastructure as would be understood by one of ordinary skill in the art. The wireless links may include cellular, BLUETOOTH, Wi-Fi, Worldwide Interoperability for Microwave Access (WiMAX), an infrared channel or satellite bands or other wireless networking technologies as would be understood by one of ordinary skill in the art. The wireless links may also include any cellular network standards used to communicate among mobile devices, including standards that qualify as 1G, 2G, 3G, 4G, 5G, LTE or the like. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, HSPA, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 22 may be any type and/or form of network. The geographical scope of the network 22 may vary widely and the network 22 can be a body area network (BAN), a personal area network (PAN), a local-area network (LAN), e.g. Intranet, a metropolitan area network (MAN), or a wide area network (WAN), e.g., the Internet. The topology of the network 22 may be of any form and may include, e.g., any of the following: point-to-point, serial, bus, star, ring, mesh, or tree. The network 22 may be an overlay network which is virtual and sits on top of one or more layers of other networks. The network 22 may be of any such network topology as known to those ordinarily skilled in the art capable of supporting the operations described herein. The network 22 may utilize different techniques and layers or stacks of protocols, including, e.g., the Ethernet protocol, the Internet protocol suite (e.g., TCP/IP, UDP/IP, etc.), the ATM (Asynchronous Transfer Mode) technique, the SONET (Synchronous Optical Networking) protocol, or the SDH (Synchronous Digital Hierarchy) protocol. The TCP/IP Internet protocol suite may include application layer, transport layer, Internet layer (including, e.g., IPv6), or the link layer. The network 22 may be a type of a broadcast network, a telecommunications network, a data communication network, or a computer network.

In some implementations, one or more of users 20 may access the client system 12 and the AI agent system 10 (e.g., using one or more of client electronic devices 18A-18N). The AI agent system 10 may include one or more user interfaces, such as browsers and textual or graphical user interfaces, through which users 20 may access AI agent system 10.

In FIG. 2A, the AI agent system 10 is deployed with each client system 12 of client devices 18A, 18B, 18N (i.e., client-side application). In this example, the AI agent system 10 may interact directly with the client system 12 (i.e., may reside on and may be executed by each client device 18A-18N) and interacts with the enterprise system 14 via the network 22. The AI agent system 10 may be an application running on each client device 18A, 18B, 18N.

In FIG. 2B, the AI agent system 10 is deployed with the enterprise system 14 on one or more enterprise servers 24 (i.e., server-side application). In this example, the AI agent system may interact directly with the enterprise system 14 (i.e., may reside on and may be executed by one or more enterprise servers 24) and interacts with each client system 12 via the network 22.

Figure 2C:
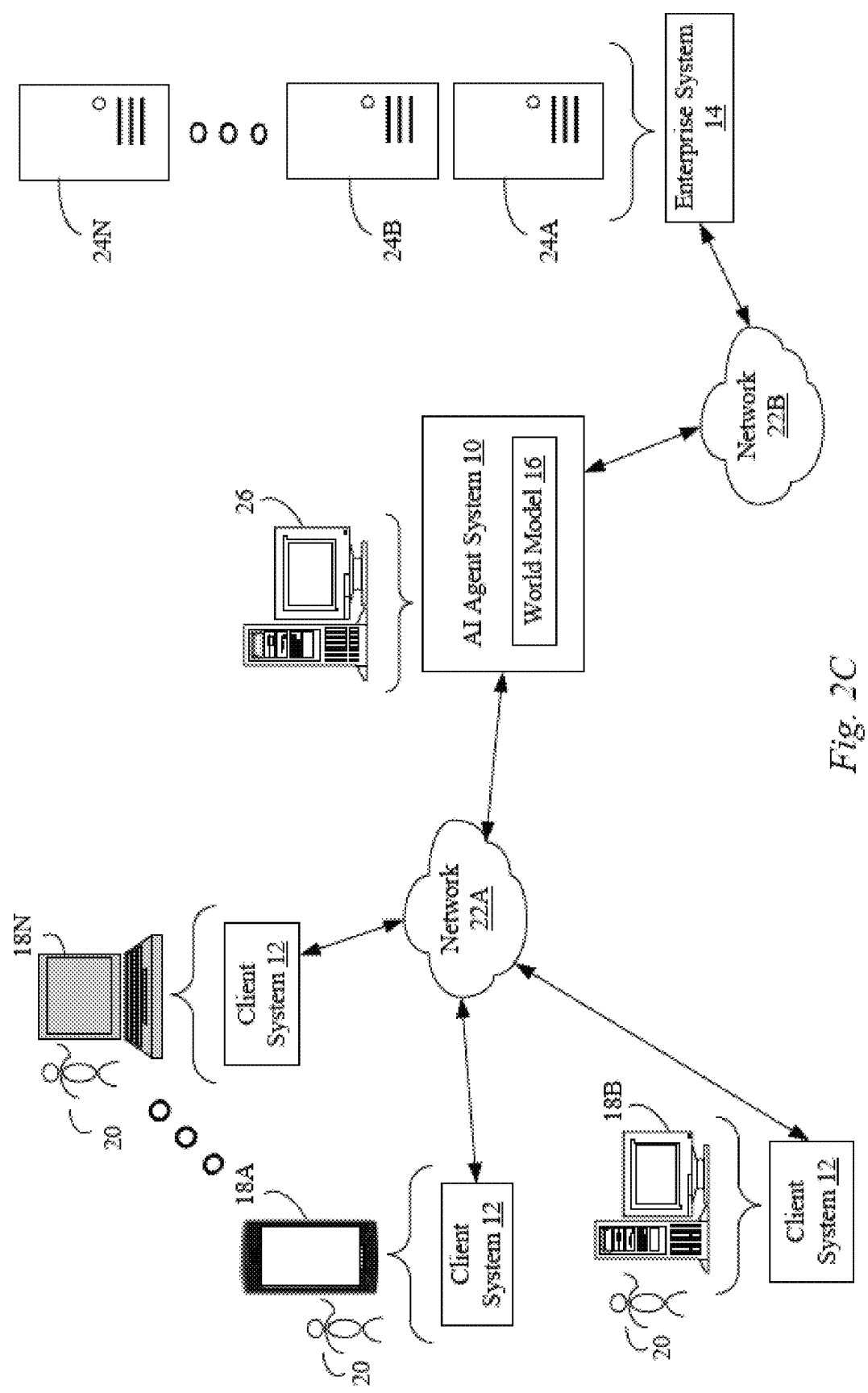

In FIG. 2C, the AI agent system 10 is deployed on a system computer device 26 such that the AI agent system 10 is configured as a cloud system. Examples of the system computer device 26 may include, but are not limited to, a personal computer(s), a laptop computer(s), a mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

One or more of users 20 may access the system computer device 26 and AI agent system 10 (e.g., using one or more of client devices 18A-18N) directly through network 22A. The AI agent system 10 may include one or more user interfaces, such as browsers and textual or graphical user interfaces, through which users 20 may access the AI agent system 10.

Further, the AI agent system 10 may use the system computer device 26 to access and interact with the enterprise system via network 22A or through secondary network 22B (enterprise servers 24A-24N may be connected to network 22B and/or network 22A). In examples, network 22A may be a private network, public network, or hybrid network and the secondary network 22B may be a private network, public network, or hybrid network.

The system computer device 26 may function as a cloud system that includes cloud-based delivery, e.g. Software as a Service (SaaS) and/or may use/require Platform as a Service (PaaS) Technologies, and Infrastructure as a Service (IaaS) Technologies in its incarnation. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

In FIG. 2D, the AI agent system 10 is deployed partially on the system computer device 26 and partially with the enterprise system 14 on the one or more enterprise servers 24A-24N (i.e., hybrid deployment—partial cloud-based and partial server-side application). In this example, the AI agent system 10 may include a core platform 28 that is deployed on the system computer device 26 and an integration engine 30 that is deployed with the enterprise system 14 on the enterprise servers 24A-24N.

In an example, the world model 16 may be embedded on the core platform 28. In another example, the world model 16 may be embedded on the integration engine 30. In another example, the world model 16 may be split such that the world model 16 is embedded partially on the core platform 28 and partially on the integration engine. In another example, the world model 16 may be embedded on both the core platform 28 and the integration engine 30. For this example, as the world model 16 is updated, synchronization occurs between the world model 16 on the integration engine 30 and the world model 16 on the core platform 28. The core platform 28 functions as the cloud within the AI agent system 10 and generally controls communication and orchestration. The core platform 28 uses the system computer device 26 to interact with client devices 18A-18N via network 22A. The integration engine 30 interacts with various data sources of the enterprise system 14 on the one or more enterprise servers 24A-24N (e.g., obtains information and data from enterprise system 14 for updating world model 16). The core platform 28 communicates with the integration engine 30 via network 22B.

Figure 3:
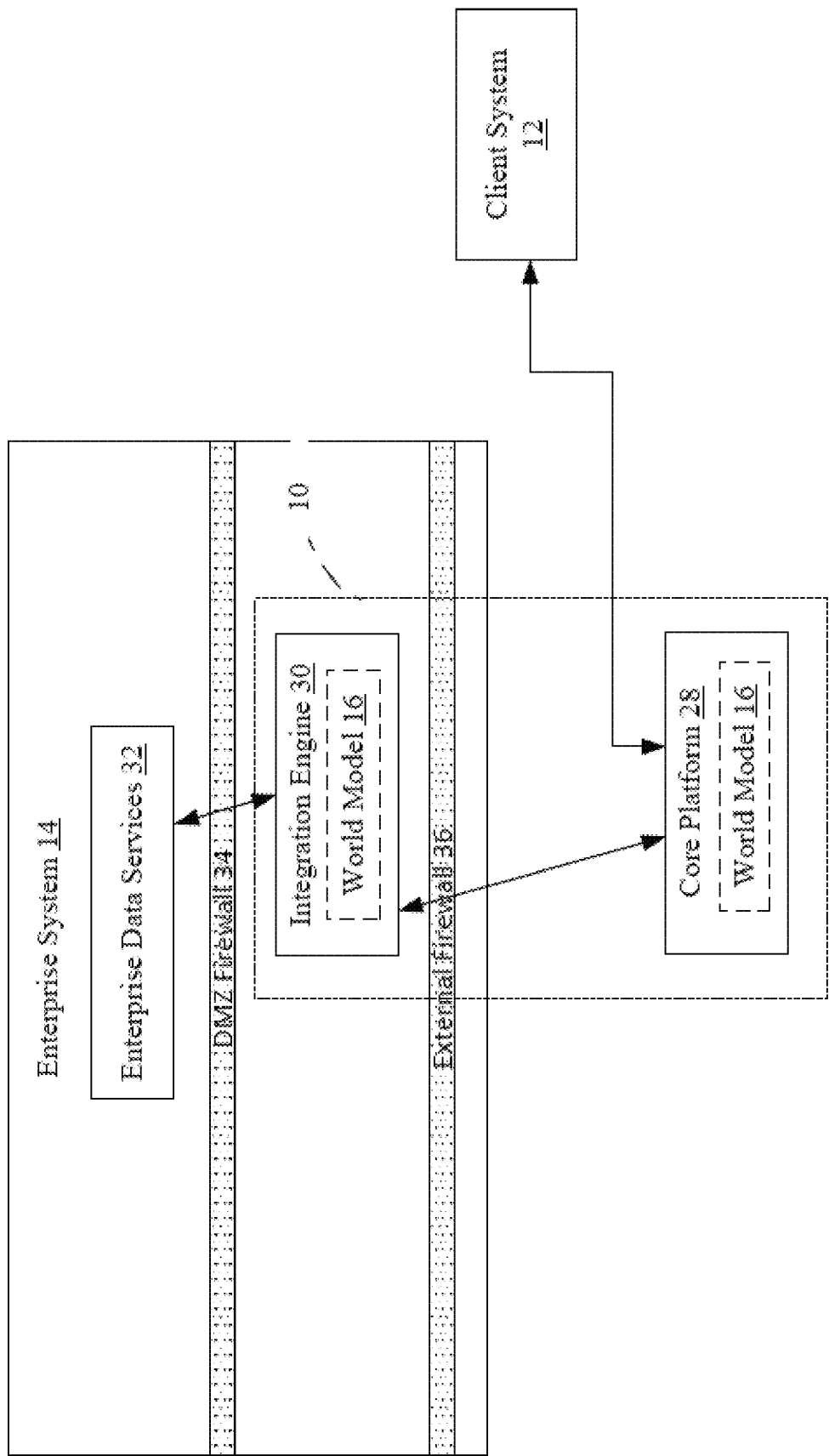
FIG. 3 is a detailed view of the hybrid deployment example of the AI agent system shown in FIG. 2D.

FIG. 3 illustrates a detailed view of the hybrid deployment of the AI agent system 10 as shown in FIG. 2D.

The enterprise system 14 includes enterprise data services 32 that provide access to enterprise data, enterprise data resources, enterprise data mechanisms, and other enterprise information (e.g., cache, data monitoring, data acquisitions, etc.). The enterprise system 14 may include a demilitarized zone (DMZ) firewall 34 (also referred to as perimeter network) and an external firewall 36. The external firewall 36 may monitor and control incoming and outgoing network traffic based on predetermined security rules for the enterprise system 14. The external firewall 36 may establish a barrier between a trusted, secure internal enterprise network (i.e., enterprise system 14) and another outside network that is assumed not to be secure or trusted, e.g., the Internet. The external firewall 36 may be a network-based firewall or a host-based firewall. The network-based firewall may filter traffic between two or more networks (e.g., software-based firewall devices or hardware-based firewall devices). Host-based firewalls may provide a software layer on one host device that controls network traffic. The DMZ firewall 34 may be a physical or logical subnetwork that exposes an organization's services (e.g., enterprise data services 32) to an untrusted network e.g., the Internet via the external firewall 36. The DMZ firewall 34 may add an additional layer of security to an enterprise's or business's local area network (LAN) beyond the external firewall 36. The DMZ firewall 34 may use an external network node to access only what is exposed in the DMZ, while the rest of the enterprise system 14 or enterprise network is firewalled.

In the illustrated example, the integration engine 30 is deployed within the enterprise system 14 between the DMZ firewall 34 and the external firewall 36. The integration engine 30 interacts with enterprise data services 32 via the DMZ firewall 34 within the enterprise system 14. The integration engine 30 interacts with the external core platform 28 via the external firewall 36. The core platform 28 then interacts with the client system 12 via the network (e.g., network 22 or network 22A). The integration engine 30 and core platform 28 work together to provide the AI agent system 10 functionalities between the enterprise system 14 and the client system 12.

Figure 4:
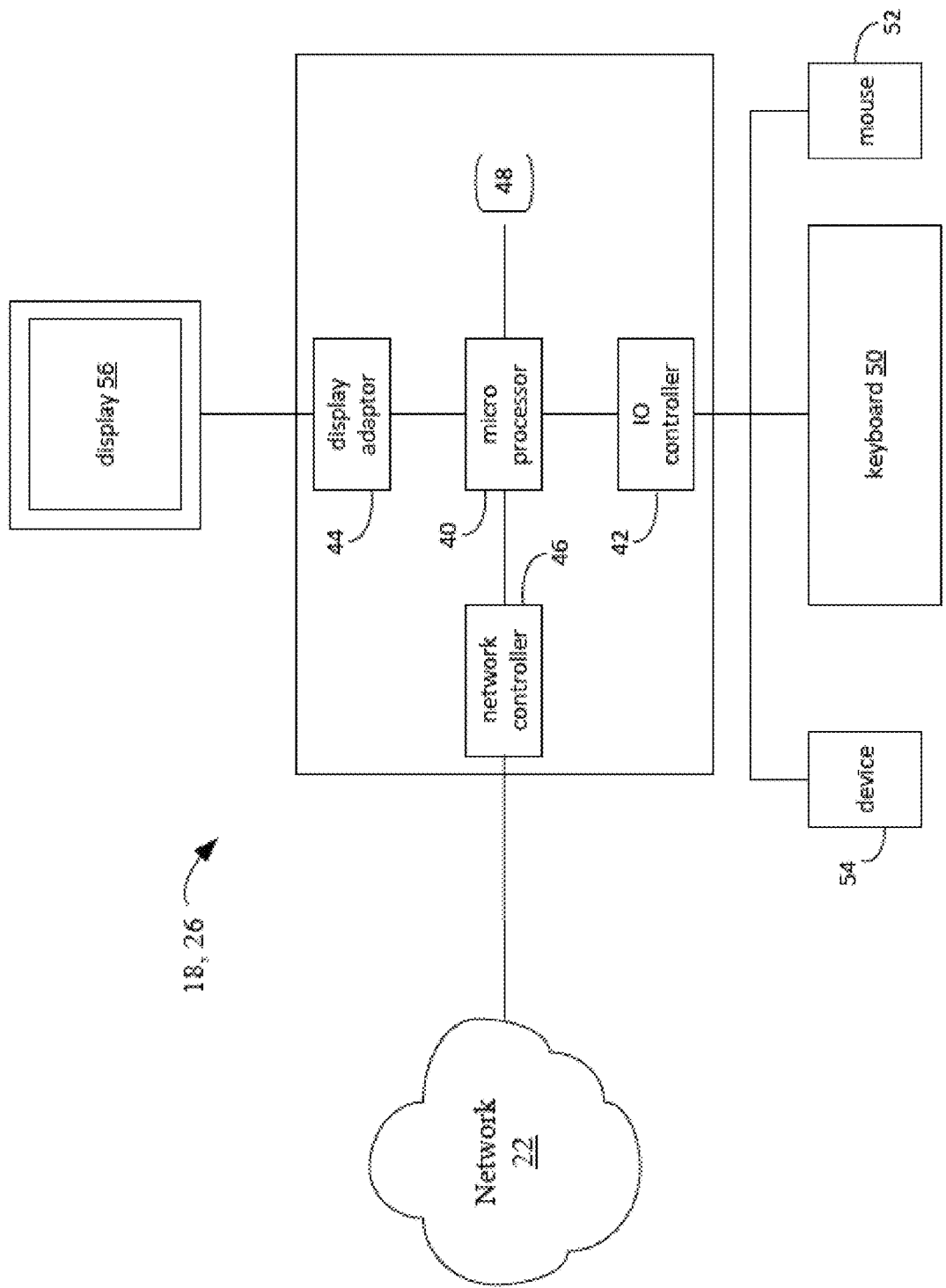
FIG. 4 is an example diagrammatic view of a client device or a system computer device of FIGS. 2A-2D and 3 according to one or more example implementations of the disclosure.

FIG. 4 is an example diagrammatic view of the client device 18 or system computer device 26 of FIGS. 2A-2D. While client device 18 or system computer device 26 is shown in this figure, this is for example purposes only and is not intended to be a limitation of this disclosure, as other configurations are possible. Additionally, any computing device capable of executing, in whole or in part, the AI agent system 10 and/or client system 12 may be substituted for client device 18 or system computer device 26 (in whole or in part) within FIG. 4, examples of which may include, but are not limited to, computer device 26 and/or one or more of client devices 18A-18N.

In some implementations, the client device 18 or the system computer device 26 may include a processor and/or microprocessor (e.g., microprocessor 40) configured to, e.g., process data and execute code/instruction sets and subroutines. Microprocessor 40 may be coupled via a storage adaptor (not shown) to the above-noted storage device(s) (e.g., storage device 48). An I/O controller (e.g., I/O controller 42) may be configured to couple the microprocessor 40 with various devices, such as keyboard 50, pointing/selecting device (e.g., touchpad, touchscreen, mouse 52, etc.), custom device 54, USB ports (not shown), microphone (not shown), and printer ports (not shown). A display adaptor (e.g., display adaptor 44) may be configured to couple display 56 (e.g., touchscreen monitor(s), plasma, CRT, or LCD monitor(s), etc.) with microprocessor 40, while network controller/adaptor 46 (e.g., an Ethernet adaptor) may be configured to couple microprocessor 40 to the above-noted network 22 (e.g., the Internet or a local area network).

The client device 18 or system computer device 26 may be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and LINUX, a freely-available operating system, e.g. Linux Mint distribution ("distro") or UBUNTU, distributed by Canonical Ltd. of London, United Kingdom; or UNIX or other UNIX-like derivative operating systems; and ANDROID, designed by Google, of Mountain View, Calif., among others.

Figure 5:
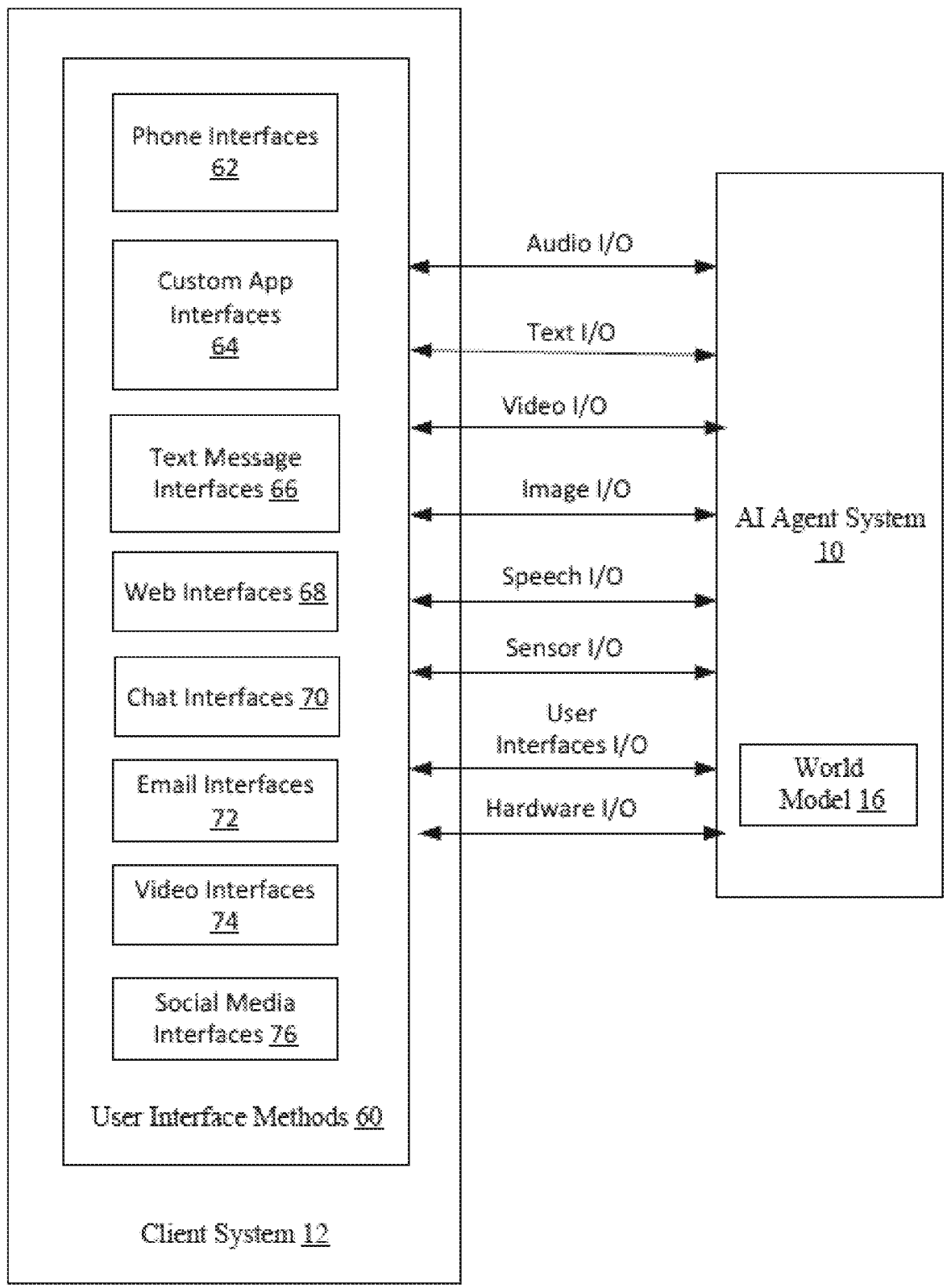
FIG. 5 is an example diagrammatic view of the AI agent system engaging with user interface methods of the client system.

FIG. 5 is an example diagrammatic view of the AI agent system 10 interacting with the client system 12 by way of various communication channels. The client system 12 may have one or more user interface methods 60 (also referred to as communication channels) that the AI agent system 10 may use for communicating with users 20. The user interface methods 60 may include, but are not limited to, phone interfaces 62 (e.g., voice over Internet Protocol (VOIP) or public switched telephone network (PSTN) interfaces), custom application interfaces 64 (e.g., mobile, web, and/or enterprise application interfaces), text message interfaces 66 (e.g., multimedia messaging service (MMS)/short message service (SMS) interfaces), web interfaces 68, chat interfaces 70 (e.g., chatbot), email interfaces 72, video interfaces 74, social media interfaces 76 (e.g., via social network sites), etc.

The AI agent system 10 may send and/or receive information in various media forms to and/or from the client system across the different user interface methods 60. The media forms may include, but are not limited to, audio (e.g., phone voice message), text (e.g., SMS/MMS message or chat message), video, image (e.g., photos), speech, sensor-generated (e.g., client device sensor such as GPS), user interfaces (e.g., graphical user interface (GUI), haptic interface), hardware-generated, etc. The AI agent system 10 may communicate various media forms using different user interface methods 60 providing an omni-channel engagement with the client system 12. As shown by the arrows, the various media forms may be sent by the client system 12 and received as an input for the AI agent system 10 (e.g., an answer to a question may be sent to client system 12 in the form of speech or text). The media forms may also be output by the AI agent system 10 to the client system 12 (e.g., AI agent system 10 may accept image input such as a scanned document or photo). The media forms may include, but are not be limited to, unstructured data and structured data. The AI agent system 10 may update the world model 16 based on media received from client system 12.

Figure 6:
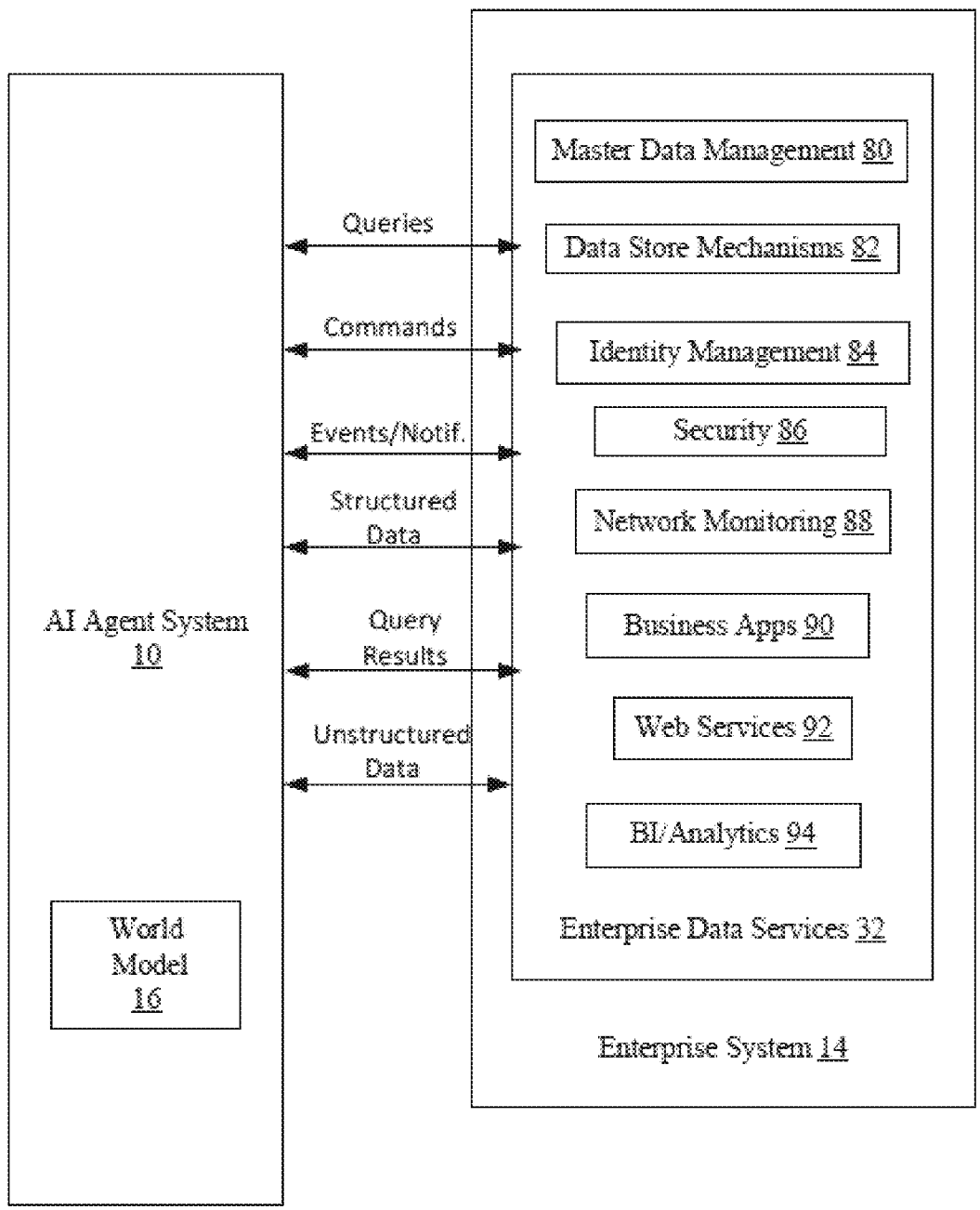
FIG. 6 is an example diagrammatic view of the AI agent system interacting with enterprise data services of the enterprise system.

FIG. 6 depicts the AI agent system 10 interacting and communicating with the enterprise data services 32 of the enterprise system 14. The AI agent system 10 may use this interaction to obtain answers to queries, obtain information on business projects and then notify client systems 12 on getting things done for the business projects, build the world model 16 and add to the world model 16, etc.

The enterprise data services 32 may include, but are not limited to, master data management 80 (e.g., enables enterprise system 14 to link critical data to one master file that provides a common point of reference), data store mechanisms 82 (e.g., databases, data warehouses, knowledge bases, data lakes, etc.), identity management 84 (also referred to as access governance system, identity and access management system, entitlement management system, or user provisioning system—that, for example, manages user identities, their authentication, authorization, rules, and privileges across enterprise system 14), security 86 (e.g., computer security, cyber security, or IT security—that, for example, provides protection of computer systems of enterprise or company from damage to hardware, software, or information and from disruption or misdirection of services), network monitoring 88—that for, example, monitors computer network of enterprise system 14 for slow or failing parts and notifies network administrator when there are outages or other problems, business applications 90 (e.g., customer relationship management (CRM)—that, for example, manages company's interaction with current and potential customers, enterprise resource planning (ERP)—that, for example, integrates management of core business processes, supply chain management (SCM)—that, for example, manages flow of goods and services), web services 92 (e.g., company to company web site communication and application integration), business intelligence (BI)/analytics 94 (e.g., strategies, processes, applications, data technologies used by enterprise to support collection, data analysis, presentation, and dissemination of business information), etc.

The AI agent system 10 may send and/or receive various data/information to and/or from the enterprise data services 32. For example, the AI agent system 10 may query the enterprise data services 32 (e.g., query data store mechanisms 82 by sending queries) and direct enterprise data services 32 (e.g., send commands to control BI/analytics 94). Also, the enterprise data services 32 may query the AI agent system 10 (e.g., query AI agent system 10 by sending queries such as market surveys) and direct the AI agent system 10 (e.g., enterprise data services 32 send commands to control AI agent system 10). The AI agent system 10 may send/receive events and notifications to/from the enterprise data services 32. Also, the AI agent system 10 may send/receive structured data to/from the enterprise data services 32. The AI agent system 10 may send/receive unstructured data to/from the enterprise data services 32. Also, the AI agent system 10 may send/receive query results to/from the enterprise data services 32 of the enterprise system 14.

The AI agent system 10 may run the unstructured data through a natural language process (NLP). For example, the NLP may bring in text such as by topic modeling (e.g., breaks data into parts that can be brought into semantic layer) or NLP may go into sentence level (e.g., every sentence is read, every sentence is mapped, and every sentence is understood). The AI agent system 10 may bring unstructured data and structured data into semantic world model 16 as it appears in real time. The AI agent system 10 may use structured data as one or more hints, prompts, seeds, or the like for assisting in pulling in unstructured data. The AI agent system 10 may use one or more of the user interface methods 60 for collecting unstructured data (e.g., call users via phone interfaces or collect unstructured data via phone calls).

Enterprise data (e.g., data stored across enterprise system 14) typically has a complex organization where the data takes multiple forms and the data is interrelated. The AI agent system 10 connects the complex enterprise data to one another using the world model 16. In examples, the world model 16 may act as a catalog to define a place where relevant data may be found (e.g., a catalog of data may inform the AI agent system 10 where to find particular types of data and how to handle/interpret the data from the enterprise system 14), then the AI agent system 10 may directly or indirectly query the enterprise system 14 for relevant data (e.g., via integration engine 30). In one approach, enterprise data is copied to world model 16. In another approach, the world model 16 has knowledge to deal with various types of enterprise data in different enterprise data sources. In another approach, the world model 16 acts as a catalog to all data in enterprise as described above. In another approach, the world model 16 uses a hybrid (wherein some data is copied into world model 16 and some data is accessed from enterprise system 14).

Examples of types of enterprise database sources may include, but are not limited to, relational data sources (e.g., tables), object-oriented databases, data warehouses (e.g., data cubes, two-dimensional data stores or multidimensional tables), service-oriented architectures (e.g., messages, message driven interactions), data feeds, web services, etc. One problem with different types of database sources is that links between them are not necessarily explicit or consistent with respect to different data sources. The AI agent system 10 provides a solution by linking the data from different data sources together.

The AI agent system 10 may use the integration engine 30 (also referred to as semantic integration layer for enterprise) to obtain data/knowledge in the form of tables, cubes, and messages from enterprise data services 32 and return the data directly or in a transformed form. In an example, the AI agent system 10 may use semantic models described in web ontology language (OWL), e.g., W3C Web Ontology Language, such as to provide a basis for integration, allowing enterprise data or knowledge in different forms to be mapped into a shared knowledge domain. For example, the integration engine 30 may use OWL to describe what information is and how it relates to each other. For example, the integration engine 30 may use OWL 2 QL, an OWL language for describing the semantic structure of relational data. The integration engine 30 may use Statistical Data and Metadata eXchange (SDMX)—e.g., use communication and distribution of metric data to convert data warehouses cubes data to data cube RDF (based on OWL vocabulary i.e., linked to OWL). The integration engine 30 may use OWL-S (set of terms following OWL) for defining semantically enabled web services (e.g., describes messages in OWL language). As appreciated by one of ordinary skill in the art, other computer languages similar to OWL may be used in order to define the semantics needed to integrate the enterprise data. Implementation of the integration engine 30 may use an internal representation that may take a different format used to describe the enterprise system interfaces.

The results of integration engine 30 using OWL may include: semantically aligned data sources and services, standards based—allowing for use of known editing tools with OWL such as automatic reasoners (identify logical fallacies within ontology and flag logical errors), and interoperable—producing company related ontology that company can use for various purposes, etc.

Figure 7:
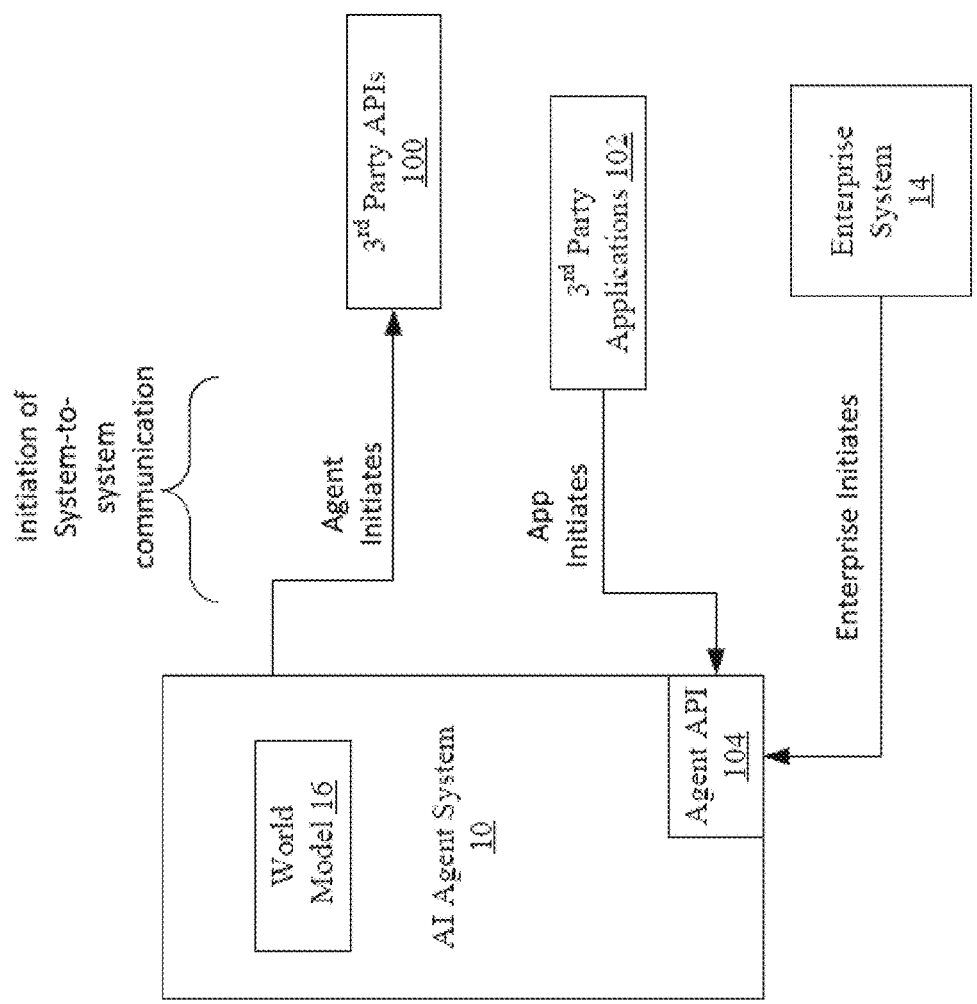
FIG. 7 is an example diagrammatic view of the AI agent system interacting with third party application program interfaces (APIs) and third-party applications.

FIG. 7 illustrates the initiation of system-to-system communication between the AI agent system 10 and third-party application program interfaces (APIs) 100 (e.g., goip services, weather services, push notification services, etc.), third party applications 102 (e.g., any system external that wants to query/command an API of the agent, such as a chatbot, website, custom interface, etc.), and the enterprise system 14. Thus, the AI agent system 10 may include an agent API 104. The AI agent system 10 may initiate (i.e., agent initiates) third party APIs 100 (e.g., third party map service). In an example, the third-party applications 102 (e.g., third party bots) may initiate (i.e., application initiates) the agent API 104. Also, the enterprise system 14 may initiate the agent API 104. These different system-to-system communications enable the AI agent system 10 to direct external actions such as initiate external software systems (e.g., third party APIs 100) as well as allow for external systems (e.g., third party application 102 and enterprise system 14) to direct the AI agent system 10 (e.g., initiate the AI agent system 10 via agent API 104).

Figure 8:
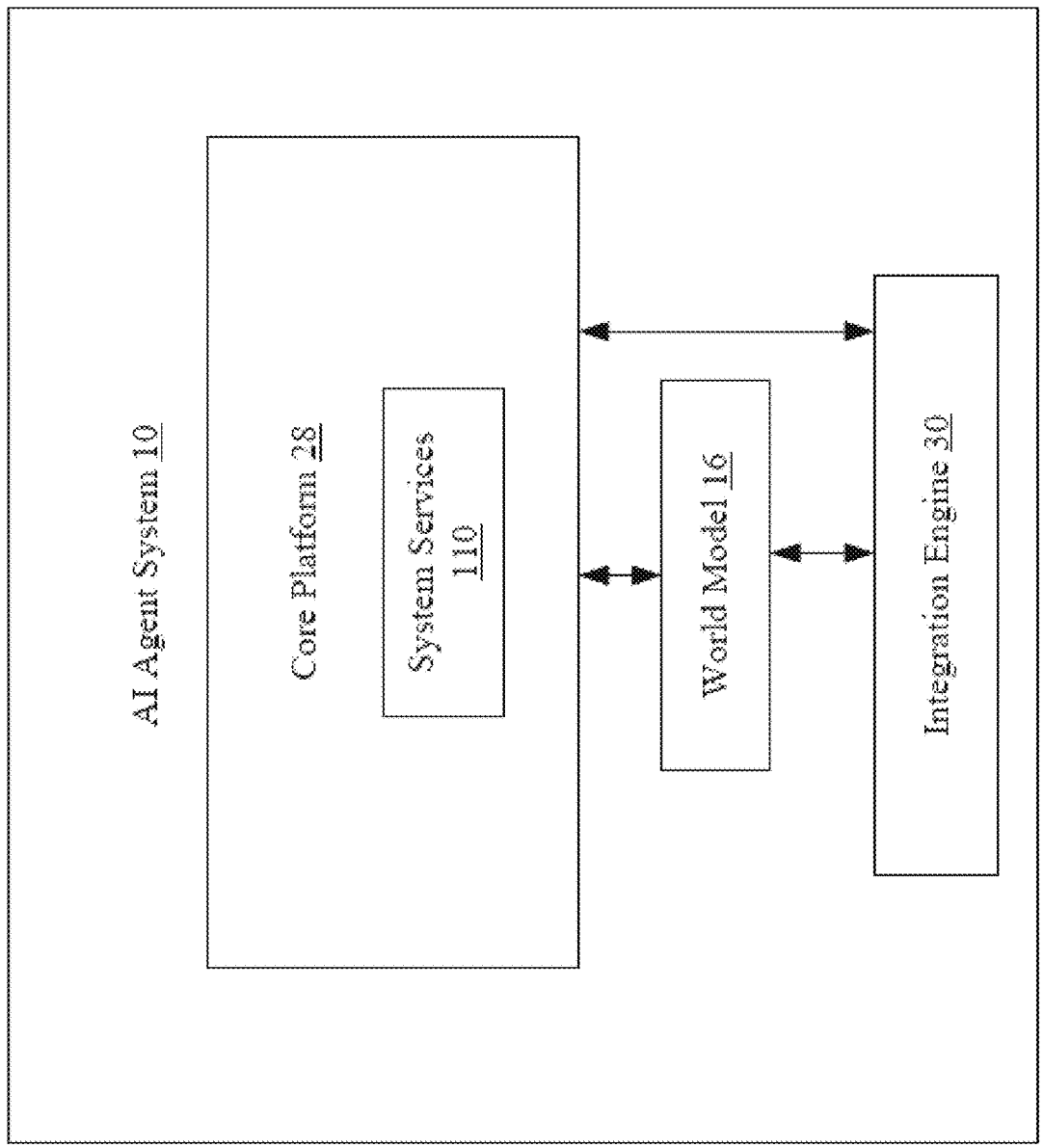
FIG. 8 is an example block diagram of the AI agent system including a core platform, a world model, and an integration engine.

FIG. 8 depicts the main components of the AI agent system 10 which includes the core platform 28, the world model 16, and the integration engine 30. The core platform 28 includes system services 110 that provide several of the main functions described above for the AI agent system 10. The core platform 28 may communicate and interact with the integration engine 30 and the world model 16. As shown, the integration engine 30 may also communicate and interact with the world model 16 separate from the communication with the core platform 28. In an example, the integration engine 30 may be used to convert some or all of the different types of enterprise data to knowledge that can be brought into the world model 16. In another example, the integration engine 30 may be used to provide a link between the world model 16 and the enterprise data (e.g., the world model 16 providing catalog links to enterprise data). For example, the world model 16 has data that allows the integration engine 30 to be triggered by the core platform 28 providing links to the enterprise data sources instead of copying all enterprise data to the world model 16. The integration engine 30 allows for smooth integration of the core platform 28 with the enterprise system 14.

Figure 9A:
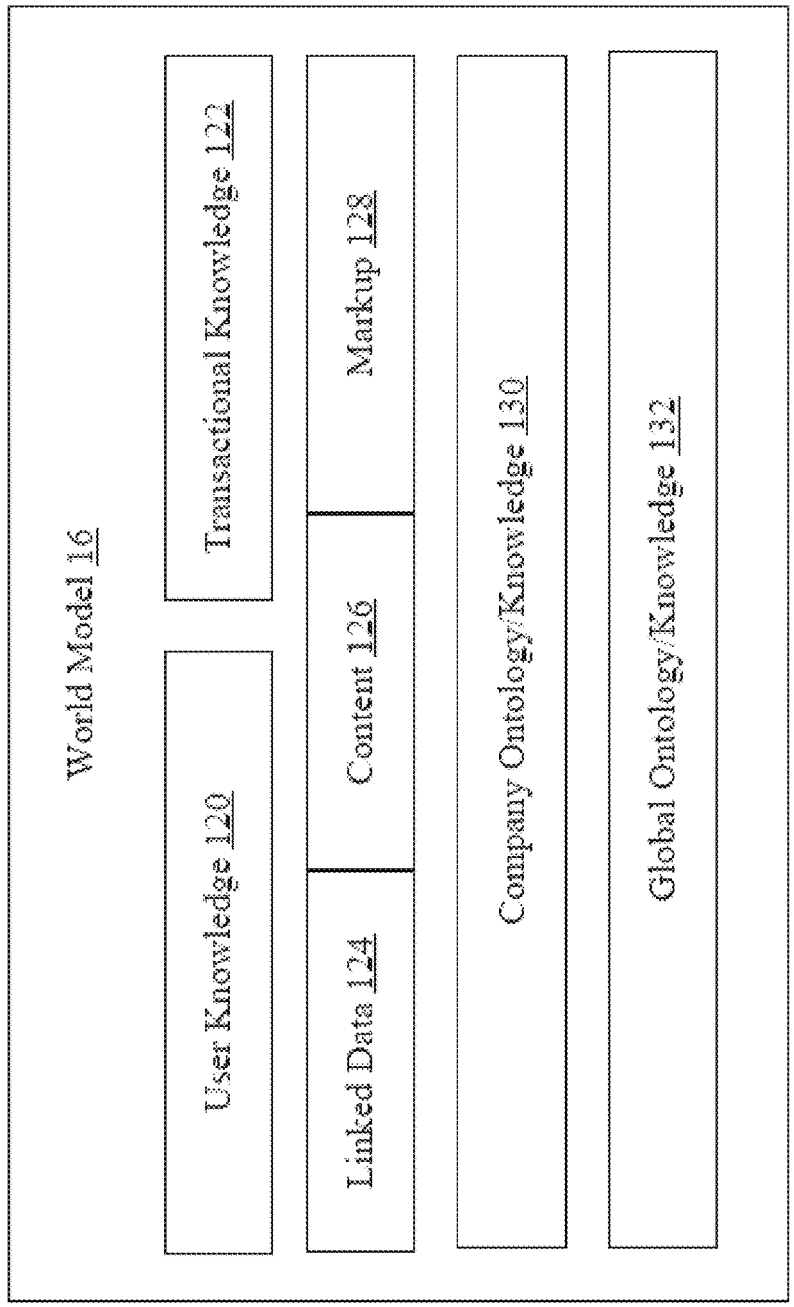
FIG. 9A is an example depiction of the world model in a layered configuration.

FIG. 9A illustrates an example depiction of the world model 16 as forming different layers based on scope and type of knowledge. The world model 16 provides a high-level language for the AI agent system 10 to use when engaging the client system 12 in dialogue or conversations. The world model 16 may be represented as a graph model that provides systemic and domain knowledge of environment. There may be several groups, subgroups, and nodes within the graph model of the world model 16.

In terms of layers, for example, a first layer of the world model 16 may include global ontology/knowledge 132 (e.g., generic representation of objects or things as known globally in one or more industries, global terminology, general knowledge for a specific industry, etc.). A second layer of the world model 16 may include company ontology/knowledge 130 (e.g., company terminology or terminology of organization—generally consistent across different database sources of the company or organization, knowledge specific to working at the company or organization). The first layer and second layer form a base for the world model 16.

A third layer of the world model 16 may generally be defined as conceptual data that is integrated or injected into the first and second layers (e.g., a third layer may be injected into the base layers).

The third layer of the world model 16 may include linked data 124 (e.g., from a linked data catalog, such as to label or mark identities of unique instances of elements together, such as pricing information for all company products or pricing information for a specific type of company product; exceptions of linked data rules may occur based on ontology). The linked data catalog may represent knowledge topically and how to get the knowledge e.g., such as the AI agent system 10 knowing that pricing data is located at a specific location in enterprise system 14 and where the linked data catalog may contain information used to instruct the integration engine 30 of the AI agent system 10 what to retrieve and where to retrieve it. This information may comprise data input sets to be passed to the integration engine 30 to complete a query with respect to the linked data catalog. Linked data 124 such as linked data catalogs help with enterprise integration. This allows for linking of data between dispersed sources.

The third layer of the world model 16 may also include content 126 (e.g., text and multimedia designed to be displayed/read to the user 20). Such content 126 may be directly stored in the third layer of the world model 16 or the content 126 may be encoded with an external location (e.g., uniform resource locator (URL)/uniform resource identifier (URI)).

The third layer of the world model 16 may also include markup 128 (e.g., release date for information to be made available to a user, synonyms, items marked as confidential, and annotated pronunciations that may be important to the functioning of the speech aspect of the AI agent system 10 but are generally transparent to end users, and the like). Such markup may also include lexical annotations, synonyms, ranking of importance, etc.

The first layer, second layer, and third layer may be defined as a published state of the world model 16 (e.g., original creation of world model 16 design includes bottom three layers—i.e., published world model 16).

A fourth layer of the world model 16 may include user knowledge 120 and transactional knowledge 122. In embodiments, the fourth layer of the world model 16 may be defined as acquired knowledge or data through usage. The user knowledge 120 may be user know-how such as facts having a relatively high confidence factor from user knowledge e.g., tires are inflatable, wings may be added to cars, etc. The transactional knowledge 122 is knowledge based on known historical transactions that can be deemed reliable based on confidence factors.

The world model 16 provides a formal ontology that includes axioms (i.e., established or self-evidentiary facts), entities (e.g., processes and things), and logical expressions (e.g., company who buys things is a customer). This helps inform AI agent system 10 regarding decisions. The conversation and dialogue functionality of the AI agent system 10 may be driven by this ontology (e.g., ontology driven language generation). For example, the AI agent system 10 uses the world model 16 to match a concept and then reads, processes and/or interprets terminology that has been assigned to the concept, providing an interesting way to assist language generation.

Ontologies of the world model 16 deal in facts (i.e., axioms). Graph models may be used to measure confidence levels of these facts. The AI agent system 10 may collect know-how (e.g., user know-how or company know-how) as reinforcing connections within data (e.g., collecting enough data to hit a confidence threshold for creating an axiom connection between data). For example, if enough data shows people saying something (e.g., cups are in cars), it can become a fact or axiom (e.g., after reaching a confidence threshold). Ontologies may be developed as the AI agent system 10 learns about new connections in data from users, from transactions, from application of learning on data sets, and the like.

The AI agent system 10 uses the world model 16 to provide domain mapping. For example, this may include taking business domain and creating a digital representation of domain that is used as normalizing factor for all the different types of data sources. In another example, the AI agent system 10 may use domain mapping technology that utilizes a "Semantic Web" (e.g., semantically linked web) for the purpose of mapping business knowledge and industry knowledge. Thus, when data is viewed through a semantic domain within the world model 16, the data can be identified more easily for logic and reasoning purposes. W3C standards may be used for domain schemas (e.g., ontologies). In an example, the AI agent system 10 may create mini semantic webs as part of the world model 16 to make use of the data being semantically aligned with reference across the enterprise system 14.

There are several results of distributed data query and re-unification. For example, taking one or more queries (e.g., looking for piece of information), breaking a query into subqueries (e.g., based on a linked-data catalog and information stored in the integration engine itself), determining which query sources need to be hit, processing queries in parallel, recombining results, and producing semantically-consistent responses back. The AI agent system 10 may be able to take response data and produce natural language responses and/or instructions to the client system 12 on actions to take/content to show.

Figure 9B:
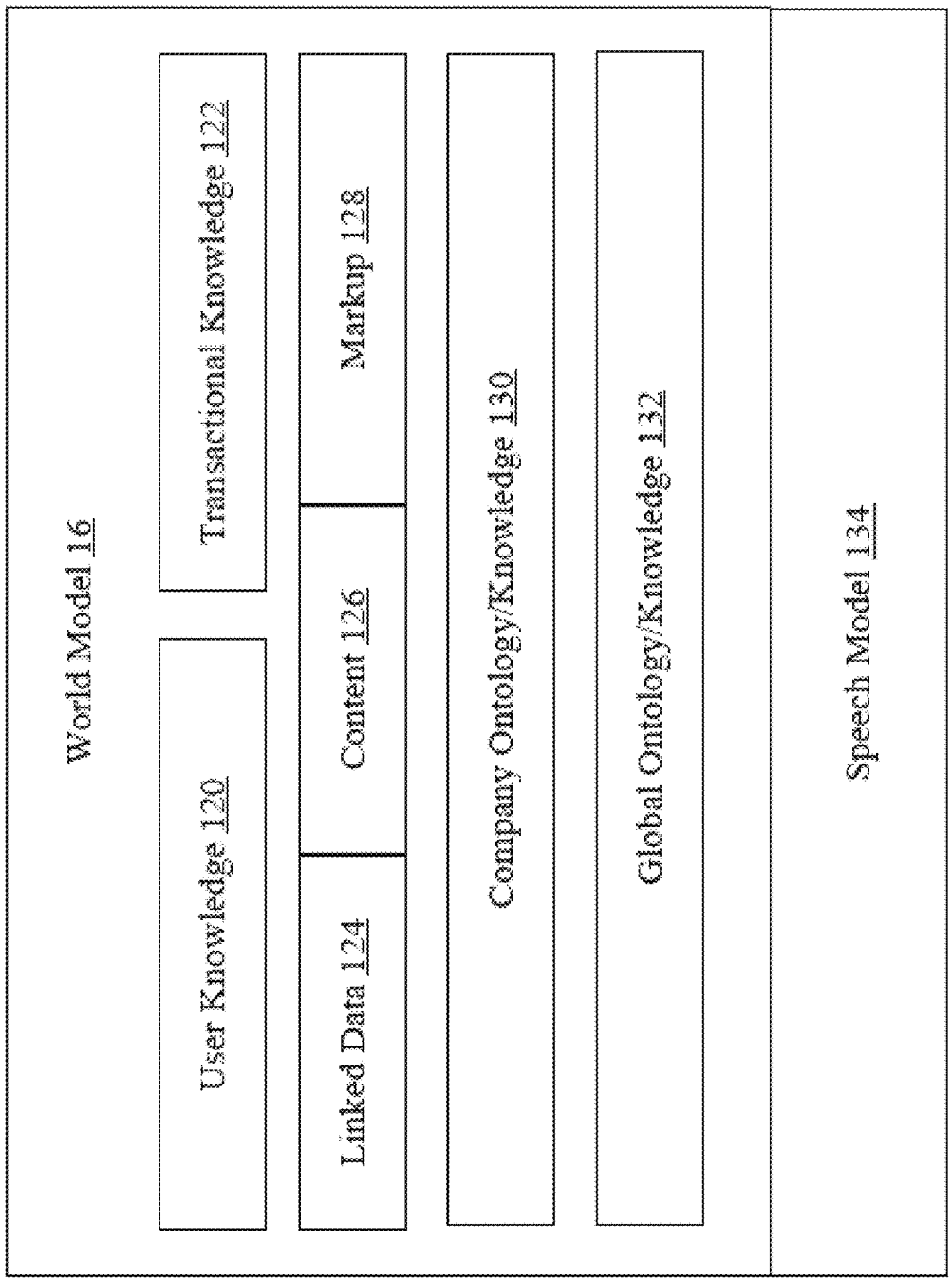
FIG. 9B is an example depiction of the world model of FIG. 9A in relationship to a speech model such that data from world model is used to generate the speech model.

FIG. 9B illustrates the world model 16 as being added to a speech model 134 to be used with natural language processing. The speech model 134 is derived from the world model 16. Data from the world model 16 may be used to supplement a previously generated speech model 134. The speech model may be originally created from other data sources and the data from the world model 16 may be added to the speech model 134 (i.e., updating speech model 134). Thus, as the world model 16 is updated with new enterprise data, the speech model 134 is simultaneously updated. This allows for, among other things, natural language query of semantic models. Reasoning in the world model 16 may comprise graph-based reasoning, making it consistent across different types of data/knowledge formats.

Figure 9C:
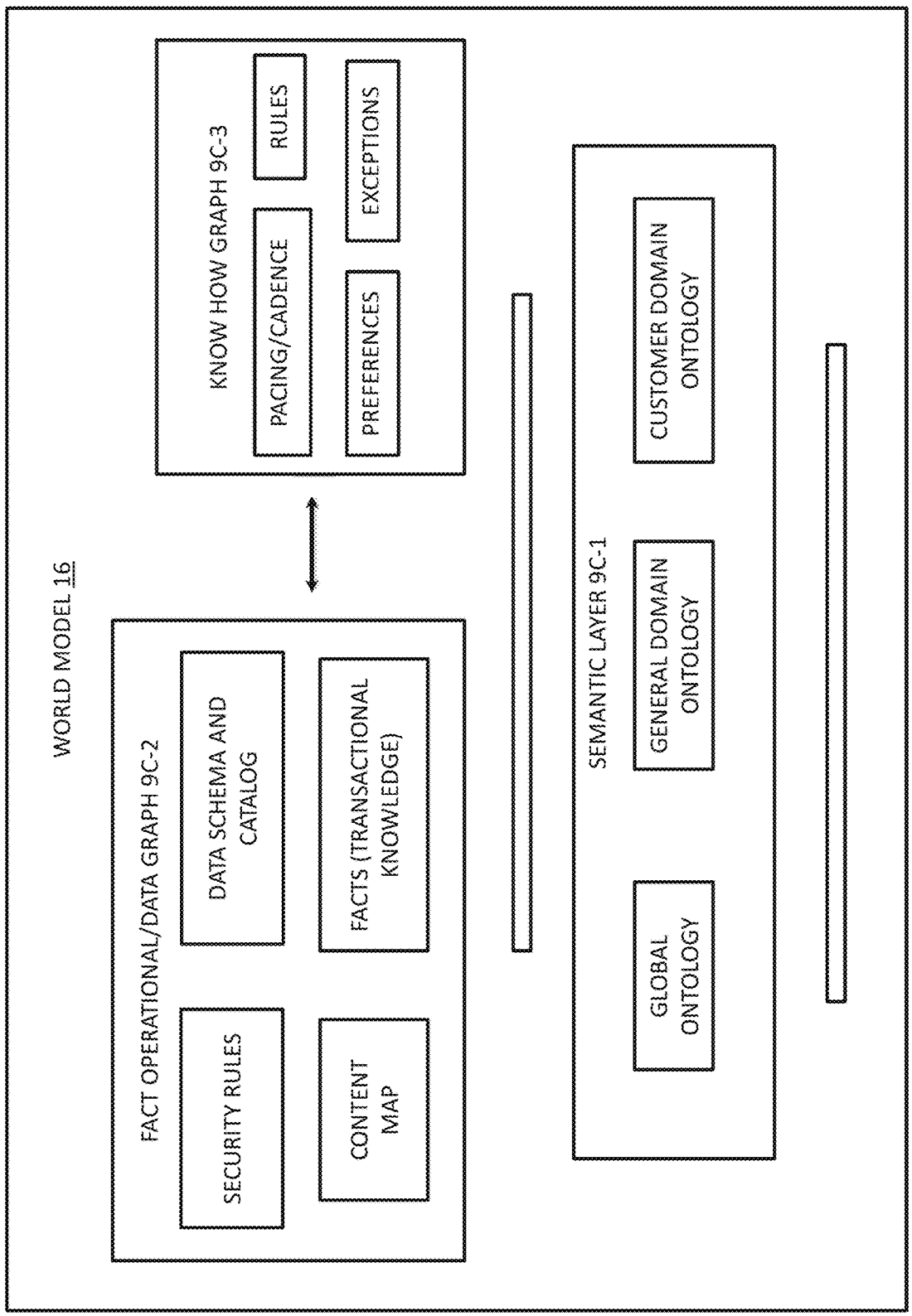
FIG. 9C is an example depiction of an alternate layered configuration of a world model.

FIG. 9C illustrates the world model 16 as being configured with operational functions, such as in a hierarchical or layered configuration. In embodiments, world model 16 may include operational capabilities, such as functional modules, executable code, and the like that may operate to implement the features of the world model 16, such as storage, linking, and access to data. These functional modules may operate on data in the world model 16, such as a knowledge graph with functional, module-specific rules and objectives. These world model 16 operational capabilities may themselves be structured into layers that may be differentiated by, among other things, degrees of abstraction, such as data abstraction, meaning abstraction and the like. In the illustrated embodiment, the world model 16 includes interconnected graphs (fact operational/data graph 9C-2 and know-graph 9C-3) on a second layer that overlays a semantic layer 9C-1. In embodiments, the fact operational/data graph 9C-2 and know-graph 9C-3 may exist independently from one another on the same layer of the world model 16.

In embodiments, the semantic layer 9C-1 is a first layer that forms a base for the world model 16. This operational level facilitates disambiguation (e.g., disambiguating among multiple meanings) and understanding, such as semantic meaning of terms, queries, entities, intent and the like that is processed by the world model 16 operational layers. Such a semantic layer 9C-1 may take into consideration a range of conditions related to queries and the like to facilitate developing a clarity of aspects of the query, such as context, intent, terminology, entities/actors and the like. The semantic layer 9C-1 may facilitate access to features of the fact operational/data graph 9C-2 and know-how graph 9C-3 that contribute to disambiguation and richness of responsiveness to facilitate providing a response to a query that is highly aligned with the semantically-derived understanding of the query. In embodiments, a semantic operational layer 9C-1 of a world model 16 may, through the various understanding and disambiguation techniques described herein, facilitate directing a conversational agent to a specific portion of a knowledge graph for responding to at least a portion of a query.

In the example regarding the potentially ambiguous term "backhoe", a semantic operational layer 9C-1 may direct operation of the world model 16 to disambiguate the term at the highest level of abstraction, thereby requiring the lowest processing load, which may also render a faster path to a suitable response to a query. By, for example, determining that a context of the query suggests that the term "backhoe" in the query is directed at the loader machine rather than its "backhoe" operational component, a suitable knowledge graph, and portion thereof may be selected for processing the query, without having to first present both meanings to a person making the query, and the like. This may be done through, for example, developing a semantic understanding of a context of the query, which may include any portion of the query, the originator of the query, or other context as described elsewhere herein.

In embodiments, a semantic operational layer 9C-1 may also function as a logical connector between graphs of a higher-level interaction layer (e.g., fact operational/data graph 9C-2 and know-how graph 9C-3), thereby enabling both graphs to operate efficiently and independently while serving each other with highly useful information. In embodiments, a semantic layer 9C-1 may provide a fact operational/data graph 9C-2 and know-how graph 9C-3 with specific knowledge graph guidance for retrieving, storing, and/or linking terms. The semantic layer 9C-1 may provide a graph (e.g., know-how graph 9C-3) with context-relevant facts, rules, and the like that may be captured by another graph (e.g., fact operational/data graph 9C-2). The semantic layer 9C-1 may include global ontology, general domain ontology, customer domain ontology, and the like. Global ontology may be defined as generic aspects of business domain that are being mapped for company industry but not specific to company (e.g., information on machines being used in company's industry). General domain ontology may be defined as fundamental information (e.g., ontology may be classes organized into one or more hierarchies, where hierarchies may or may not imply inheritance relationships). Customer domain ontology may be defined as terms specific to each company (e.g., company master data and alignment to general domain ontology).

In embodiments, a second level operational layer of the world model 16 may include the fact operational/data graph 9C-2 that deals with data items, such as facts and the like, where ambiguity regarding terms may be low. Operation of the world model 16 at the fact operational/data graph 9C-2 operational layer may be activated when ambiguity regarding terms, intent, actors, and the like has generally been resolved. In embodiments, operation at this fact operational/data graph 9C-2 may be activated when a term is introduced to the world model 16, such as via a query that may need clarification. In an example, an extent of a term like "backhoe" may be ambiguous by referring to a type of machine (e.g., a backhoe loader machine) or just to a backhoe attachment, and the like. When the fact operational/data graph 9C-2 of the world model 16 operates on a term, such as "backhoe", ambiguity may be resolvable by a lower operational world model 16 layer (e.g., semantic layer 9C-1). For example, such a lower operational layer may indicate to the fact operational/data graph a knowledge domain to access for the term.

In embodiments, a lower operational layer may use the fact operational/data graph to capture multiple possible uses of the term, such as for determining which use may align best with a context of the term use, such as in a query. Context may be determined with assistance from other operational layers or graphs of the world model 16 as noted below. In embodiments, operational layers of the world model 16 may be used to narrow a possible scope of a query. In embodiments, use of the fact operational/data graph 9C-2 layer may result in selecting a portion of a knowledge graph that captures information about a backhoe loader machine and the like. In embodiments, the portions or views of the world model 16 that a fact operational/data graph 9C-2 interacts with may be a constantly changing knowledge space driven by, for example artificial intelligence-based machine learning. Links among terms at the fact level, such as links among nodes in a knowledge graph and the like may be strengthened through context handled by a lower operational layer or other graphs of the world model 16. The fact operational/data graph 9C-2 may include security rules, data schema and catalog, content map, and facts (transactional knowledge). The security rules may be predetermined security rules that define relationships between entities (e.g., users) and data. The data schema and catalog may be linked data that is catalogued for ease of access. The content map may be a catalog of external content references and contextualizes/tags references within data model (providing a record of existence of external data and knowledge). The facts (transactional knowledge may be knowledge based on known historical transactions that can be deemed reliable based on confidence factors.

In embodiments, the world model 16 may include yet another graph (know-how graph 9C-3 or know-how operational graph) on the second level (same layer as fact operational/data graph 9C-2) that facilitates placing interactions with the world model 16 within a context or a sphere of knowledge (e.g., the know-how of an enterprise for which the world model 16 is maintained) and the like. In embodiments, context may be inferred from a query (such as where other terms in the query help disambiguate which meaning of a term is intended) or may be determined based on other information, such as about the user, the role of the user, the location of the user, the environment of the user, a temporal factor, and the like. By determining know-how regarding a query topic, the semantic operational layer 9C-1 can function to develop a semantic understanding of a query. In an example, general knowledge about a backhoe may suggest that a query regarding its function may return an answer that provides general guidelines for its use; however, with the awareness of know-how (such as know-how about, in the above example, operation of a backhoe within varying conditions) and with information about context that is detectable through parsing of a query or otherwise, the system may return a different, context-specific set of use guidelines (such as providing information about low-temperature startup to a user who is determined to be local in a very code environment). Counting the example, startup of a backhoe in warm temperatures may follow a first set of guidelines, whereas startup in sub-zero temperatures would follow a second set of guidelines. These guidelines may further be enhanced through know-how developed through learning within the world model 16, such as where the world model 16 contains know-how that a machine with medium grade oil may operate better with longer startup time than one with a high-grade oil. Know-how and user roles that may be determined at the know-how graph 9C-3 may also provide guidance to the other operational layer and other graph. In embodiments, knowledge regarding a user role can be provided to a semantic layer and/or a fact operational/data graph and the like to refine understanding and therefore facilitate selecting not only a query-specific knowledge graph of the world model 16, but a degree of detail for a response. In embodiments, interaction with a novice user, such as a new customer or non-technical user, may suggest that a response may start with more general information and move to greater detail based on continued interaction. In this way, this know-how graph 9C-3 may facilitate determining how a semantic layer 9C-1 may direct a fact operational/data graph 9C-2 to retrieve information and/or prepare a portion of a response to a query that fulfills a preferred pacing of detail with the user. In embodiments, by linking such know-how with a context of a query, a know-how graph 9C-3 may also facilitate managing cadence and pacing of information detail. As an example, ensuring that users are delivered information at a level of detail that is consistent with a level of know-how determined from the context of a query may result in more rapid learning by the user and faster resolution of a problem for which the user has posed the query. The know-how graph 9C-3 may include pacing/cadence, rules, preferences, and exceptions. Pacing/cadence may be defined as hints to know-how. Rules may be defined as inference rules, relationship constraints, and hints on use of know-how to help improve agent's understanding of know-how. Preferences may be defined as company or user annotations in data to be used in interpretation of data (e.g., user A wants X data when asking generally for yearly sale information whereas user B wants Z data when asking generally for yearly sale information). Exceptions may be defined as exceptions of linked data rules that may occur based on ontology, exceptions for handling places where rules need to be ignored, or the knowledge where data breaks rules of ontology.

Figure 10A:
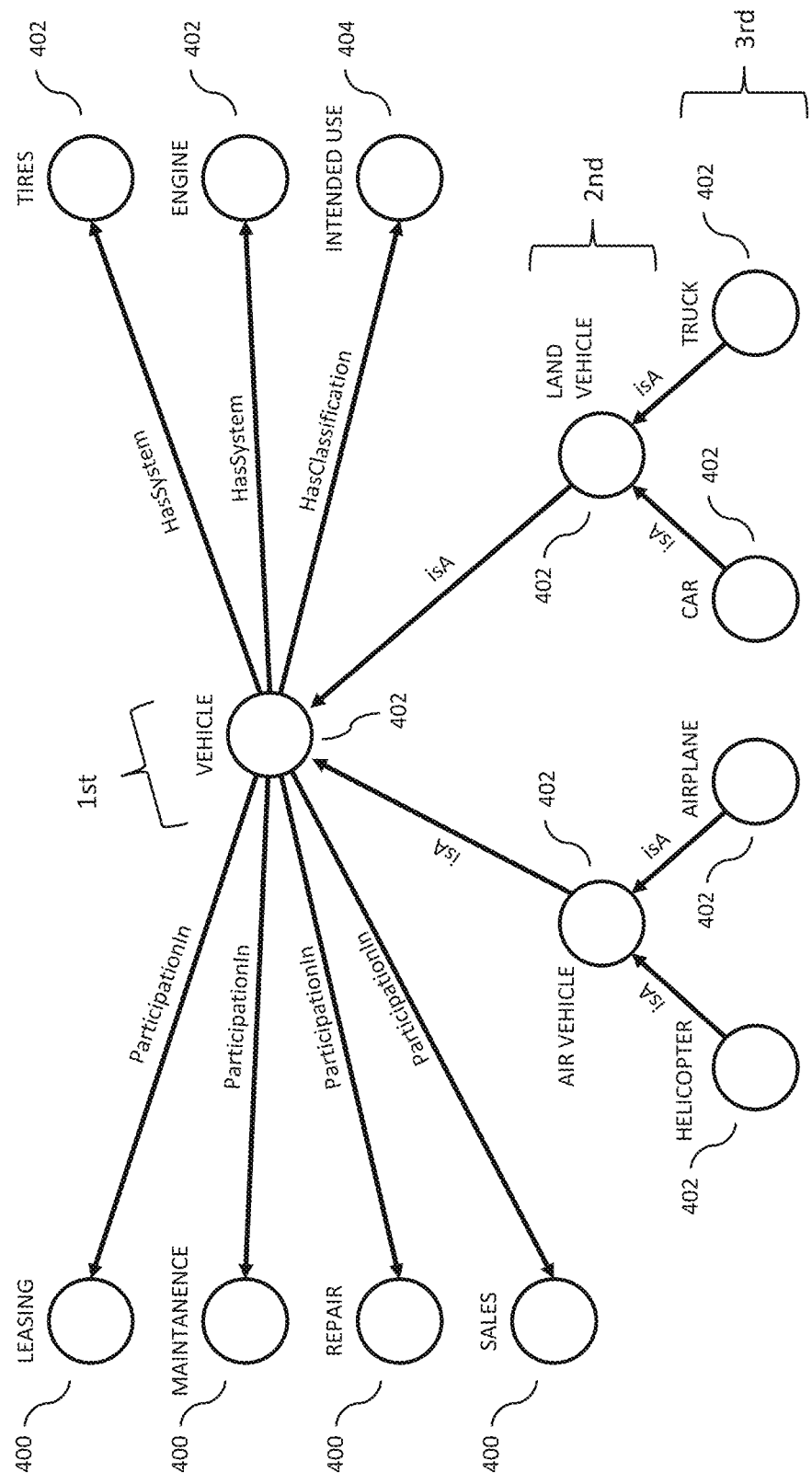
FIG. 10A is an example depiction of a global ontology/knowledge graph of the world model of FIGS. 9A-9B.

FIG. 10A is an example implementation of the global ontology/knowledge 132 of the world model 16 illustrated as a global ontology/knowledge graph. In this example, the global ontology/knowledge graph may include classes 402. These classes 402 may be organized into one or more hierarchies, where hierarchies may or may not imply inheritance relationships. For example, a vehicle class hierarchy 402 may define abstract concepts such as "land vehicle" and "air vehicle" or other subsets of "vehicle". Such classes 402 may include more specific classes such as "helicopter", "airplane", "car", and "truck". Other classes 402 (e.g., classes of things) may be related to classes based on inclusion relationships (e.g., "vehicle" may include "tires" and an "engine"). The global ontology/knowledge graph may include processes 400. The processes 400 may be related to classes 402 in that the class 402 (e.g., "vehicle") participates in the processes 400 (e.g., "leasing", "maintenance", "repair", "sales"). The global ontology/knowledge graph may include various methods of classifying entities within the system external from the class hierarchies, such classifications may be defined as sets of labels to be applied to classes, objects, processes, or properties of the same. In the illustrated example, "intended use" 404 is an example of a classification to allow set relationships defined on the example classes for what that vehicle may be used for.

Figure 10B:
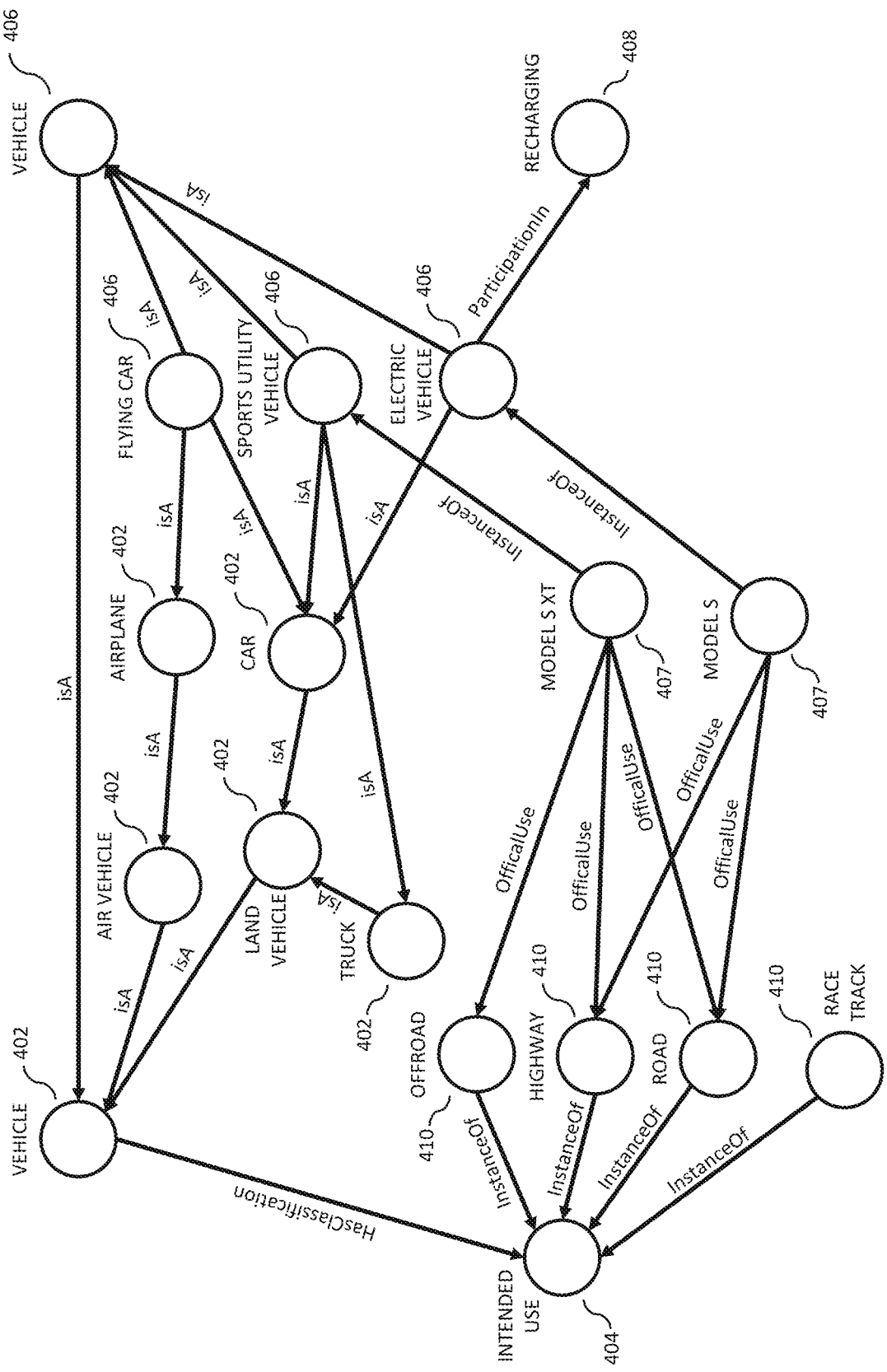
FIG. 10B is an example depiction of a company ontology/knowledge graph added to the global ontology/knowledge graph of FIG. 10A.

FIG. 10B is an example implementation of the company ontology/knowledge 130 of the world model 16 illustrated as a company ontology/knowledge graph. The company ontology/knowledge layer defines elements to the global ontology/knowledge graph such that new items are added to existing sets/collections/groups/hierarchies or may introduce new elements into the world model 16. In this example, the company ontology/knowledge graph may include company classes 406. Similar to classes 402, company classes 406 may add new hierarchies (e.g., "flying car", "sports utility vehicle", and "electric vehicle" may have inheritance relationships with "vehicle") or add to existing ones. Existing hierarchies may be related to company knowledge through direct and/or indirect relationships. Company knowledge may include the new examples of existing element types including the relationships that related the element types to the rest of the global and/or company knowledge. For example, company process 408 may be related to classes 406 in that the class 406 (e.g., "electric vehicle") participates in process 400 (e.g., "recharging"). The company ontology/knowledge graph may include specific instance classes 407 such as regarding a specific product (e.g., "Model S XT" and "Model S"). The company ontology/knowledge graph may define labels/properties to add to the domain of pre-defined classification systems (e.g., defining within "Intended Use" 404 the specific labels of company types of uses 410 may include "off-road", "highway", "road", "race track", etc.). The company types of uses 410 may be related as official uses to the specific instance classes 407 serving as part of the company master data or may be discovered transitionally during system use.

Figure 10C:
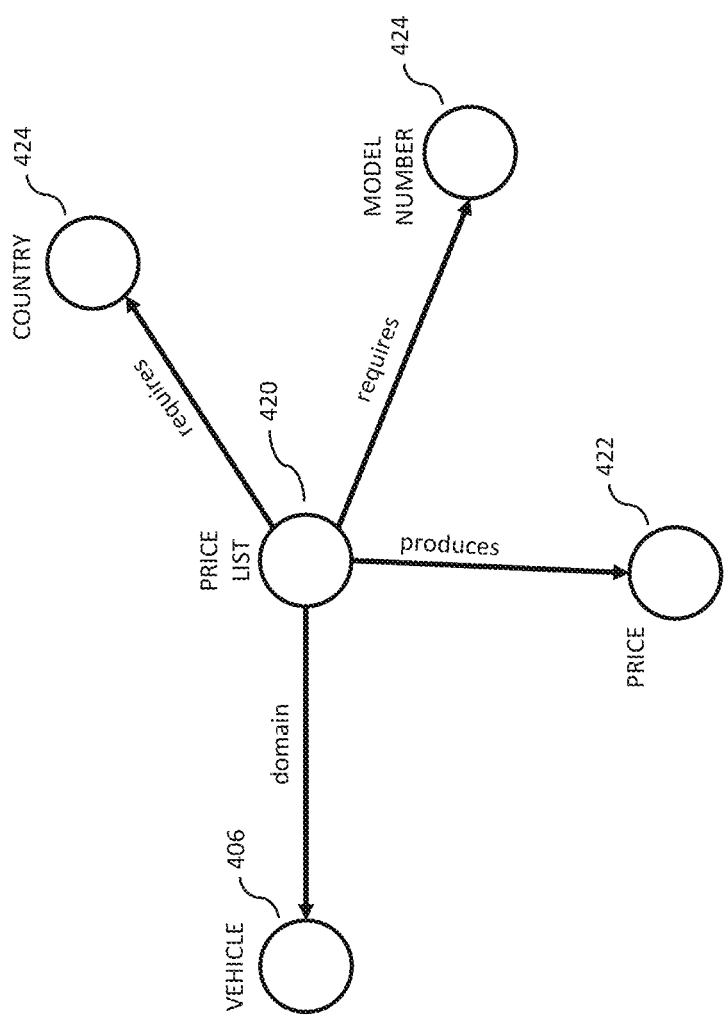
FIG. 10C is an example depiction of a linked data graph added to the company ontology/knowledge graph of FIG. 10B.

FIG. 10C is an example implementation of the linked data 124 of the world model 16 illustrated as a linked data graph added to the company ontology/knowledge graph of FIG. 10B. The linked data graph may include a linked data node 420 (e.g., "price list") that is injected or added into the company ontology/knowledge graph. The linked data node 420 may be a named link to the integration engine 30. For example, the linked data node 420 is added in relationship to the company class 406 (e.g., company definition of vehicle). In this example, the linked data node 420 may produce a property 422 (e.g., "price"). The linked data node 420 may require input parameters 424 (e.g., "model number", "country" or "region") in relationship to company where the input parameters may be required or optional and may or may not have a strongly defined data type.

Figure 10D:
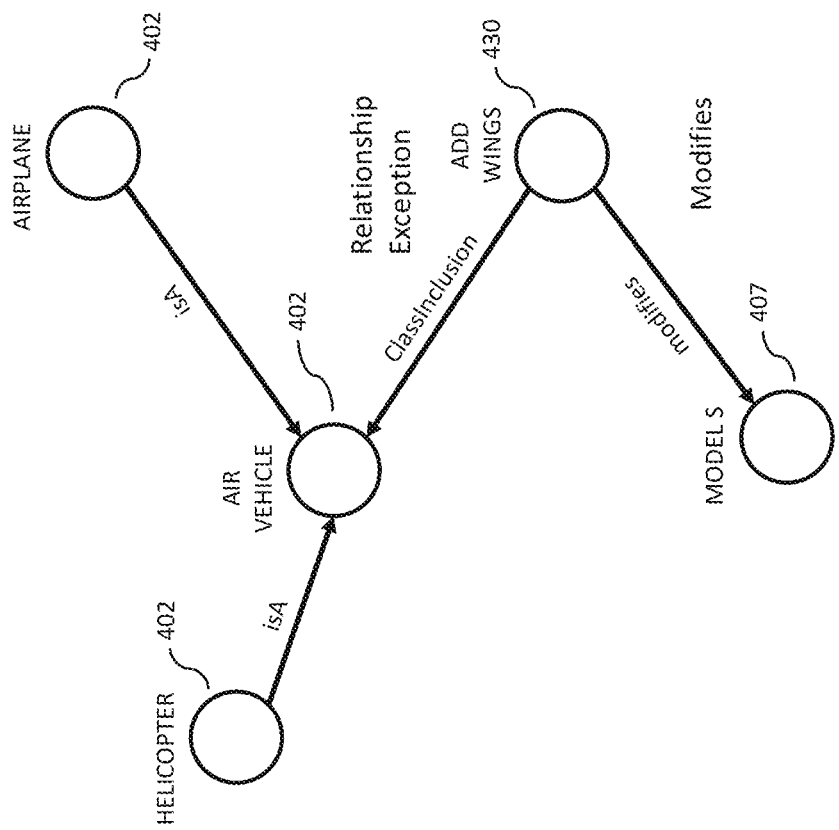
FIG. 10D is an example depiction of a user knowledge graph added to the global ontology/knowledge graph and company ontology/knowledge graph of FIGS. 10A-10B.

FIG. 10D is an example implementation of the user knowledge 120 of the world model 16 illustrated as a user knowledge graph added to the global ontology/knowledge graph and company ontology/knowledge graph of FIGS. 10A-10B. In this example, user generated content (e.g., add wings 430) may be added with respect to both the global ontology/knowledge graph and the company ontology/knowledge graph. The user generated content may modify the AI system's view of the world; for example, the specific instance class 407 (e.g., "Model S") may be considered an "air vehicle" if process "Add Wings" 430 is executed against it.

Figure 10E:
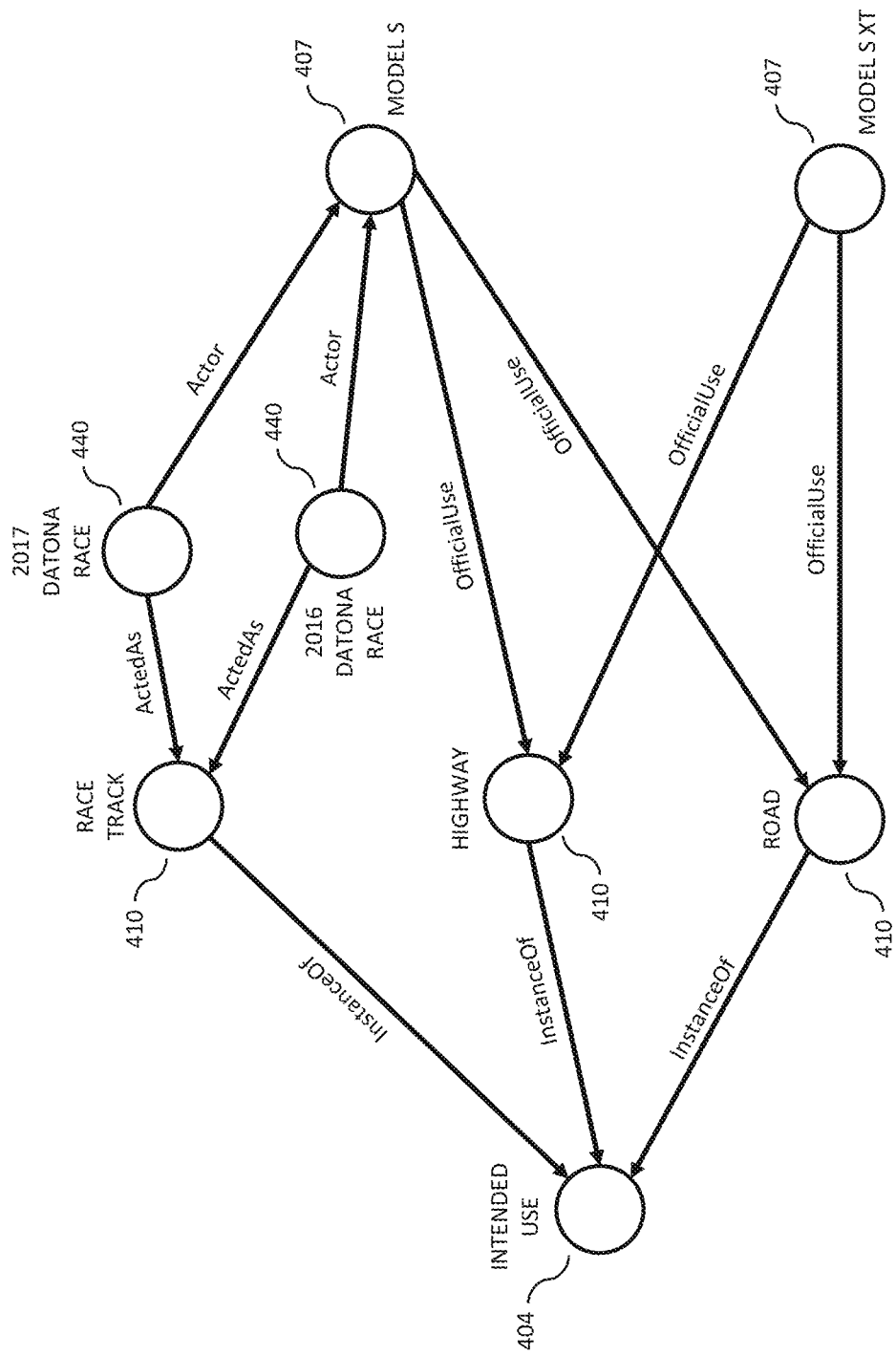
FIG. 10E is an example depiction of a transactional knowledge graph added to the global ontology/knowledge graph and company ontology/knowledge graph of FIGS. 10A-10B.

FIG. 10E is an example implementation of the transactional knowledge 122 of the world model 16 illustrated as transactional knowledge elements added to the global ontology/knowledge graph and company ontology/knowledge graph of FIGS. 10A-10B. The transactional knowledge graph may include a transactional event 440 (e.g., "2017 Daytona Race", "2016 Daytona Race") being added to the world view with respect to both the global ontology/knowledge graph and the company ontology/knowledge graph. A transactional event 440 may include a record of a specific instance of an event that happened and may reference a time, place, form, function and the like of the event. The transactional event 440 may give the system a specific case where a specific instance (or collection of instances) behaved in a way that was not documented in conformance with the rules of the ontology, e.g., the "published state". For example, transactional events 440 may imply a classification of type 410 (e.g., "race track") is related to specific instance class 407 (e.g., "Model S") participating in the event such that the system can infer that this classification sometimes applies to the instance (e.g., instance class 407) even though this is not officially stated in the "published state".

Figure 11:
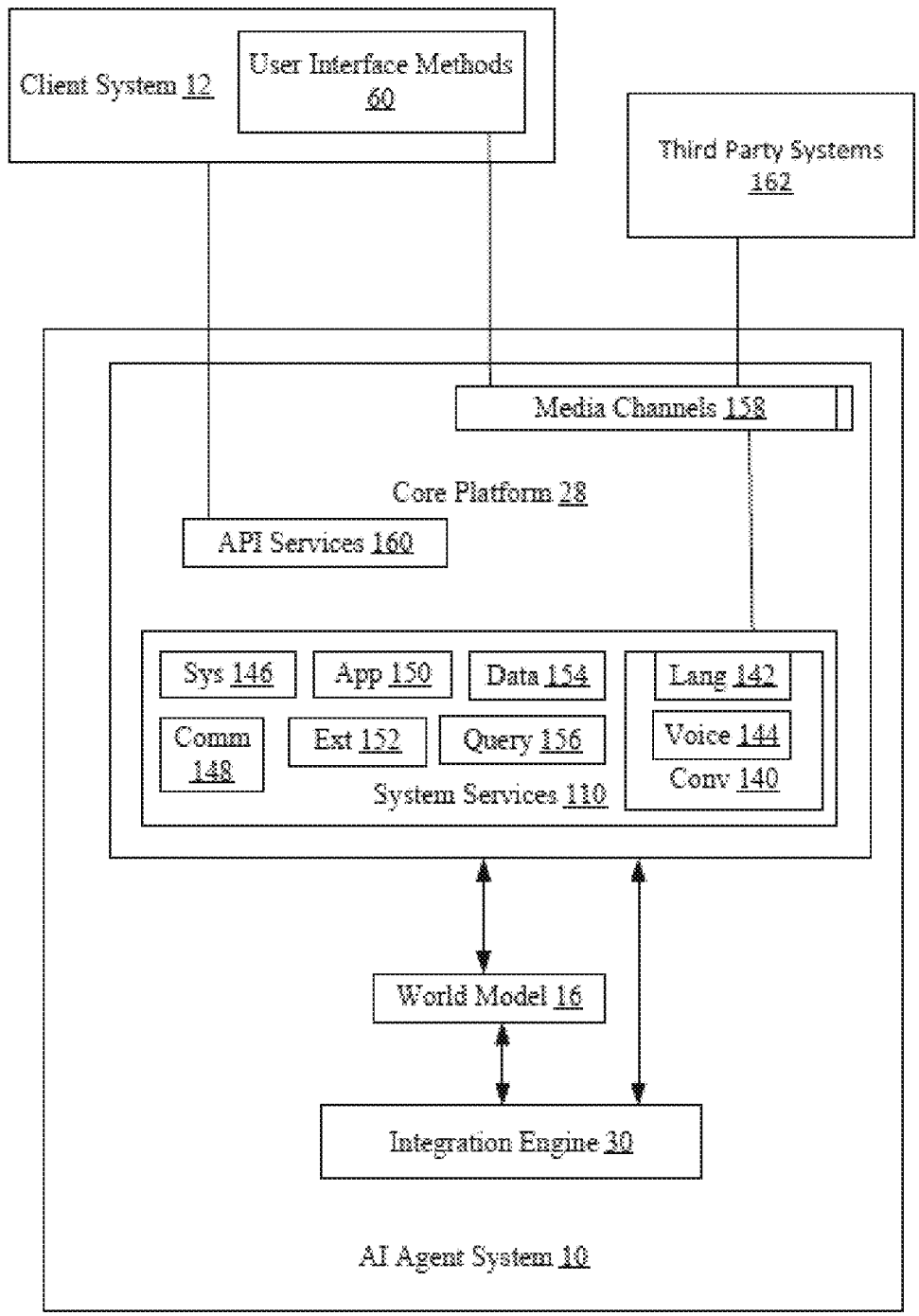
FIG. 11 is an example block diagram of the AI agent system showing API services and system services of the core platform interacting with the client system and third-party clients.

FIG. 11 shows the AI agent system 10 interacting with the client system 12 and one or more third-party systems 162 (e.g., SMS, Skype™, VOIP, Slack™, etc.). As described above, the client system 12 may use any operating system such as iOS mobile application software, ANDROID mobile application software, web browser software, or the like.

The system services 110 of the core platform 28 may include one or more categories of services or service groups such as: a conversational engine 140 (includes a language service 142 and a voice service 144), a system base service 146, a communication service 148, an application service 150, an external service 152, a data service 154, and a query service 156. These system services 110 may be configured as microservices. The core platform 28 includes media channels 158. The system services 110 communicate and engage with the client system 12 (e.g., media may be sent to or received by the user interface methods 60) and third-party systems 162 via the media channels 158.

Figure 12:
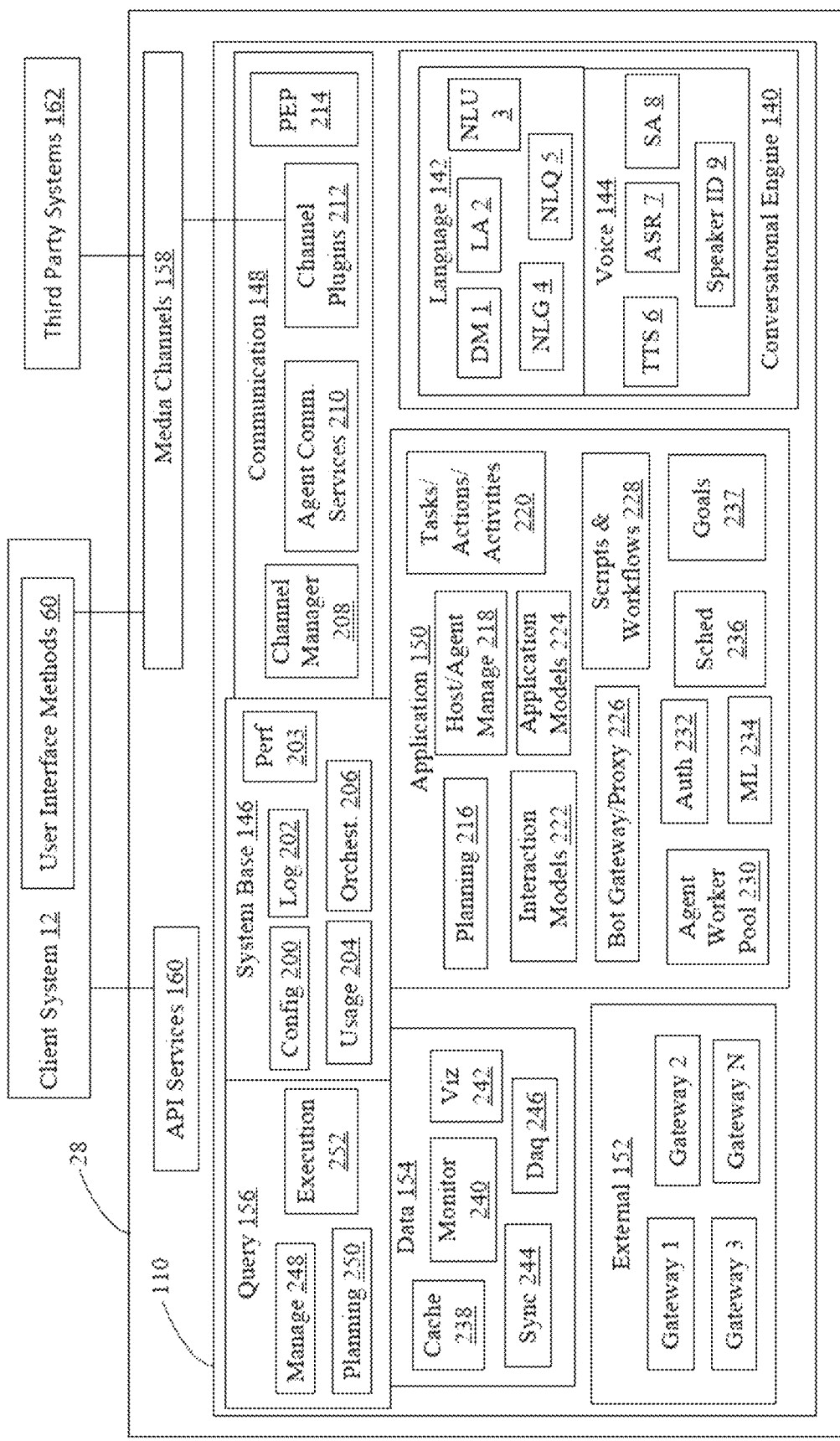
FIG. 12 is an example detailed view of the system services of the AI agent system in FIG. 11.

FIG. 12 shows a detailed view of example modules or components within each of the system services 110. Each service module block or component block provides functionality. Each block may be considered a sub-system to the overall service group with its own rules, contracts, models, etc.

In the illustrated example, the voice service 144 of the conversational engine 140 may include text to speech (TTS) 6 (e.g., TTS languages, natural text is synthesized and spoken or relayed back to user—may utilize unit selection, statistical parametric speech synthesis, and/or recurrent neural networks (RNN) to synthesize speech), automatic speech recognition (ASR) 7 (e.g., converts user's speech to text output), speech analytics 8, semantic analysis and speaker identification 9 (for identification and/or authentication e.g., uses the voice as a method of detecting or identifying who is speaking either to assist with identification of a user in general or specifically identify user within an authentication context, may include sentiment analysis—e.g., detect whether user is upset, yelling, sad, happy, getting frustrated, etc.).

The language service 142 may include a dialogue manager (DM) 1 (e.g., sophisticated, informed for making various decisions with respect to dialogue and conversation of AI agent system 10), language analytics (LA) 2 (e.g., use natural language analytics to understand natural language conversations in real time), natural language understanding (NLU) 3 (e.g., converts ASR hypothesis/text message to some form of representation adjusted to particular dialogue system; NLU may use Markov logic networks (MLN); and goal is to obtain intents from conversations), natural language generator (NLG) 4 (e.g., structure system action is converted to natural text by NLG; the NLG may generate the natural language utterance of system action generated by dialogue manager; and an example common approach is "template-based" NLG (using database of templates)), and natural language query (NLQ) 5 (e.g., used to understand questions, and map a voice input to words and a sequence of words to a question or bigger phrase—e.g., to such phrase the system may assign a command with optional parameters).

The system base service 146 may include configuration 200 (e.g., tiered configuration storage to allow data-driven customization of service behavior), logging 202 (e.g., distributed real-time logging framework), performance 203 (e.g., performance logging and measurement), usage 204 (e.g., tracking of user actions and system usage), and service orchestration 206 (e.g., deciding where services should run and how the services should be linked when working in a multi-central processing unit (CPU)/multi-host environment).

The communication service 148 may include a channel manager 208 (e.g., may be referred to as communication manager that manages communication across different media channels by using a driver for each type of channel), agent communication services 210 (e.g., to link communication sessions with a representation of the end client), channel plugins 212 (e.g., for adding new types of communication channels at runtime), and public entry points 214 (e.g., web service endpoints for communication from the client system 14).

The application service 150 may include authorization 232 (e.g., proving user identity and/or granting rights), scheduling 236 (e.g., scheduling and jobs), host/agent manager 218 (e.g., agent container), tasks/actions/activities 220 (e.g., creation and/or management of tasks, actions, activities, and the like), scripts & workflows 228 (e.g., workflow such as workflow modeling and execution as well as scripts e.g., script hosting), interaction models 222 (data or script driven recipes for coordinating single user and multi-user communications that may span one or more actual usage sessions), application models 224 (datasets related to custom usage of the platform), bot gateway/proxy 226 (e.g., bot proxy service for connecting to external/third party agents/bots), agent worker pool 230 (a collection of client system proxies/representations ready to receive incoming requests), planning 216 (algorithms/logic for deciding how to break goals into executable tasks), goals 237 (abstract representation of system-level intents given by a user that may require planning in order to execute), and machine learning (ML) 234 (e.g., ML may be used in ingestion, search, query, dialogue manager, ASR, embedded voice, user management, etc.).

The external service 152 may allow for the deployment of any number of custom gateways (e.g., denoted as Gateway 1, 2, 3 . . . N) that represent services located within the enterprise system 14 and/or located in other external services.

The data service 154 may include cache 238 (e.g., platform cache), synchronization 244 (e.g., data synchronization—changes to the enterprise system 14 and enterprise data sources may be re-integrated into the world model 16 or in other data storage mechanisms of the AI agent system 10), monitor 240 (e.g., assign triggers to internal events, externally triggered events, state/data changes within the system, and/or changes to incoming data feeds being sent to the monitoring sub-system), viz 242 (e.g., data visualization and rendering sub-system), and daq 246 (e.g., data acquisition/data collection sub-system).

The query service 156 may include management 248, planning 250, and execution 252 functionality of queries. Management 248, planning 250, and execution 252 act as sub-processes within query service 156.

The AI agent system 10 may utilize deep machine learning (e.g., a deep neural network (DNN)). For example, DNN may be used with language service 142 and voice service 144 of conversational engine 140 (e.g., DNN used with ASR 7 and dialogue manager 1) in one or more steps of speech-related processing. In another example, a mix of DNN and traditional techniques may be used with the language service 142 and the voice service 144 of conversational engine 140. Compared to conventional approaches, DNN-based approaches provide advantages of removing some manual development of components by simplifying the pipeline and making the pipeline more uniform.

The dialogue manager 1 provides several features with respect to the entire AI agent system 10. The dialogue manager 1 may use three major sources of information in order to make decisions. The dialogue manager 1 may have its own "Belief State" to determine, for example, understanding of what is going on and what is being said (e.g., what is user doing?). The dialogue manager may use "Context of Conversation" to determine, for example, who and where the user is, as well as where the user fits in organization. The dialogue manager may also look to world model 16 to determine, for example, an understanding of ontology (e.g., what are languages and what are relationships between languages and data?) for making decisions.

In an example, the AI agent system 10 (e.g., using the dialogue manager 1) may track data differently based on classification of employee or level of employee (e.g., management vs. service). In another example, the AI agent system 10 may track context for user with embedded classification of user. In a further example, the AI agent system 10 may send an electronic package or kit of information to client system 12 based on this classification (e.g., sugar cane driver classified user). The electronic package or kit may include technical publications, videos, and/or tips about machine for a specific type of user (e.g., sugar cane driver's device). The electronic package or kit may be customized for each classified user (e.g., role or type of individual).

The system services 110 may use the communication service 148 to send data and information to and/or receive data and information from the client system 12 and one or more third-party systems 162. The communication service 148 may use channel plugins 212 to communicate data and information to the client system 12 and third-party systems 162 via media channels 158.

As shown in FIGS. 11 and 12, the core platform 28 may also include API services 160. The client system 12 communicates and engages directly with the API services 160.

Figure 13:
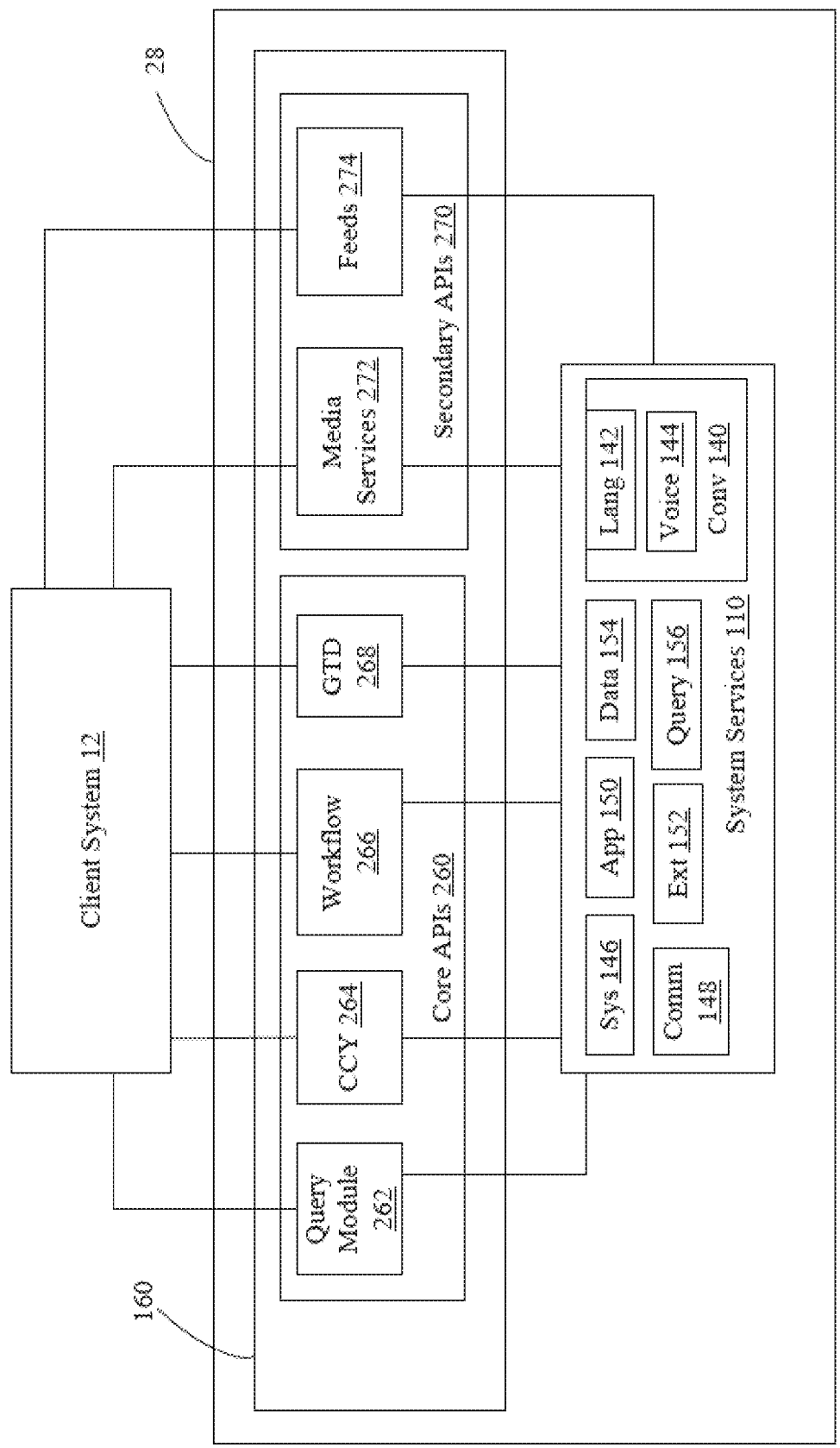
FIG. 13 is an example detailed view of the API services of the AI agent system in FIGS. 11-12.

FIG. 13 shows a detailed view of the API services 160 of the core platform 28. The API services 160 may include core APIs 260 and secondary APIs 270. The core APIs 260 and secondary APIs 270 may be connected between the client system 12 and the system services 110. The core APIs 260 and secondary APIs 270 use the system services 110 (e.g., control one or more system services 110) in performing various functions and tasks related to communications with the client system 12.

As illustrated, the core APIs 260 may include a query module 262, cloud calls you (CCY) module 264, workflow module 266, and get things done (GTD) module 268. These four core APIs define interaction boundaries and allow for clear understanding of what each core API provides in terms of functionality.

The query module 262 may be initiated by client system 12 to obtain information (e.g., to answer questions received from client system 12). The query module 262 may use the following services: understand a question or query from client system 12 by using NLU 3 and NLQ 5, connect to enterprise data (e.g., using world model 16), contextual disambiguation using the dialogue manager 1, use the NLQ 5 to find answers (e.g., within the world model 16), and/or perform context management using the dialogue manager 1 and the world model 16. The query module 262 may use analytics. In examples, the query module 262 may provide knowledge management to access company metrics, performance history, key performance indicators (KPIs), documents, and facts (e.g., using the world model 16). Thus, the query module 262 may function as a universal business intelligence (BI)—e.g., providing NLQ, KPIs/metrics/graphs, technical publications, predictive query cache, etc.

The query module 262 generally provides functionality of obtaining an answer to a question from the client system 12 (e.g., obtain answer from enterprise data of enterprise system 14 or obtain answers from world model 16) but also provides functionality, including, for example, adaptive, monitoring, visual/multi-media replies, best practices, predictive, and offline access functionality. For example, adaptive functionality may be a predictive agent functionality that continuously improves by monitoring what users ask and how data in the world model changes. For example, monitoring functionality may include asking to be kept informed of changes per a flexible rule system/suggestion engine (e.g., monitor if metric changes by more than 10%, summarize all sites that have more than a 5% sensor failure rate, etc.). For example, visual/multi-media replies may be answers summarized verbally where possible but also given through a mobile interface. Responses to questions may be: 1) Numeric Data, 2) Charts/Graphs, and 3) Document Excerpts. For example, best practices functionality may be system wide sharing of best practices in data access. Eventually, query module 262 may monitor what types of questions are asked, learn how much power users typically use and use this power information to offer better experiences to users, etc. The query module 262 may promote KPIs/views and monitor users that like these KPIs/views. For example, predictive functionality may provide predictive analytics to monitor system usage for determining what types of questions a user may ask in the future and is enabled to have this information ready for quick access even in offline situations. For example, offline access allows for response to user requests even when offline. In some examples, requests may be answered depending on caching and predictive query cache. In other examples, the query module 262 may be able to record the requests and follow up when service restores (i.e., offline to online). This also applies to caching of information in user interface of the client system 12 so that data can be available "on the go".

The CCY module 264 may be defined as an automating process of reaching out to a specific user or group of users in order to accomplish a company communication goal. Example of such goals (also referred to as activities) may include: notify a group of stakeholders that something has occurred, survey a group of users to collect information about one or more metrics/questions, and establish contact with users in satisfaction of the above using one or more communication channels. In addition:

Actions taken by CCY may be due to external systems requesting CCY follow-up or CCY users directly scheduling such activities.

Activities may be related to a time frame (e.g., "now" time frame—e.g., send this information to a person or group and retry until information is sent, per user preferences).

Activities may be loosely or directly scheduled.

More advanced recurring/periodic tasks may be part of GTD system scope.

The CCY module 264 may get in touch with stakeholders in real-time to support mission-critical notifications, approvals, omni-channel messaging, and the like. The CCY module 264 may collect information, validate compliance, and automate follow up communication. This is a communication framework to expose capability to the other systems. The CCY module 264 may provide the following services: initiates a communication, tracks user responses/status, reports back to initiator, tracks user preference behavior, sends audio, synthesizes audio, sends messages, sends media, etc.

The CCY module 264 may adjust user settings, e.g., tunable parameters such as channel preferences. Channel preferences may be initial channel selection preferences, preferences on channel escalation (perhaps by priority), timing (e.g., when generally available, when available for medium priority items, etc.), do not disturb settings, don't call me now settings, travel/time zone aware settings, etc.

The CCY module 264 may be used with the world model 16 to obtain unknown data. For example, CCY module 264 may be merged with data verification possibilities (e.g., contact user with high confidence to obtain missing information or contacting specific expert for answering certain questions to fill in unknown data in world model 16). The CCY module 264 may be used to fill in missing areas of a knowledge graph for the world model 16 (e.g., missing terminology or missing definitions of terminology). The CCY module 264 may be used with world module 16 to track things that are unknown and then take actions to resolve unknown information (e.g., possibly resolve unknown knowledge by using graph model).

The workflow module 266 may also be referred to as work flow virtual assistant—e.g., guided workflow. The workflow module 266 is a virtual assistant that may delegate work to and manages other automated systems (e.g., lease reservation system, a weather tool, a map tool, or a speech agent). The workflow module 266 may use the following services and functionality: access database/web service, provide contextual disambiguation using dialogue manager 1, and/or scripted customer specific actions. The workflow module 266 may use a front end to customer processes, services, databases through scripted workflows appropriate to the business task on hand. The workflow module 266 may add conversational dialogue flow around functions exposed by third party systems. The workflow module 266 may involve a custom mobile application that is domain/application specific. The large-scale goal may be to allow the front end of the AI agent system 10 to detect and communicate with provided/developed/licensed third party bots to allow greater reach.

In examples, the workflow module 266 may also define the disambiguation/drill down process for finding parts (e.g., from a parts database of the enterprise or company such as in enterprise system 14). The workflow module 266 may handle the take-an-order process flow and/or handle the follow-up to determine user satisfaction (which may alternatively or additionally be handled by GTD module 268). The workflow module 266 may function any time there is a series of steps needed to gather relevant information to a user's goal in order to have an external system act on that goal/intent.

The GTD module 268 may be defined as an in-depth system for managing group and individual goals, structuring plans around the execution of these goals, and workflow/communication procedures for ensuring the steps in a plan are handled. In an example, the GTD module 268 is a system module for capturing, anticipating, adjusting, and managing group and individual goals, including documenting the goals, timeline, steps, and stakeholders; updating & monitoring KPIs, action items and status; proactively checking in/updating/motivating/training/reminding stakeholders; tracking progress and statistics regarding the goals, and executing upon commands and workflow procedures that help get the goals accomplished. The GTD module 268 may use the following services and functionality: access database/web service, provide contextual disambiguation using dialogue manager 1, and/or scripted customer specific actions.

The GTD module 268 may track user goals with ability to measure progress towards goals. The GTD module 268 may allow users to setup projects they are working on with other users, invite/assign users, and may then track progress on elements of projects. The GTD module 268 may allow coaching processes as a project type (e.g., defining a behavioral change/outcome with steps the user should be doing towards that goal; missing a task is possible—not all tasks need to be completed, e.g., user should drink water daily, but if they don't, GTD module 268 tracks/monitors tasks but does not keep repeating a reminder to the user to drink yesterday's water. The GTD module 268 may allow compliance tracking as a project type (e.g., ensure business processes are being followed, sending notices/reminders when tasks are not done, etc.). When something has occurred (an incident), the GTD module 268 may coordinate and monitor that activities in response to the occurrence or incident are coordinated and acted upon (e.g., server outage may require someone to reset a router; sensor faults at a water treatment plant may need physical attention; and disaster has occurred, management needs to be notified, or disaster recovery (DR) plan may need to be initiated or put into action).

The secondary APIs 270 may include media services (e.g., recording of audio, distribution of images from client system 12) 272 and feeds (e.g., incoming data streams from client system 12 to pass to monitoring) 274.

Figure 14:
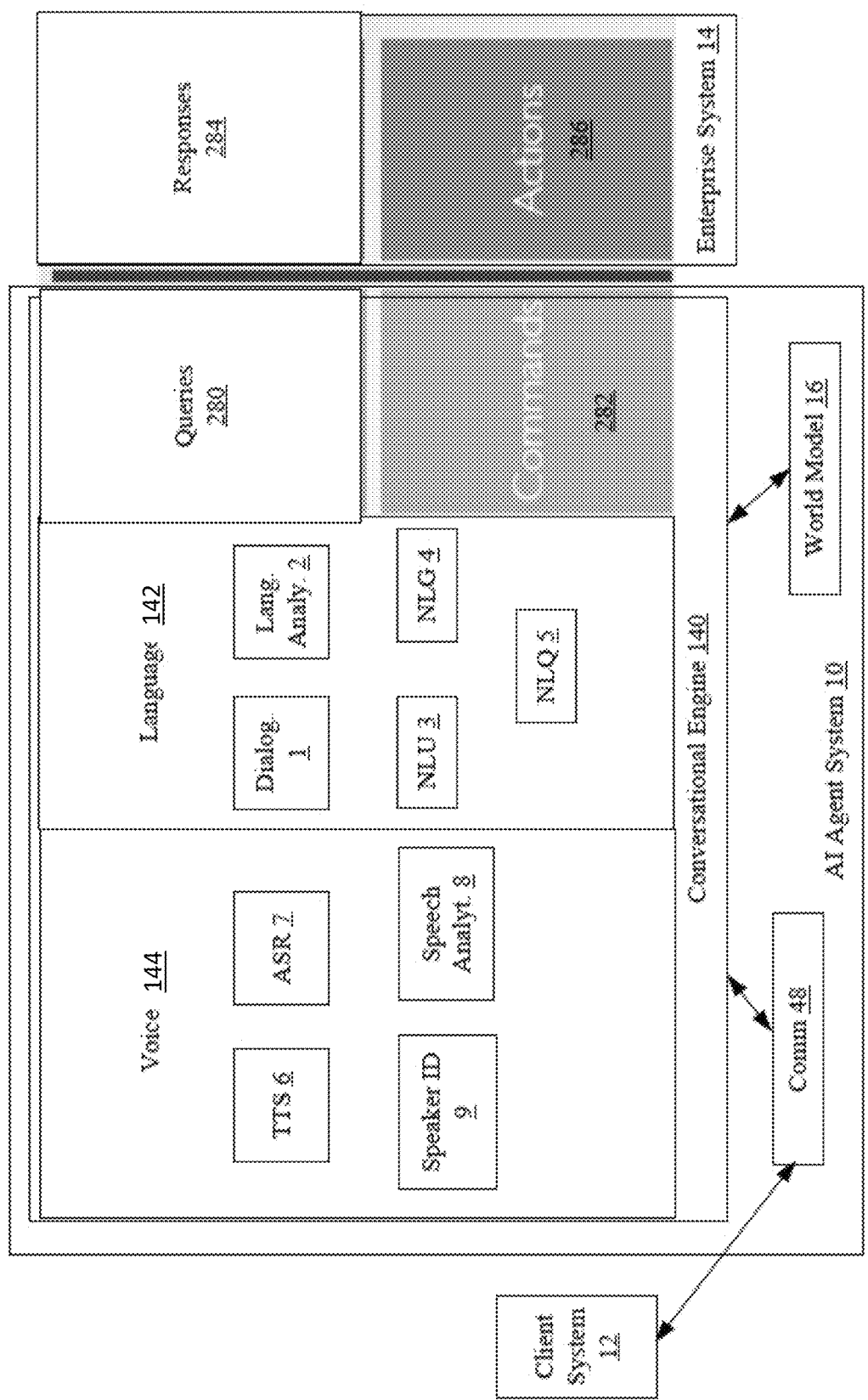
FIG. 14 is an example block diagram of a conversational engine of the AI agent system split between queries and commands as well as the enterprise system split between responses and actions.

FIG. 14 illustrates an example of a dialogue schematic showing the conversational engine 140 interacting with the client system 12 and enterprise system 14. As shown, the voice and language services 142, 144 of the conversational engine 140 may be split fundamentally between queries 280 and commands 282. The conversational engine 140 obtains questions from the client system 12 via the communication service 148. The voice and language services 142, 144 are configured to convert the questions to queries 280 (e.g., queries 280 are based on questions asked by user). In some examples, the voice and language services 142, 144 may convert the queries 280 to commands 282 (e.g., query commands based on questions asked by user). The conversational engine 140 may engage the enterprise system 14 directly to obtain responses 284 or obtain responses 284 indirectly from enterprise system 14 via world model 16 (e.g., looking to world model 16 for responses 284 to queries 280). For indirect example, the AI agent system 10 may use the world model 16 to engage with enterprise 14 for obtaining responses 284. The conversational engine 140 may engage the enterprise system 14 with commands 282 or queries 280 that are converted into actions 286 by the enterprise system 14 (e.g., conversational engine 140 sends command 282 to obtain action reminders on company projects and enterprise system 14 executes this command as an action 286 where the action reminders are obtained e.g., in weekly, monthly, or yearly reports). In another example, the conversational engine 140 may generate commands 282 directed at enterprise system 14 to obtain information (e.g., responses 284). The conversational engine 140 may receive enterprise directed actions 286 from the enterprise system 14 that the conversational engine 140 can execute with the client system 12 (e.g., sending message, such as company alert, to employee in voice or text form). In general, actions 286 may also include setting up a meeting, generating a report and sending the report to a company department, etc. In another example, the conversational engine 140 may convert actions 286 (e.g., on enterprise system 14) into commands 282 (e.g., on AI agent system 10) that are intended for use (e.g., forward 282 notifications or reminders to client system 12). In another example, the AI agent system 10 may use the world model 16 to engage the enterprise system 14 to obtain actions 286. In another example, the conversational engine 140 may generate commands 282 directed at the world model 16 to obtain information (e.g., responses 284 or actions 286 that the world model 16 captured from the enterprise system 14).

In an example, the conversational engine 140 may capture a question using TTS 6 (e.g., synthesize question to be sent to client system 12) or ASR 7 (e.g., recognize question received from client system 12). The conversational engine 140 may use the NLU 3 to understand the question such as intent of question. Also, the conversational engine 140 may use the NLQ 5 to generate a query. The conversational engine 140 may refer to world model 16 (e.g., semantic data model) for guidance and/or for determining an answer to a question. The conversational engine 140 may obtain answers directly from the enterprise system 14 and may then provide the answer using voice or text to the user via client system 12.

The voice and language services 142, 144 may provide a waterfall process (e.g., question and answer methodology). The voice and language services 142, 144 may produce a lattice of potential things that could be said (e.g., lattice is unique in combination with world model 16). For example, computer has a mathematical space based on probabilities regarding language that the user could potentially say—what can be said is based on grammar of enterprise system 14 and world model 16. The dialogue manager 1 may determine whether inputs are questions 280 (does dialogue manager 1 need to get an answer?) or commands 282 (does dialogue manager 1 need to provide actions?). The voice and language services 142, 144 may include a questions module that can take input texts, use world model 16 to look for data sources that can address world model 16, and then work through a candidate set of questions (also called intermediate question representation (IQR)). Using world model 16 may include using graph pattern representation—looking at pattern (e.g., user looking for missing pieces of information in the context of these connections between information). The confidence factor (as described above) may be produced based on systems known terminology, known language, known grammar, and world model 16 (how confident is AI agent system 10 that user asked question known by dialogue manager 1 otherwise AI agent system 10 asks follow-up questions to narrow down which question is being asked—thus determining which answer source is to be queried). Once question/answer source is determined, then AI agent system 10 may move to enterprise data to answer the question (or look to world model 16 to answer the question). In an example, a semantic group is queried first in order to partition it out into sources it needs.

Another example uses a question module for collecting questions over time. This deals with anticipating what users are going to ask and how they are going to ask it. Over time, the AI agent system 10 may build a warehouse of questions. Collecting questions over time enables the AI agent system 10 to identify areas that have not been tapped. The AI agent system 10 may collect questions by giving user answers and asks users for questions via client system 12. The AI agent system 10 may also include receiving comments from users such as what to know about answers as well as tips that may be used to build a knowledge base which enables the AI agent system 10 to become smarter (i.e., accumulate larger knowledge base).

The world model 16 also includes questions 280 and related question information e.g., how many times questions are asked provides anchor point for recognizing questions and answers (as well as recommendations that come from users in certain areas such as someone asking questions in management vs. service workers asking question). Information relevant to management may be different from information relevant to service workers for same question. Models in graph databases distinguish between knowledge relevant to service workers vs. knowledge relevant to management. The AI agent system 10 may keep unstable data in graph models of world model 16 and keep reinforcing it until data becomes more stable within graph models.

The illustrated example of FIG. 14 provides one version of dialogue between the conversational engine 140 and the enterprise system 14. As appreciated by one of ordinary skill in the art, other types of speech dialogue or conversational dialogue may be implemented. An exemplary speech dialog/conversational dialogue is further shown in FIG. 15.

Figure 15:
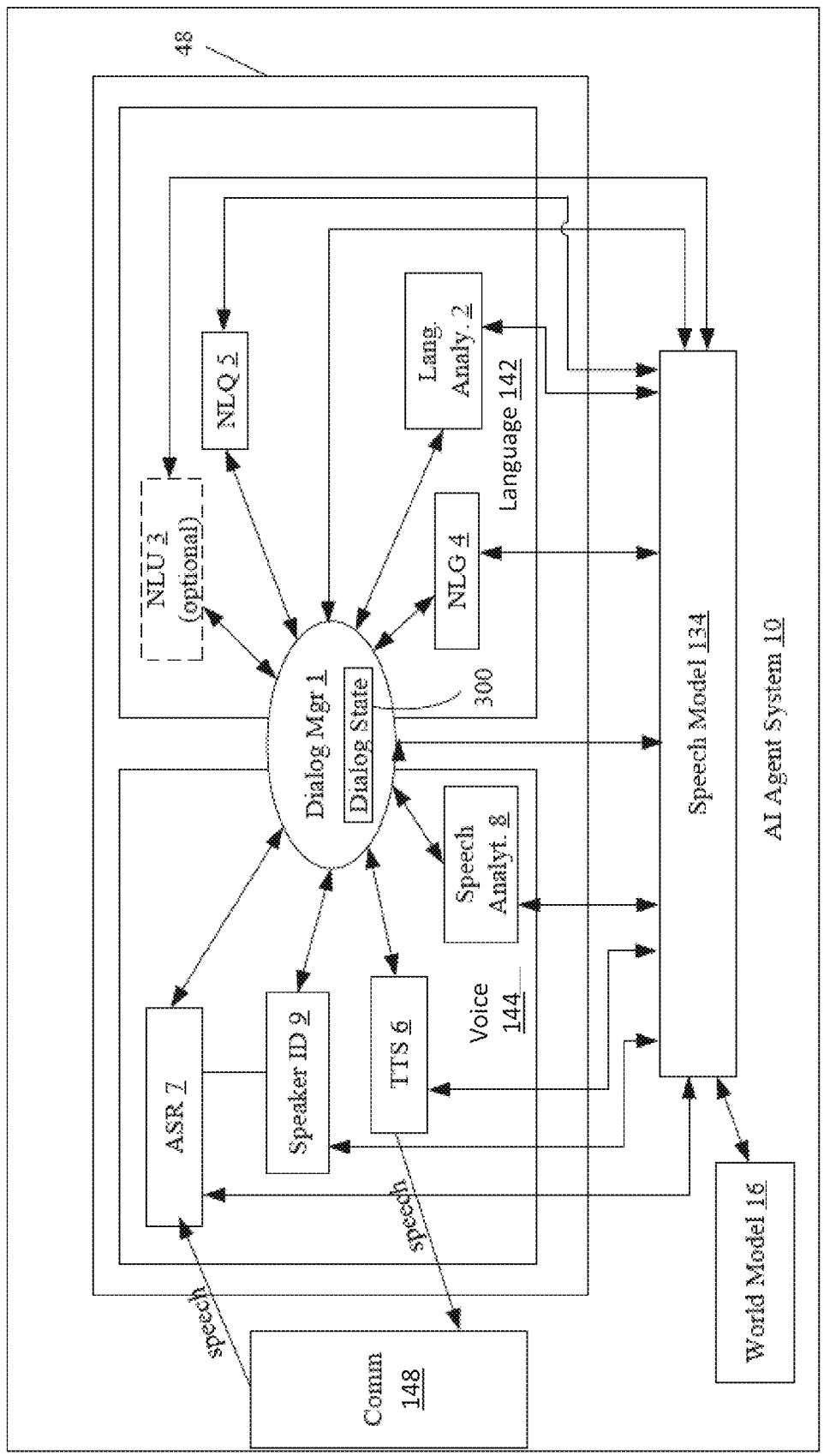
FIG. 15 is an example flow diagram for a dialogue manager having a dialogue state showing interactions of the language and voice services with the dialogue manager and a speech model.

FIG. 15 is flow diagram showing the interaction of the different voice services 144 and language services 142 with a dialogue state 300 (e.g., "Belief State" described above) of the dialogue manager 1 based on knowledge received from the speech model 134 (also from world model 16). The dialogue manager 1 may update the dialogue state 300 and generate a "system next action" given the previous dialogue state 300 progress. The dialogue manager 1 may continue to track the dialogue state 300 e.g., watch the dialogue progress and monitor or track important information informing the dialogue state 300, or as a probability distribution over all possible dialogue states 300 called the "Belief State". Bayesian and Dempster-Shafer theory (DST) (e.g., "Bayesian networks") may be used for the belief state tracking, RNN DST (e.g., "Recurrent neural network" with N-gram features from n-best ASR lattices) may be used, Ranking-Based (RB) DST may be used (e.g., possible dialogue states 300 are ranked and top state is chosen), discriminative model tracking DST may be used (e.g., generalized linear regression model) and is trained to update the belief state (e.g., outperforms heuristic rules), and/or long short memory recurrent neural networks (LS™) may be used. The dialogue manager 1 may act upon the dialogue state 300 to generate the next system action (e.g., approaches to dialogue policy).

As illustrated, the voice and language services 142, 144 interact with the dialogue state 300 of the dialogue manager 1 as well as the speech model 134. Also, the dialogue manager 1 interacts with the voice and language services 142, 144 and the speech model 134 interacts with the voice and language services 142, 144. The world model 16 may interact and update the speech model 134 over time.

For example, the dialogue manager 1 may use the ASR 7 to recognize speech (e.g., recognize questions from users in form of speech) from the communication service 148 that was received from the client system 12. The speaker identification 9 may interact with ASR 7 to identify the user or ASR 7 may be used by itself (without speaker identification 9) to identify a user. Also, the speech analytics 8 may be used to extract information from the speech. In other examples, the ASR 7 itself or natural language understanding (NLU) 3 itself or ASR 7 and NLU 3 in combination may provide the same functionality of extracting information from speech. The speech model 134 may be used to assist ASR 7, speaker identification 9, NLU 3, and speech analytics 8 with each respective function. Dialogue manager 1 interacts with these modules (e.g., ASR 7, speaker identification 9, NLU 3, and speech analytics 8) of the voice service 144 such that the dialogue state of dialogue manager 1 may be changed or impacted and such that the dialogue manager may direct or control these modules of the voice services 144.

The dialogue manager 1 may direct natural language query (NLQ) 5 to understand the question from the user. In other examples, the functionality offered by the NLQ 5 in understanding questions may be provided by the NLU 3 and dialogue manager 1 in combination. Also, the language analytics 2 and NLU 3 (where, for example the NLU may be optionally implemented as a separate element in language service 142 or may be included as part of the dialogue manager 1) may be further used to understand questions such as intents and/or entities behind the questions. The speech model 134 may be used to assist NLU 3, NLQ 5, and language analytics 2 with each respective function. Dialogue manager 1 interacts with these modules (e.g., NLU 3, NLQ 5, and language analytics 2) of the language service 142 such that the dialogue state of dialogue manager 1 may be changed or impacted and such that the dialogue manager 1 may direct or control these modules of the language service 142. The natural language generator (NLG) 4 may generate natural language in some examples from a knowledge base (e.g., based on answer to question obtained from world model 16). In other examples, the NLG 4 may generate natural language without use of a knowledge base. Based on generated natural language answer, the dialogue manager 1 may use the TTS 6 to generate speech (e.g., generated speech is an answer to question). The speech model 134 may be further used to assist the NLG 4 and TTS 6 with respective functionalities.

Figure 16:
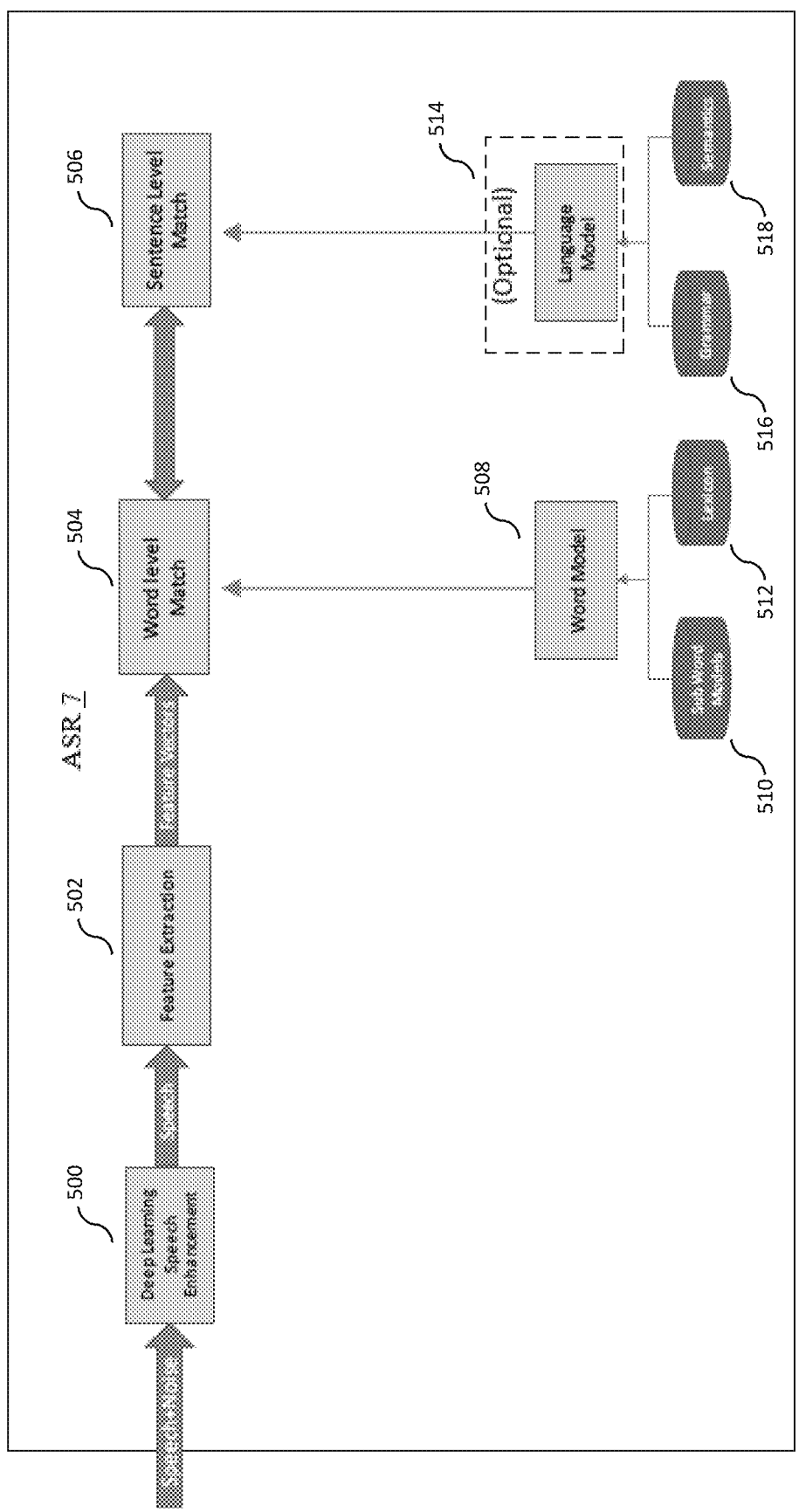
FIG. 16 is an example flow diagram for automatic speech recognition (ASR) utilizing deep learning speech signal enhancement.

FIG. 16 shows an example ASR flow diagram utilizing deep learning speech signal enhancement 500. This enhancement results in removal of background quasi-static low frequency noise and removal of dynamic impulse noise. Also, this enhancement allows the AI agent system 10 to provide an AI-based noise and speech activity classifier.

ASR typically includes feature extraction processing (in what is often referred to as the front end of an ASR system) as well as word-level matching (e.g., using the word model) and sentence-level matching using a language model (in what is often referred to as the back end of the ASR system, such as using functionality of a search engine). Referring to FIG. 16, in embodiments, the front end may be modified by adding deep learning speech enhancement 500 that includes an AI-based noise classifier that may include noise activity detection and the like. In embodiments, the AI-based noise classifier may compare audio samples with speech to audio samples without speech, thereby facilitating training a DNN to indicate if a microphone listens to relevant or irrelevant audio. The front end may also be modified to remove background quasi-static low frequency noise (e.g., measure or record environmental noise and monitor that an audio signal in the same environment is enhanced such that it contains a least amount (e.g., based on weighted energy) of environmental noise but a high amount e.g., maximum energy in the speech signal). For this type of optimization, parameters of decorrelation algorithms or the like may be tuned with DNNs, but DNNs may also be used to directly produce new audio samples corresponding to noisy audio input samples at the DNN. The front end is also modified to remove dynamic impulse noise (e.g., this type of audio enhancement may use historical knowledge). In embodiments, the ASR may be implemented with a knowledge-based system that knows in advance how to handle disturbing noises/sounds/distortions and what to do specifically in order to minimize or remove such noises/sounds/distortions to result in a better, enhanced, and cleaner audio signal. Exemplary embodiments may include: (A) If system notices clipping, the system may estimate how a signal should look in the clipped area; and (B) If the system detects a noise type sound (e.g., a hammer sound), the system may have knowledge of the hammer sound (e.g., knowledge in a noise inventory database) and remove this unwanted hammer sound from the speech signal. For this purpose, the system may be equipped with additional knowledge to: (a) identify a potential impulse noise problem (e.g., clipping, hammering, etc.) and, (b) apply a set of specific algorithms and sound samples to correct distortion problems (e.g. clipping), such as by removing the distortion/impulse noise from the recorded sound/speech sample by comparing it to noise samples in a database (such a noise sample database that may be static or dynamically updated). Different noises may be mixed and matched such that the system has a sufficient amount of data for enhancement so that there is enough variation to address a range of real world situations (e.g., comparing driving when windows are open, driving when windows are closed, clean voice signal). These exemplary embodiments may be used to resolve clipping of a signal due to noise.

As shown in FIG. 16, speech and noise may be received by a deep learning speech enhancement system 500, which filters out noise to output speech to a feature extraction module 502. The feature extraction module 502 outputs feature vectors to a word level match sub-system 504. The word level match sub-system 504 may communicate and/or synchronize with a sentence level match sub-system 506. The word level match sub-system 504 may be based on a word model 508 (e.g., based on sub word models 510 and a lexicon 512). The sentence level match sub-system 506 may be based on a language model 514 (e.g., based on grammar 516 and semantics 518). The language model 514 may be optional in this process as illustrated in FIG. 16. The sentence model match sub-system 506 may be based on a language model 514 that is derived from the semantics of a language. In embodiments, the language model 514 of the sentence model match sub-system 506 takes a sentence as input and gives a likelihood of observing that sentence (e.g., the sentence "the cat in the hat" is more likely than "cat the in hat the"). Pre-existing or known algorithms may be used for the world level match sub-system 504 and/or for the sentence level match sub-system 506.

FIGS. 17-21 show computer screen displays of a user interface implementing the AI agent system 10 with the client system 12 of the client device (e.g., mobile device).

Figure 17:
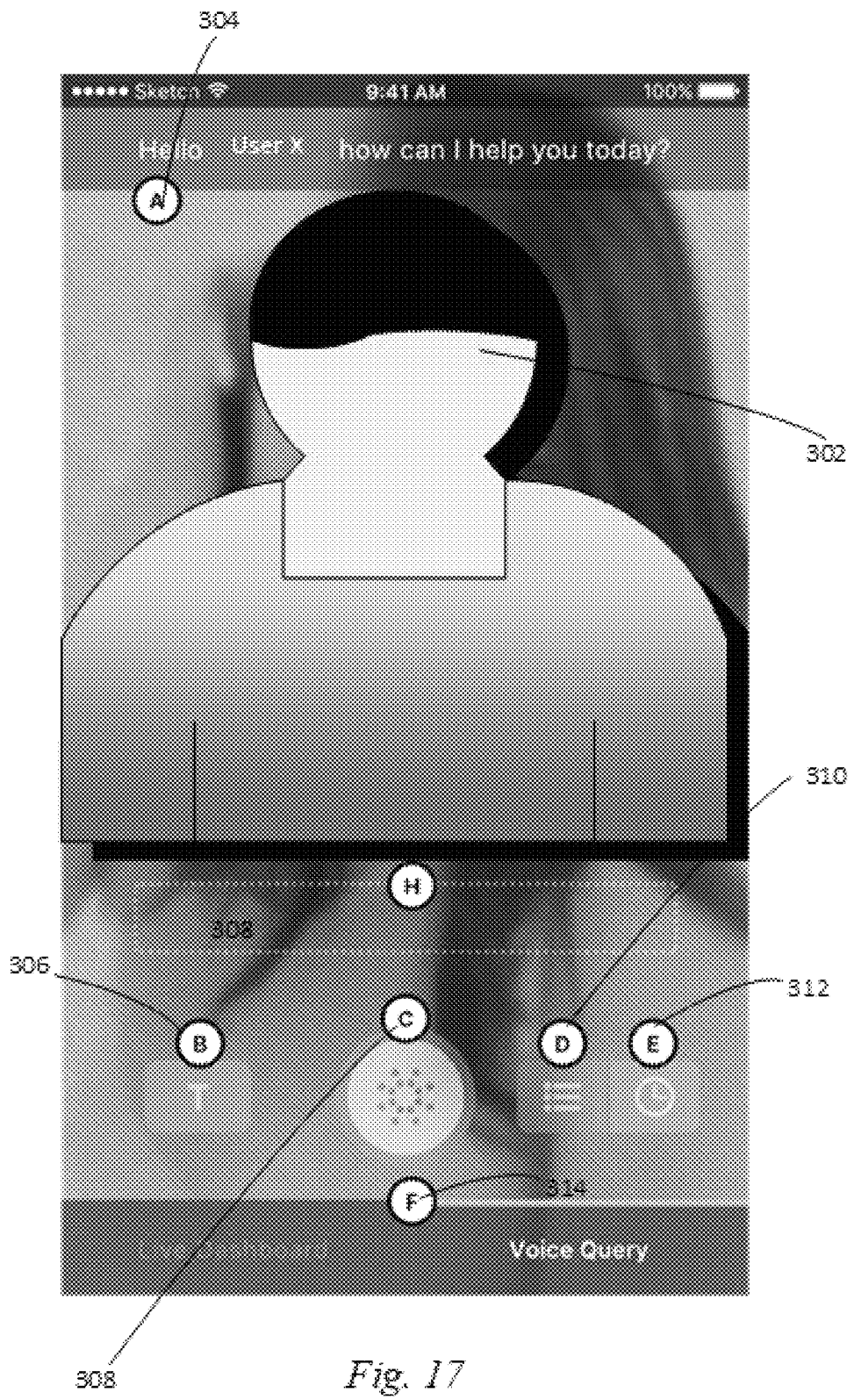
FIGS. 17-21 are example computer screen displays showing user interfaces that are implemented by the AI agent system.

FIG. 17 shows the user interface which may include a generic image of an AI agent 302. The interface also may include an agent text readout 304 (e.g., agent speaks to user by text—"Hello User X how can I help you today?"), a user input text button 306 (e.g., enabling user to input text) and a user voice input button 308 (e.g., user inputs request by voice). The interface also may include a keyword education 310 (e.g., define frequently used keywords), an interaction history 312 (e.g., history of user activity with AI agent system 10), and/or a tab navigation 314. These various interface elements utilize functionality from the system services 110, core APIs 260, and secondary APIs 270 of the AI agent system 10.

Figure 18:

FIG. 18 is another computer screen display showing a wind farm KPI application of the AI agent system 10. This screen shows a summary section in real time (as noted in screen as "live dashboard"). Some topics covered in the summary section include number of installations, current energy output, expected energy output, 14-day trend for energy output, energy total, energy today, operating hours, and service this year. Other tabs within this application may include "production", "maintenance", or "operation". As noted in FIG. 18, a voice query may be used in this section of the application.

Figure 19:

FIG. 19 is another computer screen display showing a production section of the wind farm KPI application that uses the AI agent system 10. Data shown in the production section is provided in real time (as noted in screen as "live dashboard"). Some topics covered in this production section include model of wind device (e.g., wind turbine), energy output for the wind device, hours available out of 24 hours, wind speed last 24 hours, capacity last 24 hours, and suggested actions (e.g., "call site manager"). Again, a voice query may be used in this section of the application.

Figure 20:
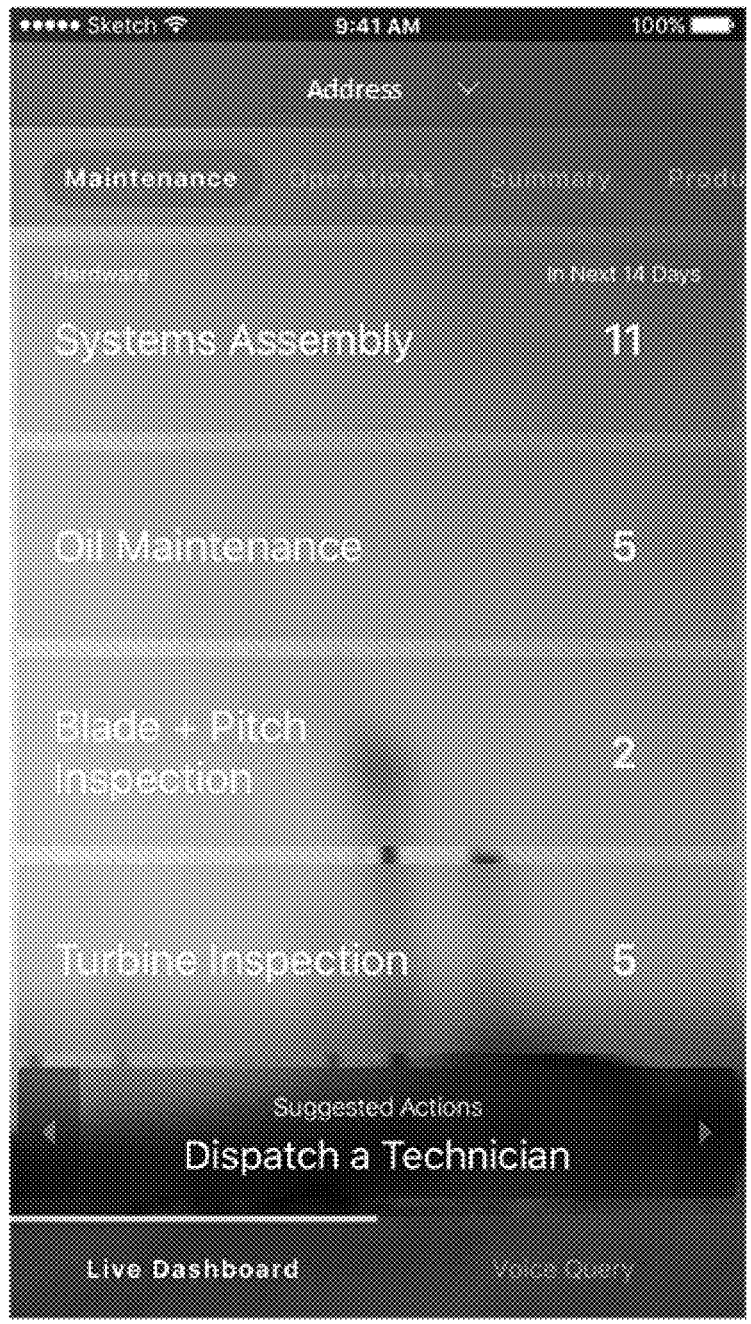

FIG. 20 is another computer screen display showing a maintenance section of the wind farm KPI application that uses the AI agent system 10. Information shown in the maintenance section is provided in real time (as noted in screen as "live dashboard"). Some topics covered in this maintenance section include hardware-related maintenance tasks that are recommended in the next 14 days such as systems assembly (e.g., due in 11 days), oil maintenance (e.g., due in 5 days), blade+pitch inspection (e.g., due in 2 days), and turbine inspection (e.g., due in 5 days). The maintenance section also includes a suggested actions sub-section (e.g., "dispatch a technician"). Again, a voice query may be used in this section of the application.

Figure 21:
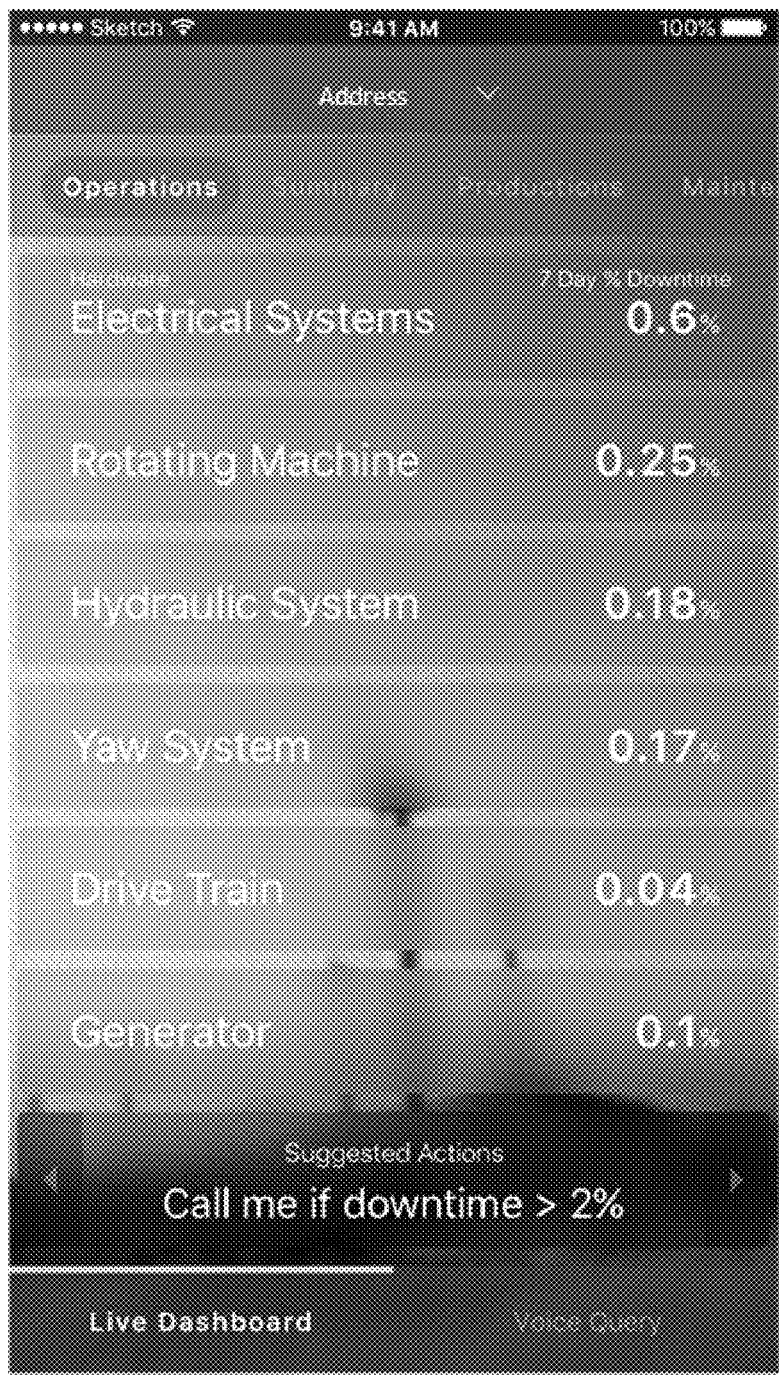

FIG. 21 is another computer screen display showing an operations section of the wind farm KPI application that uses the AI agent system 10. Information shown in the operations section is provided in real time (as noted in screen as "live dashboard"). Some topics covered in this operations section include hardware-related operations status in terms of 7-day percentage downtime such as electrical systems (e.g., 0.6% downtime), rotating machine (e.g., 0.25% downtime), hydraulic system (e.g., 0.18% downtime), drive train (e.g., 0.04% downtime), and generator (e.g., 0.1% downtime). The operations section also includes a suggested actions sub-section (e.g., "call me if downtime >2%"). Again, a voice query may be used in this section of the application.

In embodiments, the AI agent system 10 may ingest enterprise data such as operational data of the enterprise system 14. The AI agent system 10 may include a voice query and response subsystem (e.g., conversational engine 140, and the like) that ingests enterprise-wide structured data and unstructured data. In embodiments, "structured data" may be defined as any data that has been organized into a formatted repository (e.g., database) so that its elements can be made accessible according to a known taxonomy, hierarchy or other structure, such as data contained in relational databases, spreadsheets, and the like. Examples of "structured data" may include spreadsheets, data from machine sensors, and the like. In embodiments, "unstructured data" may be defined as information that does not fall under the "structured data" classification. Examples of unstructured data may include data that is not necessarily organized in a pre-defined manner, such as data not contained in a database, or data lacking some other type of data structure that facilitates readily understanding the type of individual elements contained within the data. Examples of unstructured data may include, without limitation many instances of books, journals, documents, metadata, health records, audio, video, analog data, images (e.g., photos and graphic images), files (e.g., portable document format (PDF) files and PowerPoint presentations), and other items containing unstructured text such as content of e-mail messages, web pages, word-processing documents, and the like. In embodiments, the AI agent system 10 may learn domain-specific linguistic data from the ingested data.

In an example, the AI agent system 10 may use the conversational engine 140 to ingest unstructured data such as images, frequently asked questions (FAQs), technical publications, etc. The AI agent system 10 may use the conversational engine 140 to ingest structured data types such as prices, part numbers, product specifications, table entries, financial data, schedule data, and the like. The AI agent system 10 may build a semantic representation (e.g., world model 16) from the ingested unstructured data and structured data.

In embodiments, the ingestion functionality allows the AI agent system 10 to be used with different companies in various industries. In an example of use of the AI agent system 10 for a set of enterprises, the AI agent system 10 may use the conversational engine 140 to ingest and scan enterprise data (e.g., operational data related to equipment, maintenance, pricing, customers, etc.) for each enterprise. As the ingested data is incorporated into the world model 16, the AI agent system 10 can continue to learn new types of industrial information. This industrial information can include information related to an automobile having an engine, drive train, wheels, etc.; a ship having a hull, engine, hydraulics, etc.; an airplane having wheels and a fuselage; etc. The AI agent system 10 may become faster and faster as it grows its world model 16 from ingesting enterprise data from each company. The world model 16 also provides the AI agent system 10 with a deeper understanding of industrial information as it grows from each ingestion of enterprise data. The world model 16 provides a semantic view of industrial information. The world model 16 may use machine learning to build its understanding of terms being ingested and their relationships based on knowledge gained from ingesting information from different types of companies or different products, such as from a single company or industry.

In a further example of the use of the AI agent system 10 working cooperatively with the world model 16 through operational-related data, the AI agent system 10 may be used in the airline industry to ingest and process information regarding the functionality of airline attendants, gate information and flight schedules, cargo and baggage information, reservation and check-in information, airplane availability and routing information, crew information, and the like. In embodiments, the AI agent system 10 may function analogous to an operational person to answer questions such as: "how many bags were left with flight?", "how many attendants are scheduled for flight?", "how many pieces of luggage had an error?", and the like. The AI agent system 10 can provide similar functionality in other industries by the AI agent system 10 navigating and getting answers for any user with respect to any industry operational data In embodiments, the AI agent system 10 uses the conversational engine 140 to ingest different types of unstructured data, such as whole image PDF data for voice queries, and the like. The AI agent system 10 uses the conversational engine 140 to ingest data points from a PDF for voice querying. The AI agent system 10 may ingest every single data element in the PDF and then converse based on this ingested data.

In embodiments, the AI agent system 10 may converse using ingested structured and unstructured enterprise data. For example, the AI agent system 10 may query a combination of unstructured data and structured data based on the world model 16. The AI agent system 10 may include a voice query and response subsystem (e.g., conversational engine 140) that ingests enterprise data (structured portions and unstructured portions) in the enterprise system 14 and enterprise data outside the enterprise system 14.

In embodiments, to enable conversation using unstructured data (e.g., documents), the unstructured data is run through NLU (e.g., NLU 3 of language service 142 within the conversational engine 140). The NLU 3 may bring in content, such as text and do at least one of topic modeling (e.g., breaking text into chunks for use in the semantic layer of world model 16) or process the content at the sentence level, where individual sentences are read and understood.

In embodiments, there are a variety of types of enterprise data. The enterprise data may be in different shapes and sizes as well as found in different storage locations and dispersed. The enterprise data may be interrelated and take on different forms and formats. Examples of types of enterprise data in various forms may include, but are not be limited to, relational data sources (e.g., tables), object-oriented databases, data warehouses (e.g., data cubes, two-dimensional data stores or multidimensional tables), service oriented architectures (e.g., messages, message driven interactions), data feeds, web services (e.g., service oriented architecture (SOA)), cloud native application, etc. These enterprise database sources may store the enterprise data in data lakes, nodes, edges (e.g., different formats for storing and talking about information), and the like. The enterprise database sources (e.g., SOA) may include different data repositories or storages such that each service uses the data repository directly. A service-based approach may include the AI agent system 10 breaking data into reusable components e.g., check order status, check credit, etc. The AI agent system 10 may use applications to talk to services that allow, among other things, standardization of the data repositories. This may help provide a layer of standardization of communication with respect to data of company, and the like. In embodiments, relational enterprise data may be found in tables with a structure. Data cubes may include enterprise data in N-dimensional tables. Web services (e.g., for SOA) may use functional level descriptions such as XML, or the like to define types of information in a way that another system can integrate to it at a functional level. In general, the AI agent system 10 may take ambiguous concepts and map them to real world concepts. In an example of mapping ambiguous concepts to real world concept, the world model 16 may describe relationships among terms, words and the like used within a business to facilitate, for example understanding how people use the words, terms, etc. and how the company uses the same terms, words, etc.

In embodiments, the AI agent system 10 may be applied in various types of applications based at least in part on its ability to ingest and converse with structured and unstructured enterprise data. Below are certain illustrative examples of these applications. Application examples of the AI agent system 10 for ingestion purposes may include a parts resume application, a repair options application, a parts management application, a sales readiness application, and a part set application. Other examples may include use of the AI agent system 10 for a tech publication voice search application, as well as for spare part search and ordering. Also, another example uses the conversational engine 140 in association with the AI agent system 10 to obtain 3000 questions from a company's tech pubs. The AI agent system 10 may use this type of ingested information towards building the world model 16.

In embodiments, the parts resume application includes taking a topic and learning various information about product part such as price, inventory, how much part costs, how part is transported, sub-parts, compatibility with other parts and equipment, whether the part can be put in third party machine, etc. The AI agent system 10 may ingest several questions (e.g., 1000 questions) about parts from a number of employees (e.g., 800 employees). A map of databases may be organized to answer all the questions. The AI agent system 10 ingests these questions over multiple databases. This may be applied to various industries and companies that deal with parts.

In embodiments, the repair options application involves ingesting a tech publication (e.g., an operational manual, technical manual, part performance data, and/or other references). For example, a customer may have bought a tractor and wants to equip it for moving snow. The customer wants to move parts out and use it to dig, or move things and use it to scrape. Performance conditions are assessed regarding the part and the vehicle (e.g., the threshold weight the vehicle can have before it impacts performance, e.g., how long can the customer use it). The AI agent system 10 provides application functionality that may give repair options and provide a quote on parts. The AI agent system 10 may provide an application with direct access to enterprise data.

In embodiments, the parts management application (e.g., a mobile application for construction industry parts) may be used to determine if promotions or sales are being offered. Also, this application may be used to find out what a part is if user knows part number (or vice versa). This application may be used to look at average utilization reports (how often a part should be replaced). Also, this application may be used to track the location of the part (e.g., is it nearby?), find attachments, compare attachments, save a favorite, create an account, etc. This type of application may be used with other companies that have several applications. For example, this type of application may be used as one interface to all of the company applications and lightweight directory access protocol (LDAP) can handle whatever the users want to know about.

In embodiments, a sales readiness application is provided. This application may be used to merge enterprise data such as report sales, sales analysis, and the like. This application may be used, for example, in the mining industry. The sales readiness application may use the AI agent system 10 to find out all customers that have equipment that has been idle, lubricants that need to be replaced, etc. The application provides the ability to schedule service to get a recommendation and to add service requirements to an aggregate service schedule of what needs to be done to get a fleet of multiple machines back into action. The application may also handle promotions and incentives. Then, the AI agent system 10 may communicate with the salespeople regarding what customers need to get their fleet up and running again. Several salespeople (e.g., 200 salespeople) are sent to, e.g., 2000 customers with a specific plan or dashboard. The application may include information about what has occurred and result of the meetings. The AI agent system 10 may use CCY for communication purposes. Enterprise data and third-party data (e.g., data maintained in business insights platforms such as Tableau™, Domo™, Alteryx™ Qlik™, and the like) may be put together and delivered through a user interface (UI). The AI agent system 10 may function as a UI on top of third party services (e.g., Tableau® services) and/or an enterprise system (e.g., recompiling output data under one UI).

In embodiments, the part set application may relate to hoses or couplings for a construction company. For example, this application allows the AI agent system 10 to perform a query for a specific type of company hose that may be used and compatible with a type of vehicle (e.g., truck).

In embodiments, methods and systems of an intelligent AI agent 10 may include configuring and ingesting unstructured data from a wide variety of sources, including enterprise databases, some types of streaming internet of things (IoT) devices, communications among workers, worksite infrastructure and equipment, system components, and others. In embodiments, methods and systems may include handling of specific types of unstructured data, such as dark data (e.g., contents in document-like format, in PDF format, or other formats, internal contents of audio and video files, contents of drawings and illustrations, and many others) or data that is obscured or "dark" to typical search functions, know-how (e.g., know-how about processes, procedures, systems, workflows and the like about an enterprise, its products, its equipment, its infrastructure, and the like, as well as trade secrets and other know-how), and the like. Also, in embodiments, methods and systems may include proactive solicitation and organization of the dark data, know-how and the like. In embodiments, the unstructured data may include an image, an audio segment, a video, a voice recording, a social media stream, a chat or instant message, an email exchange, a conversation communicated over a network, or unstructured sensor data streams (such as from IoT devices), output in various forms from workflows and various other types. Often the unstructured data is associated with an entity (e.g., a product, a worker, a role, or a part of an organization) and/or a workflow of an enterprise, such as a workflow associated with a topic that is relevant to an enterprise, or some part thereof.

In embodiments, unstructured data may be ingested from a plurality of sources embodying content relevant to an enterprise. Ingestion may occur by a variety of data communication and processing techniques, such as via one or more interfaces (such as user interfaces, including voice, touch and gestural user interfaces, among others, as well as by application programming interfaces, including interfaces to external systems). Ingestion may use extraction, transformation and loading (ETL) capabilities, via data connectors, brokers, bridges and the like, via receiving (such as by subscribing to) data pushed from event streams, publishing streams, feeds (e.g., RSS feeds), application programming interfaces and the like, by pulling data from application programming interfaces, by monitoring or polling data streams, by querying database systems (including distributed and cloud systems), by use of one or more services (such as services of SaaS, PaaS, IaaS and other providers) and the like.

In embodiments, ingesting may include ingesting the data directly into a world model 16 of an enterprise. Direct ingesting of data may allow the data to be accessed directly in the world model, such as through a knowledge graph of the world model and the like. In embodiments, ingesting may include ingesting a link to the data into the world model 16. Link-based ingesting of data may facilitate access to data that may be stored external to the world model. Rather than ingesting the content of an item into the world model, a link to the content may be ingested. This may be useful for large data content types, such as databases, and the like. This may be useful for data in an unstructured format, such as PDF and the like. In embodiments, the ingesting may include ingesting a link to a portion of the data and ingesting a portion of the data itself directly into the world model 16.

In embodiments, the ingested unstructured data may be processed with clustering or similarity techniques, such as similarity detection algorithms that may facilitate detecting similarity of portions of the data with at least one portion of at least one knowledge graph that may be associated with a world model 16 of knowledge of the enterprise. In embodiments, various techniques for similarity-based association or clustering of elements may be used to associate unstructured data elements with topics in at least a portion of a knowledge graph in a world model 16. These may include, without limitation: connectivity-based clustering techniques, such as hierarchical clustering, such as based on one or more distance metrics; centroid-based techniques such as k-means algorithms wherein a cluster is represented by a vector; distribution models and techniques where clusters are modeled using statistical distributions, such as multi-variant normal distributions, that may employ expectation maximizing algorithms; density models, such as Density-Based Spatial Clustering of Applications with Noise (DB SCAN) and Ordering Points to Identify the Clustering Structure (OPTICS) models that define clusters based on density in a data space; sub-space, bi-clustering, co-clustering and multi-model clustering models and techniques, such as where clusters are modeled with both cluster members and relevant attributes; group models; graph-based models; and neural models (including unsupervised neural models, such as self-organizing maps, as well as neural networks that implement principal component analysis and/or independent component analysis). In certain preferred embodiments, a graph-based model may be used for clustering where connected subsets of nodes in a graph are considered a form of cluster, such as clique models and quasi-clique models (where connectedness is not strictly enforced) like the Highly Connected Subgraphs (HCS) clustering algorithm.

In embodiments, similarity may be based on comparisons of words, phrases, or other symbols in the data to such elements in the knowledge graph, and/or based on comparisons of phrases in the data to phrases associated with a node in the knowledge graph, and/or based on comparisons of portions of the data to information that may be descriptive of at least one of a node and a sub-graph referenced in the knowledge graph.

The ingested unstructured data may be organized to facilitate aligning it with a business-specific topic referenced in the knowledge graph, such as a product or service of the enterprise, an item or equipment or infrastructure of the enterprise, a business activity of the enterprise, a role of the enterprise, or the like, based on the detected similarity. In embodiments, the portion of the knowledge graph may be a node that references a semantic topic. In embodiments, the portion of the knowledge graph may be a sub-graph that references a semantic topic. In embodiments, organizing may include mapping the data to a portion of the world model 16. In embodiments, organizing may include determining relationships among portions of the unstructured data. In embodiments, organizing may include determining relationships between the unstructured data and at least one knowledge domain referenced by the world model 16. In embodiments, organizing may be based on semantic web techniques that facilitate alignment of sources of the unstructured data. In embodiments, organizing may include determining at least one fact expressed in the unstructured data. In embodiments, organizing may include determining at least one entity expressed in the unstructured data. In embodiments, organizing may include determining at least one logical expression in the unstructured data. In embodiments, organizing may include configuring at least a portion of the unstructured data into one or more knowledge classes described in the world model 16. In embodiments, organizing may include configuring at least a portion of the unstructured data into one or more processes that relate to one or more knowledge classes. In embodiments, organizing may include configuring at least a portion of the unstructured data into one or more processes that define a class hierarchy in a hierarchical knowledge class structure. In embodiments, configuring the world model 16 may be based on at least in part an output of a machine learning algorithm through which the unstructured data may be processed. In embodiments, configuring the world model 16 may be based on the unstructured data comprising one of language-specific content and language independent content.

The world model 16 of knowledge of the enterprise may be configured to enable access to the ingested unstructured data, or other related unstructured data so that it can be used to prepare a response to a query associated with the aligned business-specific topic. The world model 16 may be configured based at least in part on an output of the similarity algorithms, an alignment of the data with the business-specific topic, based on an existing organization of the knowledge graph, and the like to facilitate responding to a query associated with, for example, the business-specific topic and the like. The plurality of sources embodying content relevant to the enterprise may include unstructured documents stored in a database (e.g., PDF documents and the like), streaming content (such as from IoT devices e.g., an audio stream or video stream from a camera, a stream of analog data values from a sensor, a stream of status information about a process monitored by a IoT device, and the like), communications between workers of the enterprise (e.g., email and other electronic messages, chats, social media posts, and the like), information from worksite infrastructure (e.g., security systems, kiosks, machines, buildings, vehicles and the like), information from equipment (e.g., activity alerts, startup/shutdown statuses, periodic updates of activities, and the like, including from telematics systems), information from the cloud (e.g., weather, news and the like), information from an enterprise information technology system, and the like.

In embodiments, machine learning techniques as described throughout this disclosure (such as model-based machine learning, mapping, classification, and the like, as well as deep learning techniques, techniques using neural networks, and others) may be applied to processing unstructured data to facilitate improvements in processes described herein, including ingesting (such as using machine learning to improve identification and extraction of contents from unstructured or semi-structured data sources), similarity detection (such as using feedback from results and/or supervision to improve classification systems, clustering systems, or the like), organization (such as how elements of a world model 16 or knowledge graph are organized), and the like. In machine learning related embodiments, unstructured data may be ingested from a plurality of source domains and processed with similarity detecting algorithms to detect similarity of portions of the data with at least one portion of a world model 16 representing knowledge about topics that are relevant to an enterprise. For example, a collection of emails among workers in a business unit of an enterprise responsible for a product line, such as a line of construction vehicles, may be ingested and processed to identify content within the emails that indicates relevance to particular products within the product line (such as where product names for particular vehicles, like "Backhoe Product No. 12345," are contained in the emails), and those emails that contain the identified content may be stored in, or linked to, one or more nodes of a knowledge graph of a world model 16, such as a node that relates to the particular vehicle within a graph that describes all of the vehicles in the product line.

In embodiments, ingesting may include ingesting the data directly into the world model 16. In embodiments, ingesting may include ingesting a link to the data into the world model 16. In embodiments, the ingesting may include providing a link to a portion of the data in the world model 16 and ingesting a portion of the data directly into the world model 16. In embodiments, the similarity may be based on comparisons of words in the data to words in the knowledge graph, and/or based on comparisons of phrases in the data to phrases associated with a node in the knowledge graph, and/or based on comparisons of portions of the data to information that may be descriptive of at least one of a node and a sub-graph referenced in the knowledge graph. The ingested unstructured data may also be organized to facilitate aligning it with a business-specific topic referenced in the knowledge graph, such as a product or service of the enterprise based on the detected similarity. Machine learning algorithms may be used to improve the methods and systems noted here, such as by processing portions of the unstructured data, information descriptive of the source domains, the similarity algorithms, and output therefore, the techniques for organizing and a result therefrom, identification of and/or references to the business-specific topic and/or the knowledge graph that references the business-specific topic, and the like. In embodiments, portions of the unstructured data may be processed with a machine learning algorithm that learns at least one of relationships among portions of the unstructured data and relationships of the unstructured data with data associated with the business-specific topic that may be referenced though the world model 16. Additionally, the world model 16 may be configured to enable access to the ingested unstructured data, the similarity results, the organization results, the machine learning processing results, and the like to facilitate responding to a query associated with, for example, the business-specific topic and the like. In embodiments, configuring the world model 16 may be based at least in part on an output of a machine learning algorithm through which the unstructured data may be processed. In embodiments, configuring the world model 16 may be based on the unstructured data comprising one of language-specific content and language independent content. The plurality of sources embodying content relevant to the enterprise may include unstructured documents stored in a database (e.g., PDF documents and the like), streaming content from at least one IoT device (e.g., an audio broadcast or other stream of the various types described herein, and the like), communications between workers of the enterprise (e.g., email and other electronic messages, and the like), information from worksite infrastructure (e.g., security systems, kiosks, and the like), information from equipment (e.g., activity alerts, startup/shutdown statuses, periodic updates of activities, and the like), information from the cloud (e.g., weather, news and the like) information from an enterprise information technology system, and the like.

In embodiments, portions of the world model 16 of knowledge of an enterprise, such as topics that are relevant to an enterprise may include at least one knowledge graph. The at least one knowledge graph may be accessible through the world model 16 so that similarity algorithms, unstructured data organizing algorithms, and the like may perform the functions described throughout this disclosure.

In embodiments, machine learning algorithms may use feedback from at least one user, such as a user who generates the query associated with the business-specific topic and the like. Feedback may be provided directly by the user, such as by indicating a rating or a "thumbs up/thumbs down" for an answer, by confirming whether an answer met the user's intended needs, by confirming whether the answer responded to the question with the correct answer, and the like. Feedback may be provided with respect to the content provided, the correctness of the topic selected by the system (e.g., did the system find the correct portion of a knowledge graph), the speed of the response, the clarity of the response, the usefulness of the response, and the like. Feedback from the at least one user may include unstructured data that may be ingested, processed, organized, and made accessible through the world model 16 as described above. For example, a user may speak feedback or use speech as feedback into a conversational agent. Feedback may include observing the user, such as via a camera, an audio sensor, a IoT device, a wearable device, or the like. For example, a user may be observed while undertaking a task within a workflow (such as performing maintenance on a machine), and the system may determine whether the user succeeded in taking the workflow to completion (e.g., finishing a maintenance protocol) after receiving content related to guiding the user through the workflow (e.g., content about the machine or about a maintenance protocol for handling a certain status condition). Machine learning algorithms may also use feedback that may be based on an indication of success of the response provided in reply to the query.

In embodiments, utilizing unstructured data, such as to enrich a knowledge base that may be configured as a world model 16 of enterprise-related knowledge may benefit from processing the unstructured data with Natural Language Processing (NLP) processes. The unstructured data may be processed with NLP techniques that may include an algorithm and a base model that may facilitate detecting a topic therein, such as a business topic and the like. In embodiments, an algorithm that may facilitate detecting a topic with NLP may be selected from a list of algorithms including, without limitation: Lxxx Dxxxx Axxx (LDA), latent semantic analysis, non-negative matrix factorization, bag of words, bag of n-grams, such as a corpus of the text, glove vectors, glove models, term frequency (e.g., TF-IDF, and the like), cosine similarity, and the like. In an example of NLP processing unstructured data with an algorithm, LDA may be applied for discovering patterns within a set of documents, independent of knowing about the content of the documents themselves. Such an NLP-based algorithm may be used to generate topics to understand a document's general theme. Therefore, it may be used to recommend query topics, subject matter, domains and the like. Additionally, LDA-based NPL processing of unstructured data may be useful in training NLP models, such as predictive, linear regression models and the like with the topics and occurrences.

In embodiments, an NLP-based method for processing unstructured data with an algorithm and a base model may include a based model such as Part Of Speech (POS) tagger models, glove vectors, word2vec, spacy models, third-party and public text corpuses, and the like. While most types of base model may not automatically identify all relevant enterprise data in unstructured content, through enrichment techniques, such as supervised learning and the like a base model may be adapted and/or recreated with additional information that may be useful about the enterprise and the like. This basic approach of adaptation by use may result in increased accuracy of output of the model, such as increased accuracy of detection of parts of speech that are relevant to an enterprise, and the like.

In embodiments, unstructured data may be ingested from a plurality of sources embodying content relevant to an enterprise. In embodiments, ingesting may include ingesting the data directly into the world model 16. In embodiments, ingesting may include ingesting a link to the data into the world model 16. In embodiments, the ingesting may include a link to a portion of the data and a portion of the data directly into the world model 16. The ingested data may be processed with NLP to facilitate detecting a business-specific topic associated with the ingested unstructured data. The unstructured data may be used to determine at least a knowledge graph in a world model 16 of knowledge of the enterprise that directs queries regarding the business-specific topic to a knowledge domain or graph from which responses to the queries can be prepared. An output of the NLP may be used to facilitate organizing the unstructured data to align with the business-specific topic referenced in the world model 16. The organizing may further facilitate configuring the world model 16 to enable access to the unstructured data in response to a query associated with the business-specific topic. The plurality of sources embodying content relevant to the enterprise may include unstructured documents stored in a database (e.g., PDF documents, forms, documents containing illustrations and photographs, blueprints, and the like), streaming content from at least one IoT device (e.g., an audio broadcast, camera feed, feed of analog sensor values, etc.), communications among workers of the enterprise (e.g., email and other electronic messages, and the like), information from worksite infrastructure (e.g., security systems, kiosks, and the like), information from equipment (e.g., activity alerts, startup/shutdown statuses, periodic updates of activities, and the like), information from the cloud (e.g., weather, news and the like) information from an enterprise information technology system, and the like.

In embodiments, processing unstructured data may lead to a determination that some data that may help with understanding the unstructured data may be missing. In such situations, it may be advantageous to solicit input seeking to capture the missing data. Soliciting input may include posting a request for information (such as to a workgroup or a crowd source), querying a data source (such as an enterprise database or external data source), accessing a service or application, accessing an application programming interface, accessing an IoT device, asking one or more users how to be directed to the missing information (or to other information that can ultimately lead to the missing information), or the like. In embodiments, solicitation may be directed through a dialogue function that communicates with humans and other sources of unstructured data via oral and/or written dialogue and the like. Methods for soliciting input instructive for accessing missing data may include ingesting unstructured data from a plurality of sources embodying content relevant to an enterprise. The ingested unstructured data may be processed with similarity detection algorithms that may facilitate detecting similarity of portions of the data with at least one portion of at least one knowledge graph that may be associated with a world model 16 of knowledge of the enterprise. In embodiments, the similarity may be based on comparisons of words in the data to words in the knowledge graph, and/or based on comparisons of phrases in the data to phrases associated with a node in the knowledge graph, and/or based on comparisons of portions of the data to information that may be descriptive of at least one of a node and a sub-graph referenced in the knowledge graph. The unstructured data may be analyzed, such as in light of related structured data that may be determined from the detected similarity, a result of which may be a determination of at least one portion of the knowledge graph for which information associated with the unstructured data may be missing. The determination that there may be missing information may be based on fields in the knowledge graph that are incomplete. The determination that there may be missing information may be based on information that may be accessible through similar knowledge graphs, and the like. In embodiments, the missing information may be sought through communicating via questions and answers, such as with a user or the like, about the unstructured data to facilitate collecting at least a portion of further information for use as or related to the missing information. Determining that further information may be needed (e.g., that information related to the unstructured data may be missing) may be based on an indication that a portion of the knowledge graph directed at the unstructured data may be missing. In embodiments, processing the unstructured data may include determining incomplete portions of the unstructured data. As noted herein at least a portion of the incomplete portions may be filled by communicating with a user. In embodiments, the communicating may include asking questions of the user, such as asking verbal questions of the user and receiving verbal responses from the user. A dialogue with the user may be performed by a CCY module 264 as described elsewhere herein. The ingested unstructured data may also be organized to facilitate aligning it with a business-specific topic referenced in the knowledge graph, such as a product or service of the enterprise based on the detected similarity. In embodiments, a portion of the knowledge graph may be a node that references a semantic topic. In embodiments, a portion of the knowledge graph may be a sub-graph that references a semantic topic. The world model 16 of knowledge of the enterprise may be configured to enable access to the ingested unstructured data, or other related unstructured data so that it can be used to prepare a response to a query associated with the aligned business-specific topic. The world model 16 may be configured based at least in part on an output of the similarity algorithms, an alignment of the data with the business-specific topic, based on an existing organization of the knowledge graph, and the like to facilitate responding to a query associated with, for example, the business-specific topic and the like. In embodiments, configuring the world model 16 may be based at least in part on an output of a machine learning algorithm through which the unstructured data may be processed. In embodiments, configuring the world model 16 may be based on the unstructured data comprising one of language-specific content and language independent content.

In embodiments, the similarity may be based on comparisons of words in the data to words in the knowledge graph, and/or based on comparisons of phrases in the data to phrases associated with a node in the knowledge graph, and/or based on comparisons of portions of the data to information that may be descriptive of at least one of a node and a sub-graph referenced in the knowledge graph.

The plurality of sources embodying content relevant to the enterprise may include unstructured documents stored in a database (e.g., PDF documents and the like), streaming content from at least one IoT device (e.g., an audio broadcast and the like), communications between workers of the enterprise (e.g., email and other electronic messages, and the like), information from worksite infrastructure (e.g., security systems, kiosks, and the like), information from equipment (e.g., activity alerts, startup/shutdown statuses, periodic updates of activities, and the like), information from the cloud (e.g., weather, news and the like) information from an enterprise information technology system, and the like.

In embodiments, processing unstructured data may result in a determination that some of the data may be ambiguous or at least may result an understanding that has some degree of ambiguity. One option for addressing this ambiguity may be to proactively solicit input regarding the unstructured data in an attempt to reduce or resolve the ambiguity. In embodiments methods for soliciting input instructive for resolving ambiguity related to unstructured data may include ingesting unstructured data from a plurality of sources embodying content relevant to an enterprise. In embodiments, ingesting may include ingesting the data directly into the world model 16. In embodiments, ingesting may include ingesting a link to the data into the world model 16. In embodiments, the ingesting may include a link to a portion of the data and a portion of the data directly into the world model 16. If, when processing the unstructured data, such as for associating it with knowledge accessible in a world model 16 of enterprise knowledge, ambiguity may be detected, such as if at least one term derived from the unstructured data may be ambiguous, proactive solicitation for resolving the ambiguity may be performed. In embodiments, at least one question may be configured to be asked by an artificial intelligence agent for disambiguating the at least one ambiguous term. The question may be included in a conversation conducted with a user, such as by asking the user the question. Responses to the question, such as responses by the user during the conversation, may facilitate resolving the ambiguity or at least determining an impact of the ambiguity on the world model 16. The responses to the question may also facilitate configuring the world data model to enable access to the unstructured data in response to a query associated with a business-specific topic identifiable in the unstructured data. The ambiguity may be determined by more than one candidate business-specific topic being identified in the unstructured data and the like. In embodiments, detecting similarity may facilitate disambiguating the unstructured data. In embodiments, detecting similarity may facilitate disambiguating a meaning of the unstructured data. In embodiments, a portion of the unstructured data, such as a term, word, phrase and the like may have at least two meanings and detecting similarity may facilitate disambiguating among the at least two meanings.

In embodiments, determining what terms are ambiguous may result from mapping a term in a query to the world model 16. The world model 16 may return an indication that there are multiple meanings or uses of a given term. A term that in context may not be ambiguous may be highly ambiguous when referenced in the world model 16. Therefore, to both facilitate developing a deep, detailed understanding of a query and to ensure that the understanding is accurate, raising ambiguity about a term may benefit both. In an example, a term, such as a set of digits "511" in a query might have several meanings. Statistical analysis might suggest that a 511 is an identifier for a part or the like. It may also be determined that 511 is a term that is used as an index for things such as a store, model number, customer number, employee number, location code, situation code, and the like. If the term is not sufficiently resolvable, given context determined about the query and the information in the world model 16, further definitions of 511 may be retrieved from external sources, such as through an Internet search and the like, to gather additional information that may help resolve the term. In an example, processing context for a query such as "What is a 511?" may result in generating a response that offers up an enumeration of potential meanings for "511", including those known to the world model 16 and optionally externally accessible meanings. In another example, context for the query that indicates the question is related to high performance automotive parts may result in limiting the response to a subset within a high performance automotive parts knowledge graph. In yet another example, context of a query may limit a query response to information that is closest to what the user knows, such as a response to a query for a phone number of "John" may be limited to phone numbers for contacts named "John" in the list of contacts of the user who is making the query.

In embodiments, processing unstructured data may benefit from classifying the data into one or more classes for organizing data in a world data model of knowledge of an enterprise, and the like. In embodiments, unstructured data may be ingested with an artificial intelligence agent in response to a query regarding a business-specific topic. The ingested unstructured data may be processed to detect similarity of portions of the data with at least one portion of at least one knowledge graph that may be accessible through the world model 16. The detected similarity may be used, at least in part, to facilitate organizing portions of the unstructured data into data classes related to the world model 16. Access to the unstructured data in the world model 16 may be accomplished by updating the world model 16. Updating the world model 16 may include storing the unstructured data into a data set organized by data class. Updating the world model 16 may also include storing links in a data classes of the world model 16 that reference corresponding portions of the unstructured data.

In embodiments, unstructured data may be classified based on, for example, similarity of the unstructured data with data in existing classes. In embodiments, definitions for existing data classes, including unstructured and structured data classes, may include structural aspects and the like that may be used as a guide for determining if new unstructured data could be classified to a given data class. In embodiments, unstructured data, such as PDF content and the like, may be visually evaluated for clues to its potential classification. If a visual evaluation indicates that the content is similar to a table, then table-specific classifications of data may be accessed to facilitate determining which, if any table-specific classification may apply to this visually evaluated content. Other examples of unstructured data classification based on structure may include, without limitation, schedules, images, bibliographies, and the like. As content of unstructured data is ingested, new relationships among terms in the world model 16 (e.g., links between nodes of knowledge graphs and among knowledge graphs and the like) may be detected. In embodiments, a table that has entries, such as cross references between part numbering systems (e.g., from a first generation to a second, from an enterprise specific number to a standard numbering system, and the like) may reveal new links between dissimilar part numbering systems, such as may occur when two companies with different part numbering systems merge operations, and the like. By determining at least candidate classifications of unstructured data, an intellectual framework can be applied to understanding the content of the unstructured data. If a first intellectual framework fails to establish a level of understanding that is consistent with existing data in a given classification, then a different classification may be selected and applied as an intellectual framework for ingesting content of unstructured data. In embodiments, classification activity may yield new understandings of potential compatibility among systems, such as which parts may be interchangeable and the like.

In embodiments the methods and systems described herein for processing unstructured data to facilitate access to the unstructured data through a world data model of knowledge of an enterprise may include communicating verbally, such as through an oral dialog, with a user about an enterprise-specific topic that may be related to the unstructured data and the like.

In embodiments, processing the ingested unstructured data may include executing a semantic engine that enables integration of a plurality of different data forms into a shared knowledge domain data structure. The semantic engine may enable integration, for example, of at least one of data records, data tables, data cubes, and data messages, among others. In embodiments, the semantic engine may apply statistical analysis of the unstructured data to determine a form for integrating into the shared knowledge domain data structure. In embodiment, the integration form may comprise at least one of reformatted direct data integration, unchanged format direct data integration, and linked data integration. Reformatting direct data for integration may include adjusting a format of data from an original format to an internal format, such as a format that is suitable for use by the world model 16 and other aspects of the methods and systems described herein. In embodiments, reformatted direct data integration may include directly integrating data that has been reformatted. In embodiments, reformatted direct data integration may include reformatting data during a step in an integration process.

In embodiments, configuring the world model 16 may include adding the unstructured data to a knowledge graph of the business-specific topic. In embodiments, configuring the world model 16 may be based on a determination of the unstructured data comprising at least one of a fact, an entity, and a logical expression. In embodiments, configuring the world model 16 may be based on a source domain of the unstructured data. In embodiments, the source domain may be one of a data domain of a business, an interaction between an artificial intelligent agent and a user, and third-party data domain. Also, the source domain may be at least one of an enterprise database, a streaming IoT device, a communication among workers, worksite infrastructure, and worksite equipment.

Figure 22:
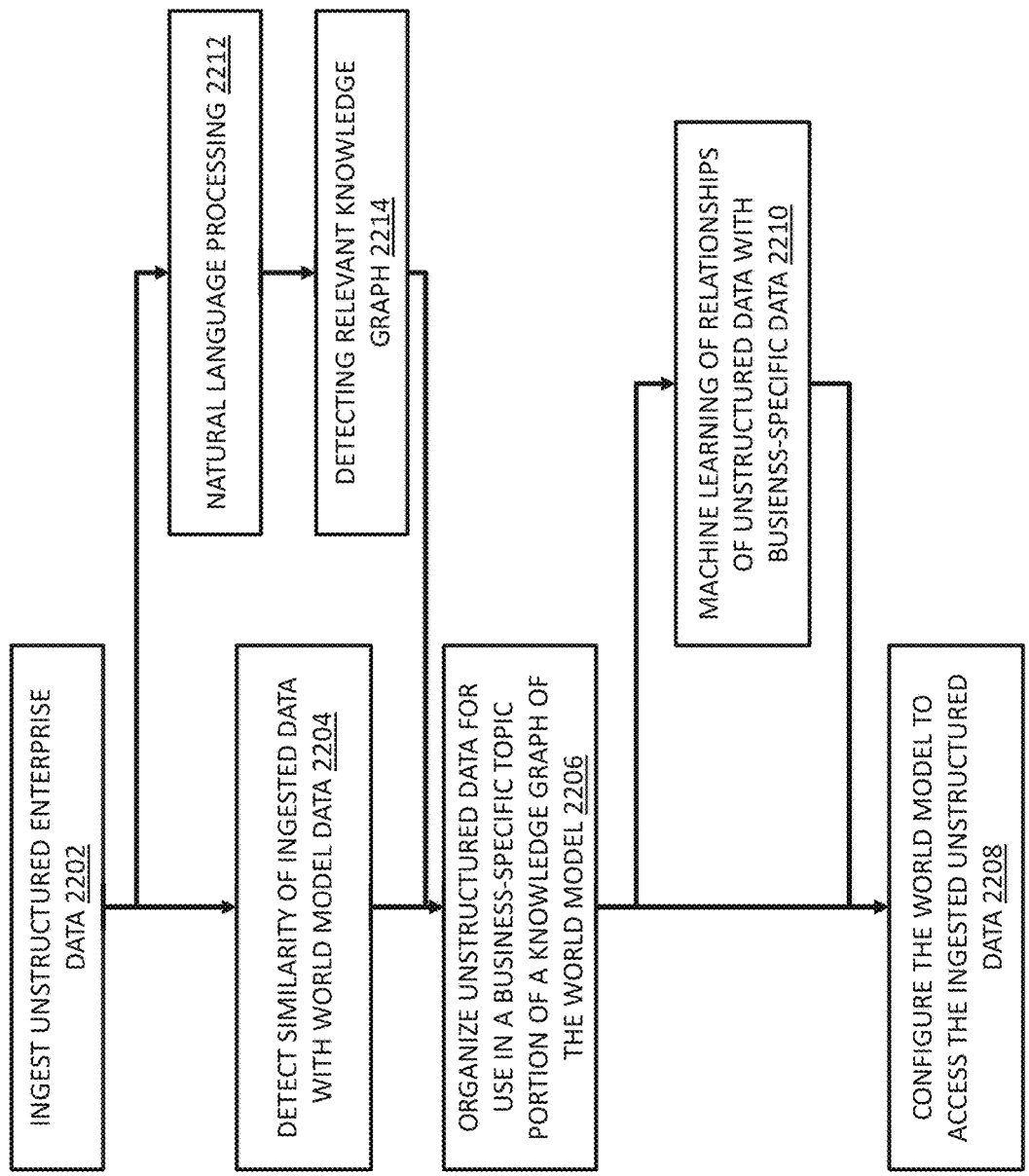
FIG. 22 depicts a flow diagram of ingesting and organizing unstructured data for a world model.

Referring to FIG. 22, unstructured enterprise data may be ingested at step 2202. Similarity of ingested data with world model 16 data may be performed at step 2204. Optionally, natural language processing (e.g., with use of NLU 3) of the unstructured data (step 2212) and detecting a relevant knowledge graph (step 2214) may be performed. The unstructured data may be organized for use in a business specific topic portion of a knowledge graph of a world model 16 of the enterprise information at step 2206. Optionally, machine learning of relationship of the unstructured data with business-specific data may be performed at step 2210. The world model 16 may be configured to access the ingested unstructured data at step 2208.

Figure 23:
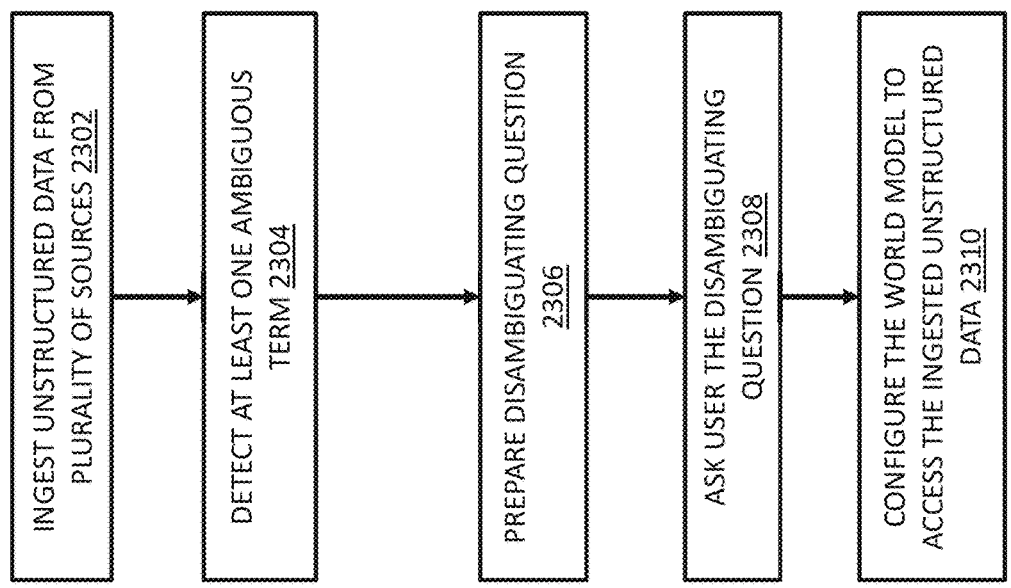
FIG. 23 depicts a flow diagram of unstructured data term ambiguity processing.

Referring to FIG. 23, unstructured enterprise data may be ingested at step 2302 from a plurality of sources. At least one ambiguous term in the data may be detected at step 2304. A disambiguating question may be prepared at step 2306. The user may be asked the disambiguating question at step 2308. A world model 16 may be configured to access the ingested unstructured data based at least in part on a response to the disambiguating question at step 2310.

Figure 24:
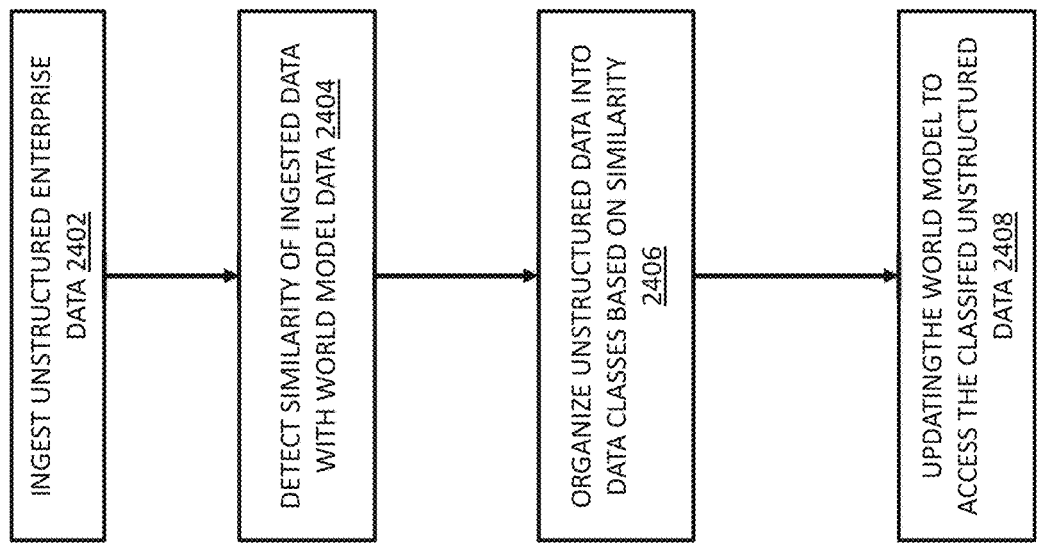
FIG. 24 depicts a flow diagram of similarity-based unstructured data classification.

Referring to FIG. 24, unstructured enterprise may be ingested at step 2402. Similarity of the ingested data with data in a world model 16 may be performed at step 2404. The unstructured data may be organized based on the similarity into data classes at step 2406. The world model 16 may be updated to access the classified unstructured data at step 2408.

Figure 25:
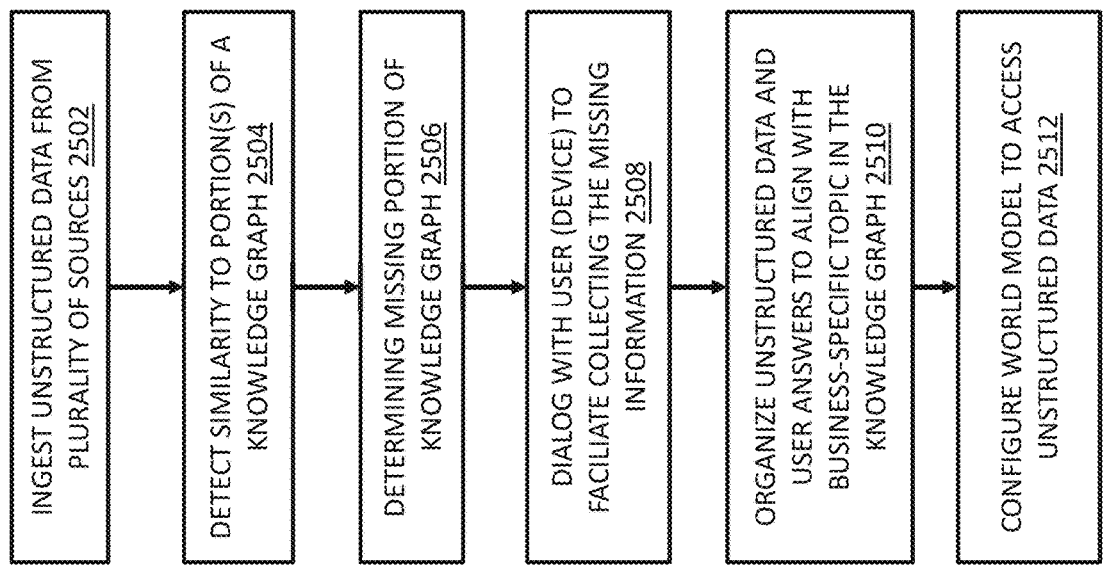
FIG. 25 depicts a flow diagram of determining and capturing missing data from a knowledge graph.

Referring to FIG. 25, unstructured data may be ingested from a plurality of sources at step 2502. Similarity of portions of the data with portions of a knowledge graph may be performed at step 2504. Missing portions of the knowledge graph may be determined at step 2506. A dialogue with a user device to facilitate collecting the missing information may occur at step 2508. The unstructured data may be organized with the user answers to align this with a business-specific topic in the knowledge graph at step 2510. A world model 16 that includes the knowledge graph may be configured to access the organized unstructured data at step 2512.

In embodiments, the AI agent 10, accessing a world model 16 of knowledge of an enterprise, may facilitate providing responses to questions that are specific not only to the content of the query (e.g., the words recognized in a spoken query), but also specific to the identity of user asking the query and the current context of the user. For example, the words in the phrase "next maintenance for product 5500" could suggest various different portions of a knowledge graph of an enterprise. For a user who is a salesperson, the phrase could indicate that the user is seeking pricing information for maintenance for the product. For a user who is a field service person, the phrase could indicate a need for information indicating how to undertake a maintenance protocol on the product. Thus, the system may provide information that is adjusted based on the identity of the user, including the role of the user within the organization, such as where information in portions of the world model 16 (such as a portion of a knowledge graph) is associated to some extent with one or more roles that may be recognized for a user. A user's role may be known to the system (such as by ingesting role information for a user and capturing the user's identity upon engagement with the system, such as by recognizing a password, voice signature, or the like), or the user's role may, in embodiments, be inferred by the system, such as by context. For example, a user visiting the headquarters of a customer may be inferred to be more likely to be a salesperson, while a user visiting a field location of a customer, such as a construction site, may be inferred to be more likely to be a maintenance person. A wide range of data, including location data for the user, location data for one or more items of equipment, data from cameras, sensors or IoT devices, historical data (such as past queries made by the same user) and the like may be used to determine, or infer, the role of a user. Determining a role and/or determining what portions of a knowledge graph are most likely to provide useful answers to queries made by people in that role may be undertaken and/or improved by machine learning, including supervised machine learning, deep learning, model-based learning, and other techniques described herein. In embodiments, either in combination with the identity or role of the individual or without such information, the system may use the context of the user to improve a response. This may include the location of the user (such as determined by various forms of geolocation, including geofencing), as well as information about the activities of the user. For example, using a camera, an image of a user's context may be observed and processed, such that the user's current environment, context and/or activity may be understood, such as by machine learning (such as based on training a machine learning system to recognize context based on a training set of human observations). For example, an image of a user carrying a tool box near a machine of a recognizable type like a turbine (such as recognized by machine learning, such as by processing the shape of the machine or a label on the machine) might be understood as a maintenance context for that machine, so the system is more likely to respond to queries with content from a portion of a knowledge graph that is relevant to that machine (i.e., the turbine) and to that task (i.e., maintenance for the turbine, as opposed to, for example, pricing information for it). Similar results may be achieved in the system by processing audio data, sensor data (such as analog sensor data), and other information detected from or about the user. Such data may be taken at the time the user asks the query or from historical records. For example, over time a body of camera, audio and sensor data may be processed (such as with machine learning) to identify a location as likely to involve a particular type of activity (such as identifying a customer location as a factory, a field location, a warehouse, an office, a headquarters, a retail location, or the like). The understanding of the context of the location developed over time can help suggest what information a user is likely to need at the location (e.g., sales information, repair information, operational information, customer information, and the like). Context can include user activity, such as by observing movements of the user, such as by recognizing gestures (such as by wearable devices like watches, armbands, and the like and/or by camera-based gesture recognition systems) and/or by recognizing movements that indicate the user is undertaking a particular task (such as turning a wrench). Context can include a combination of user activity data and information from a device, such as IoT or telematics data from a machine or item of equipment with which a user is interacting.

In embodiments, understanding input from a user, such as to enrich the enterprise knowledge graph, may benefit from learning from aspects of the user, the situation in which the user is found, and the like. In embodiments, various forms of machine learning may be applied to enrich a world model 16 of knowledge of an enterprise by applying understanding of a user and/or a user's context. In embodiments, machine learning provides a mechanism by which information about a user, the user's situation, and the like may be learned. In embodiments, machine learning on a user, such as a worker of an enterprise may include user-assisted learning and the like. Machine learning of a worker may include learning based on what a person may be doing and thinking, such as to determine what information to serve in response to a query by the person and how to serve, particularly when there may be many available responses that could be provided to the person based on less than a full understanding of the person, situation, and the like. Element such as time, place, form, and event, role of a worker, specific workers who share a common role, and the like may contribute to machine-based learning. Also, information from sensors that may facilitate observing a worker and his/her situation, such as cameras, IoT devices, wearable sensors, mobile devices, and the like, can provide data that may benefit machine-based learning.

In embodiments, machine learning on a worker may include receiving a query from a user and capturing context of the query including at least one of determining what the user may be doing, determining the location of the user, determining a timing parameter of the query, determining a role of the user and determining an identify of the user. In embodiments, a method may include processing the captured context with a machine learning algorithm that relates the query to at least a portion of a world data model of topics relevant to an enterprise that correspond to activities that users conduct when generating a query. In embodiments, a method may include processing the captured context with a machine learning algorithm that relates the query to at least a portion of a world data model of topics relevant to an enterprise that correspond to business activities being conducted when generating a query. Also, in embodiments, based on the relationship of the context to the world model 16, the methods and systems described herein may include producing a query-specific classification that directs the query to a portion of a knowledge graph of the world model 16 that may be appropriate for the context. Additionally, the method may include retrieving from a portion of the world model, such as the knowledge graph and the like a response to the query that may be consistent with the classification. In embodiments, capturing context, such as for machine learning, may include receiving one or more images of the user when posing the query. The image may be from a phone function of a mobile device of the user. In embodiments, the image may be captured contemporaneously with the user posing the query, such as when the user may be performing some action related to the query, and the like. The image may be useful in learning about the user at the time of the query (such as if the user may be in pain, if the user may be wearing a winter coat and hat, indicating an outdoor context, and the like). The context captured may also include at least one image of an object, such as a product, machine, or the like of the enterprise that may be proximal to the user or that the user may be working on, such as configuring, servicing, installing, selling, and the like. Context may also facilitate determining an identity of the user, such as a role of the user relative to the enterprise and the like. In an example, context of the user may be used to access the world model 16, which may facilitate the access to return the role of the user, and the like.

In embodiments context of a query may include location data for at least one electronic device associated with the query, such as a device co-located with the user. The electronic device may be any of a range of devices including, for example, the user's mobile phone, a wearable device, and the like. Location may be based on GPS and other locating technologies, such as WIFI triangulation, and the like. In embodiments, location may also be determined by data that indicates a proximity to a device, such as an access point, a beacon, a lighting system, a cellular tower, a vehicle, a IoT device, an access control system, a camera, a sensor and an item of equipment, and the like.

In embodiments, machine learning may be used to facilitate capturing context of the user. Machine learning may take context regarding the query, such as the subject matter domain, and the like as input and the system may output at least a suggestion of types of context to capture about the user. The suggestion may include identifying types of context capturing devices (wearables, cameras capturing images of the proximity of the user, and the like) to attempt to access, and the like. In embodiments in which the context of the user may be represented by information retrieved from a wearable sensor, the wearable sensor information may include a history of movement of the user up to and including when the user posed the query.

In embodiments, machine learning on a relationship between a captured context and a portion of the world model 16 may be based on the feedback from a user about the success of a query. Success of a query may include user feedback on the context, context frame, which aspects of the context are valid, and the like. In embodiments, machine learning on the relationship between a captured context and a portion of the world model 16 may be based on the feedback from a user about the accuracy of a determination of the context of the user. In embodiments, machine learning on the relationship between a captured context and a portion of the world model 16 may also be iteratively improved over time, such as based on user feedback and/or one or more metrics of success of the system.

In embodiments, an output of the machine learning algorithm may facilitate improving a relationship between classification of the query and information in a knowledge graph indicated by the classification. The output of the machine learning algorithm may also facilitate improving thoroughness of a response to queries. The output of the machine learning algorithm may further facilitate improving classification of queries based on at least one of an activity, a location, a time, and a role of a user posing the query. The output of machine learning may also facilitate improving selection of a response from the knowledge graph based on relationships between the captured context and information in the knowledge graph.

In embodiments, a method of applying context related to a query posed by a user that may be captured to machine learning may improve, among other things producing a query-specific classification. Such a method may include receiving a query from a user, such as a worker or other user that may have a business relationship with an enterprise. In addition to receiving the query, context of the query may also be captured or ingested. Context of the query may include, among other things what the user may be doing (e.g., a task or function related to the enterprise, such as servicing a machine and the like), the location of the user (e.g., basic location information, such as GPS location and/or other information such as proximity to other users, competitors, and the like), a timing parameter of the query (e.g., time of day, time since last query, time since start of the task, time left in an allocated amount of time for the task, time relative to a work shift, and the like), a role relative to the enterprise of the user (e.g., a service person, customer, sales person, executive, investor, regulator, and the like), identity of the user, and the like. The query and/or the context may be processed with a machine learning algorithm that relates the query to a world data model of activities (e.g., workflow tasks, task on a job description of the user's role, task assigned to the user at the time the query may be received, and the like) that users, such as workers of the enterprise conduct when generating a query, thereby producing a query-specific classification that links the query to at least a portion of a knowledge graph that facilitates access to subject matter-specific information about the enterprise of the world model 16 that facilitates managing organization, storage, and access to knowledge of the enterprise. The linked portion of the knowledge graph may include data elements that may or may not be influenced by context of the query. A query-specific classification may then be used to facilitate identifying elements of a response to the query that may be prepared and delivered to the user. The machine learning algorithm may learn about context of users and how that context relates queries to classification of the query to a knowledge domain, such as subject matter-specific knowledge base thereby improving classification of queries based on, for example, differences in context for similar queries. In an example, a worker who may be repairing a vehicle on a busy highway may receive a response that emphasizes his physical safety, whereas the same worker making the same query once the vehicle may be returned to a service depot may receive a different response that emphasizes corrective actions to take.

In embodiments, at least a portion of the response to the query may be retrieved from the knowledge graph, such as by accessing information in the knowledge graph that links to a portion of the answer, and the like.

Not only may a relevance of a response be important to improve through machine learning, but a form of the response may also be improved through machine learning. In embodiments, an output of the machine learning algorithm may facilitate determining a form of the response to serve to the user, such as a voice response form, a video response for, a physical stimulation response form, a text-based response form, and the like. Additionally, the form of the response may be based on the captured context, such as a location of the user (e.g., a response may be sent as an audio message when it may be determined that the user may be driving while traveling in a vehicle), or the role of the user (e.g., a salesman asking about warranty may get a cost-focused response, whereas a service technician may get a service-coverage focused response, and the like). When information from context may be missing, such as location may be missing or unclear, other sources of information that may be referenced by the context, such as a service technician's scheduled service location and service call completion activity for the day, may be accessed to attempt to determine the user's location. The machine learning algorithm as used herein may facilitate improving a content of the response and a form of the response or both. An output of the machine learning based on, for example the collected context of the query may facilitate determining which portions of the query comprise fact elements, entity elements, logical expressions, and the like. Another way in which query context-processed by machine learning may improve query classification and the like may be through facilitating breaking down the query into a plurality of sub-queries based, for example, on the collected context. Machine learning may identify that the context suggests that a first query may be to a product line and a second query may be to a line item under that product line. This may be accomplished by the context indicating that when a user queries about a product line name, based on the user's activity, he may be working on a specific line-item of the product line.

In embodiments, using the machine learning algorithm as described herein may facilitate improving classification by adjusting a classification based on a degree of ambiguity of a response to the query. The degree of ambiguity may be detected in a knowledge graph that the query corresponds with. The degree of ambiguity may be detected base on context, such as if the user were at a customer location with several different versions of a machine that the user identifies only by product name, and the like. In general, classification improvement can be determined based on changes in the degree of ambiguity; a reduction in ambiguity might be consistent with an improvement in classification.

Figure 26:
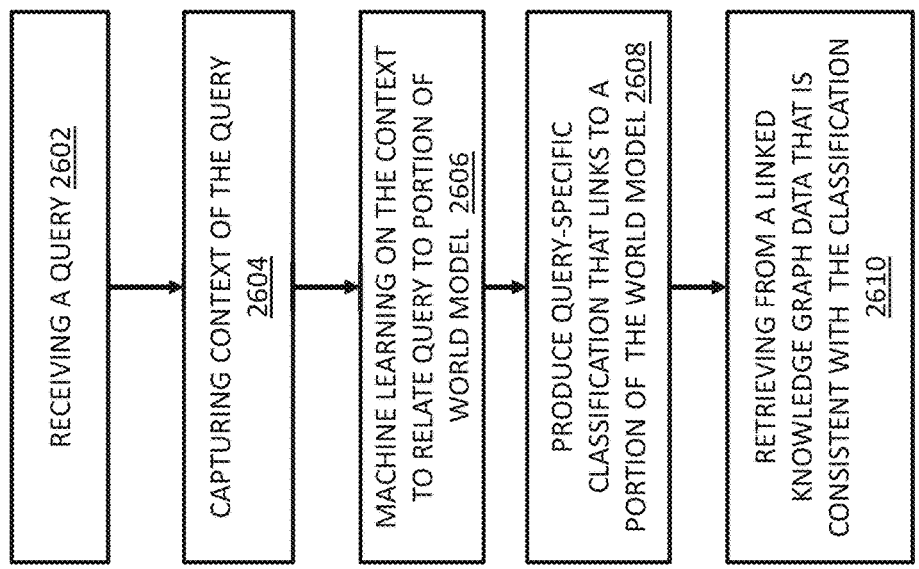
FIG. 26 depicts a flow diagram of machine learning based query classification.

Referring to FIG. 26, a query may be received at step 2602. Context of the query may be captured at step 2604. Machine learning on the context may be performed to facilitate relating the query to a portion of a world model 16 at step 2606. A query-specific classification that links a portion of the world model 16 to the query may by generated at step 2608. The linked portion of the world model may include data elements that may or may not be influenced by context of the query. Data may be retrieved from a linked knowledge graph (e.g., portion of the world model 16) that is consistent with the query-specific classification at step 2610.

In embodiments, machine learning for improving responses to queries about information related to an enterprise may receive feedback, such as measures of success of a response (e.g., rating responses by workers, measuring impact of answers on a process, yield metrics from processes and the like). An exemplary method for machine learning feedback may include collecting a set of queries and answers to those queries about an enterprise. The response may be provided by an automated intelligent agent system that obtains answers related to a topic associated with at least one of the queries in the set via a knowledge graph of a world data model that curates and manages knowledge of the enterprise. At least one measure of success of the response to the queries may be collected. An exemplary, although basic measure of success may be whether a user accepts the response as being sufficiently informative to allow the user to dismiss the query. Machine learning algorithms may receive the feedback and, based thereon, may cause an adjustment in an algorithm that selects a knowledge graph of information related to the enterprise responsive on the query. A knowledge graph may be selected based on the knowledge graph facilitating access to information that may be used to form at least a portion of the response. Feedback may be base at least in part on the response, which may be a fact, video (e.g., how-to-video), set of instructions, technical data, a question, and the like. The response may be based on contextual information associated with the user collected contemporaneously with receiving the query. The response may include conditional information (e.g., a how-to script that includes "if-then-else" logic, such as if the gasket may be leaking then replace the gasket). In embodiments, feedback may be based on how a response may be intended to be used. In an example, a response may request refinement of the query, context of a user who, for example posted the query or at least may be receiving the response. A response may require selection of multiple options so that the selection may itself be a form of feedback to a machine learning algorithm. Machine learning based on feedback may cause a response (e.g., a form and/or content) to be adjusted. A knowledge selection algorithm may be targeted for improvement through use of feedback by a machine learning algorithm. The output of the machine learning algorithm may cause a knowledge graph selection algorithm to be adjusted in response to the feedback. In embodiments, the feedback may cause the machine learning algorithm to suggest selecting a different knowledge graph.

In embodiments, measures of success of a response may come directly from a user, such as the user rating the response. In embodiments, measures of success of a response may be based a measure of impact on a workflow influenced by the response to the query. In embodiments, a measure of success for use as feedback to a machine learning algorithm may include yield metrics from a process or the like impacted by the response.

In embodiments, a measure of success may be sourced from a control loop that includes receiving a message from a user device, determining a degree of ambiguity expressed by the user in the message, determining an agreement by the user that the response may be effective, and determining if the user requests access to an expert user, and the like. A measure of success may be sourced form an automated computer-to-user conversation that facilitates capturing a user's response to a question of effectivity of the response.

In embodiments, measures of success may be based on a status of a workflow for which the query was provided. An open status feedback may indicate to the machine learning algorithm that the response was not likely successful. A closed status feedback may indicate that the response was likely successful. An open status may result in a weighting of confidence in the response being reduced, whereas a closed status may result in a greater weighting of the response as being truly responsive to the query.

In embodiments, a method for reducing ambiguity in a query may benefit from machine learning applied to processes that operate on the query. A query captured from a user may be processed with a knowledge domain selection algorithm that outputs at least one potential knowledge domain of the query. Ambiguity for each of the knowledge domains may be measured. This measurement may be based on, for example a count of potential responses to the query found in each of at least on knowledge graph. The measurement of knowledge domain ambiguity may be applied to a machine learning algorithm that may facilitate adjusting the knowledge domain selection algorithm base on an output of the machine learning algorithm.

In embodiments, a method for reducing ambiguity in a query may benefit from machine learning applied to processes that operate on the query. A query captured from a user may be processed with a knowledge domain selection algorithm that outputs at least one potential knowledge domain of the query. At least one response from the at least one potential knowledge domain may be served to the user who may indicate an acceptance (or lack thereof) of the response. The user indication maybe applied to the machine learning algorithm that may cause adjusting the knowledge domain selection algorithm to improve a rate of user acceptance of responses.

In embodiments, control loops, such as those described above in which feedback to a response may be used in a machine learning algorithm to improve a response may also benefit improving usefulness of responses. Control loops with a user may include an encryption control loop, such as if a user's response may be first encrypted at a user's device to ensure privacy. Control loops with a user may include resolving ambiguity (e.g., a term like "McDonalds in New York") could be referring to people named McDonald, restaurants named McDonald's in New York City and/or New York state, a hotel named "McDonald's New York", and the like. Disambiguating through a control loops also facilitates learning for subsequent queries. Another control loop that may facilitate providing response includes giving the user a way in the process to provide feedback, such as describe what was good and what was bad about the response. In embodiments, a control loop which may be another form of feedback may include providing with the response an indication of confidence of the response.

Figure 27:
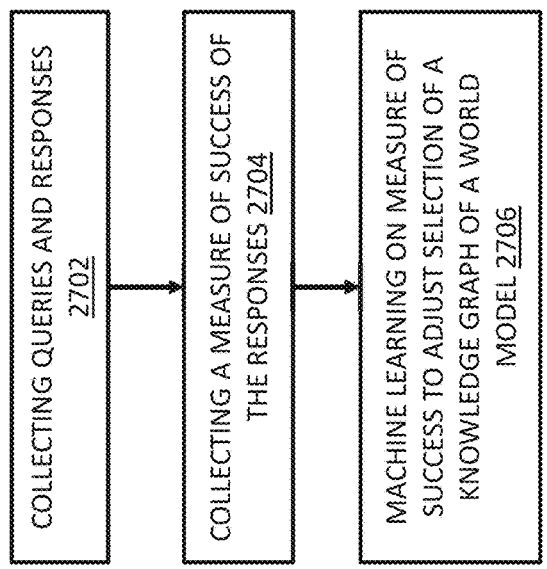
FIG. 27 depicts a flow diagram of improving responses based on machine learning of measures of success of responses.

Referring to FIG. 27, queries and responses thereto may be collected at step 2702, followed by collecting measures of success of the responses at step 2704. Machine learning may be applied to the measures of success to adjust selection of a knowledge graph of a world model 16 that is used to generate responses to the queries at step 2706.

In embodiments, use cases for specific answer types that are responsive to a query posed to a world model 16 of knowledge of an enterprise may include, based on context a quote, an item of technical data, a how-to video, a fact about a machine, a fact about an environment and the like.

Figure 28:
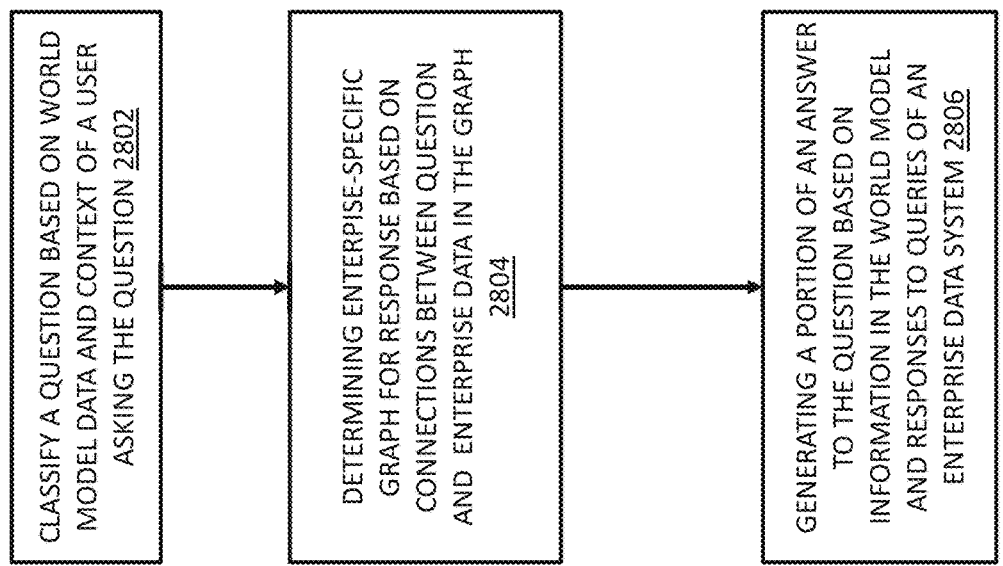
FIG. 28 depicts a flow diagram of accessing an enterprise information system to form a response to a query that cannot be formed from information in a world model.

Referring to FIG. 28, a question may be classified based on world model 16 data and context of a user asking the question at step 2802. An enterprise-specific graph for a response may be determined based on connections between the question and enterprise data in the graph at step 2804. Generating a portion of an answer to the question based on information in the world model 16 and response to the queries of an enterprise system may be performed at step 2806.

An exemplary process for producing an answer of a specific type to a query about, for example a product or service of an enterprise may include a classifying step wherein a question posed by a user may be classified as a request for a quote based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing a quote based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding a quote from information known to the world model 16 and retrieving a portion of the answer from one or more information sources in an enterprise information system by posing queries to the enterprise information system. Exemplary answers may include a status of the quote, a monetary amount referenced in a quote, a quantity referenced in the quote, the quote itself, standard terms of the quote, time-relate information (e.g., a lead time) of the quote, a product for which the quote pertains, and the like.

An exemplary process for producing an answer of a specific type to a query about, for example a product or service of an enterprise may include a classifying step wherein a question posed by a user may be classified as a request for technical data based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing technical data based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding technical data from information known to the world model 16 and retrieving a portion of the answer from one or more information sources in an enterprise information system by posing queries to the enterprise information system. Exemplary answers may include a fact about a product, service information about the product, application about the product, data from a specification sheet for the product, a value adjusted based on an application-related context of the question, installation information, multi-product technical information comparison, and the like.

An exemplary process for producing an answer of a specific type to a query about, for example a product or service of an enterprise may include a classifying step wherein a question posed by a user may be classified as a request for a machine fact based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing a machine fact based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding a machine fact from information known to the world model 16 and retrieving a portion of the answer from one or more information sources in an enterprise information system by posing queries to the enterprise information system. Exemplary answers may include a specification of the machine, an operating range of the machine, a dimension of the machine, warrant information about the machine and the like.

An exemplary process for producing an answer of a specific type to a query about, for example a product or service of an enterprise may include a classifying step wherein a question posed by a user may be classified as a request for an environment fact based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing an environment fact based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding an environment fact from information known to the world model 16 and retrieving a portion of the answer from one or more information sources in an enterprise information system by posing queries to the enterprise information system. Exemplary answers may include a dimension of an environment, a use of an environment, a location of an environment, a reference to the environment, and the like. An exemplary process for producing an answer of a specific type to a query about, for example a product or service of an enterprise may include a classifying step wherein a question posed by a user may be classified as a request for an environment fact based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing an environment fact based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding an environment fact from information known to the world model 16 and retrieving a portion of the answer from one or more information sources in an enterprise information system by posing queries to the enterprise information system. Exemplary answers may include the enterprise information system, and the like.

An exemplary process for producing an answer of a specific type to a query about, for example a product or service of an enterprise may include a classifying step wherein a question posed by a user may be classified as a request for a how-to-video based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing a how-to-video based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding a how-to-video from information known to the world model 16 and retrieving a portion of the answer from one or more information sources in an enterprise information system by posing queries to the enterprise information system. Exemplary answers may include a clarification of the video, a transcript of a portion of the video, the video, a diagram of a subject of the video, a variation of the video based on an intent of the question, an alternate language video, and the like.

In embodiments producing an answer of a specific type to a query about, for example a product or service of an enterprise may include natural language processing to develop an understanding and/or intent and/or domain of a question. An exemplary process may include a classifying step wherein a question posed by a user may be classified as a request for a specific type of information of the enterprise based on machine processing of the question. In embodiments, a classifying step may apply natural language understanding that assigns the question to a group of questions that is formed based on similarity of the questions, such as similar intents, entities, and the like. In the exemplary process, the machine processing may include accessing a world model 16 of information for the enterprise, a context of the user asking the question or a combination thereof. The exemplary process may also include processing the question with natural language processing that produces at least one of an intent and an entity of the question. The exemplary process may further include determining at least a portion of an enterprise-specific knowledge graph for providing the specific type of information of the enterprise based on connections between words in the question and products or services of the enterprise represented in the knowledge graph. The knowledge graph may alternatively be a data model of information about an enterprise, wherein the data model includes a plurality of subject-matter specific knowledge graphs of information about products and/or services of the enterprise. The exemplary process may, based on the knowledge graph portion, generatively producing at least a portion of an answer to the question regarding the specific type of information of the enterprise from information known to the world model 16 and retrieving a portion of the answer from one or more information sources in an enterprise information system by posing queries to the enterprise information system based on the intent of the question.

In embodiments producing an answer of a specific type to a query about, for example a product or service of an enterprise may include machine learning to improve developing an understanding and/or intent and/or domain of a question. An exemplary process may include a classifying step wherein a question posed by a user may be classified as a request for a specific type of information of the enterprise based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing the specific type of information of the enterprise based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding the specific type of information of the enterprise from information known to the world model 16 and retrieving a portion of the answer from one or more information sources in an enterprise information system by posing queries to the enterprise information system based on the intent of the question. The exemplary process may also include applying user feedback responsive to the answer into a machine learning system to improve determining at least one of the enterprise application-specific model graph, the answer domain, and the type of enterprise information.

In embodiments producing an answer of a specific type to a query about, for example a product or service of an enterprise may include deep neural network learning to improve developing an understanding and/or intent and/or domain of a question. An exemplary process may include a classifying step wherein a question posed by a user may be classified as a request for a specific type of information of the enterprise based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing the specific type of information of the enterprise based on connections between words in the question and products or services of the enterprise represented in the model graph. The model graph may alternatively be a data model of information about an enterprise, wherein the data model includes a plurality of subject-matter specific knowledge graphs of information about products and/or services of the enterprise. The exemplary process may, based on the model graph portion, generatively producing at least a portion of an answer to the question regarding the specific type of information of the enterprise from information known to the world model 16 and retrieving a portion of the answer from one or more information sources in an enterprise information system by posing queries to the enterprise information system based on the intent of the question. The exemplary process may also include applying user feedback responsive to the answer into a deep neural network system to improve determining at least one of the enterprise application-specific model graph, the answer domain, and the type of enterprise information.

In embodiments producing an answer of a specific type to a query about, for example a product or service of an enterprise may include prompting the user asking the question to clarify the question. An exemplary process may include a classifying step wherein a question posed by a user may be classified as a request for a specific type of information of the enterprise based on machine processing of the question. In the exemplary process, the machine processing may include accessing a world model 16 of information for the enterprise, a context of the user asking the question or a combination thereof. The exemplary process may further include determining at least a portion of an enterprise-specific model graph for providing the specific type of information of the enterprise based on connections between words in the question and products or services of the enterprise represented in the model graph. The exemplary process may also include responding to the question with at least one clarifying inquiry. The model graph may alternatively be a data model of information about an enterprise, wherein the data model includes a plurality of subject-matter specific knowledge graphs of information about products and/or services of the enterprise. The exemplary process may, based on the model graph portion and the clarifying response, generatively producing at least a portion of an answer to the question regarding the specific type of information of the enterprise from information known to the world model 16 and retrieving a portion of the answer from one or more information sources in an enterprise information system by posing queries to the enterprise information system, such as based on the intent of the question.

In embodiments, determining an application-specific model graph may comprise determining that the question may be related to a product or service based on similarity of words in the question with keywords in an application-specific model graph, so that the similarity may indicate the intent of the question relates to a specific product or service referenced in the model graph.

In embodiments, user roles that may be relative to an enterprise may include an internal role, an external role, a customer, a vendor, a competitor, a government official, and the like.

Enterprise information systems and other sources of information may contain data in a range of formats, such as without limitation, tables, data cubes, messages, and the like. Retrieving information from enterprise information systems may rely on an integration engine and the like as described herein to understand, capture, and adapt a range of different data formats to facilitate use of the information and the intent of the format in the world model 16. Adjusting formats may include generating a set of rules for interpreting the information gathered from the enterprise information system that mimics the original format. In an example, a two-dimensional table may be adjusted to include a rule that requires an x value and a y value and outputs a value based on the x and y values just as a table would. In embodiments, information sources, such as a world model 16, enterprise information sources and the like may include classes and/or processes that may be associated with, for example a product of the enterprise. With this in mind, queries of the enterprise information system may also be based on at least one of a class and a process of the product or service of the enterprise indicated by the world model 16.

In embodiments, an answer to a specific information type question may be impacted by how the world model 16 determines aspects of the question, such as question portions that are facts, portions that are entities, and portions that are logical expressions. An answer may be impacted in content, form, and type. A form of the answer may be based on context associated with the question. The form may be one of many answer forms, including natural language speech, instruction sets, questions, and the like. The form may also be adapted based on a user's response to portions of the answer. In embodiments, the answer may be impacted by how the world model determines an inference of the query.

In embodiments, an answer to a specific information type question, such as a question about a quote, technical data item, product data item, fact about a machine, fact about an environment, a how-to-video, and the like may include, among other things a kit of information, the content of which may be based on classification of the user posing the question, wherein classification may be based at least in part on an enterprise-role of the user. Users may hold various enterprise roles including technical roles, non-technical roles and the like. Additionally, a kit of information may include enterprise role-specific content, content generate from information that may be accessible in an enterprise information system. The kit may also include content retrieved from an external source retrieved in response to a query posed to the external source, such as based on lack of access to the content in an enterprise information system. In embodiments, the answer may comprise information from at least one knowledge quadrant referenced through the world model 16, knowledge quadrants consisting of internal data (e.g., facts and the like), external data, internal knowledge (e.g., know-how and the like), and external knowledge.

In embodiments, methods and systems are provided for answering a question or query related to a product or service of an enterprise. Such methods and systems may include classifying a question by a user as a request for a type of information of the enterprise based on machine processing the question, wherein machine processing includes accessing at least one of a world model 16 for information of the enterprise and a context of the user asking the question, wherein the world model 16 is organized to include at least one quadrant selected from the group consisting of internal data, external data, internal knowledge and external knowledge quadrants; determining at least a portion of an enterprise-specific graph for providing the type of enterprise information based on connections between words in the question and products or services of the enterprise represented in the graph; and generatively producing at least a portion of an answer to the question regarding the type of enterprise information from information known to the world model 16 and retrieving a portion of the answer from one or more information sources in an enterprise information system by posing queries to the enterprise information system, wherein the answer comprises information from at least one of the quadrants of the world model 16.

In embodiments, dark data, such as data from a document that has lost its format during extracting may require being recombined to provide answers to questions about an enterprise. Recombining such dark data may pose challenges for automated self-learning enterprise information retrieval systems. In embodiments, a process for recombining dark data may include ingesting dark data, deconstructing it, tagging it, mapping it forming a graph of it and the like to facilitate dynamically rendering the dark data in context of a user, such as a user posing a query that can be answered by the dark data. Dark data may be recombined based on context of a user, such as combining supporting materials relevant to a goal within a context. Such a goal, may for example include maintenance of a machine based on its specifications and location. Location may be used to extract further context, such as an operating environment of the machine. A location near the equator indicates a high temperature environment. A location near salt water indicates a saline operating environment, and the like.

In embodiments, methods and systems for recombining dark data, such as dark data extracted from documents of an enterprise may include ingesting content from a plurality of documents that include at least a portion of dark data contents, which may not be searchable within the documents prior to ingestion, and the like. The ingested dark data may be formless, such as plain text with little more than line and paragraph marks and the like. However, the dark data may include clues about its position in the original document, such as embedded page numbers, footers, section headings, page headers, and the like. This and other information may be useful in determining information about the dark data to facilitate deconstructing it, tagging it, and other recombination operations. Deconstructing the dark data contents into portions may be based on a range of contextual clues, some of which are exemplarily noted above. Each of the portions of dark data content may be tagged, such as with at least one semantic tag corresponding to a topic relevant to the enterprise/source of the document. This tag may be based on associating the enterprise/source information and the like with topic information reflected in an enterprise-specific world model 16 of information of the enterprise. At least some of the tagged portions of dark data contents may be mapped to portions of the enterprise world model 16 through the semantic tag correspondence to enterprise relevant topics. The tagged, mapped portions of dark data contents may be formed into a graph, so that at least one of the tagged portions is represented by the formed graph. In embodiments, graphs may be accessible through a world model 16 of the enterprise. The world model 16 may facilitate accessing a plurality of graphs through various associative processing methods that identify similarity between queries and graphs, such as knowledge graphs and the like. The formed graph may be made accessible to a query, such as by establishing semantic context of the graph for the world model 16 to access when processing queries about the enterprise and the like. This exemplary process of recombining dark data may further include rendering at least one of the related portions in a response to a query by a user. Rendering may include combining the dark data portions with supporting materials relevant to a goal of the user. In embodiments, a goal of a user may be expressed in a context, such as a workflow of the enterprise, an activity of the user, a location of the user and the like. Expressed context may be used, such as during rendering the response, to select among a plurality of value of at least one fact expressed in the response, such as, for example an oil pressure fact that is dependent on an operating environment temperature fact. In embodiments, the goal may, for example, be to maintain a machine in a context that may be characterized by a location of the machine. The location of the machine may be used as a clue to determine which portion of the dark data contents to render, such as a condition of the operating environment of the machine. The location-derived operating environment condition may indicate that a portion of the dark data contents that covers the environment condition indicated by the location should be rendered rather than another portion of the dark data contents that reflects information for a different operating environment.

In embodiments, portions of the dark data contents to render in a response may be based on a context of the user posing the question. In an example, a user context may be an enterprise role of the user. If the user role is an internal role, such as an employee or executive, a portion of the dark data to render may be differentiated from a portion that would be rendered for an external user role. External user roles, such as customers, vendors, competitors, government officials and the like may impact selection of the portion or portions of dark data content to render so that company confidential information dark data portions are not directly rendered. Such portions may not be rendered at all or may be adjusted, such as by redacting portions of the dark data contents that may be tagged as confidential, and the like.

Know-how, such as experienced gained through repeated use of a product or service, may be stored in a form that is accessible through the methods and systems described herein. In embodiments, recombining dark data to answer a question posed by a user may be combined with know-how by, for example, determining a subject matter domain of a question and identifying a knowledge graph of a world information domain of an enterprise that provides access to enterprise-related information and know-how in the subject matter domain. The information may include dark data contents of at least one document that is not directly searchable apart from the knowledge graph. The dark data contents from the knowledge graph maybe combined with other information indicated by the knowledge graph as being pertinent to the question, thereby forming a portion of an answer to the question. This answer may be rendered to a user posing the question. In embodiments, rendering may include adjusting at least one portion of the answer based on a context of the user. The portion adjusted may include substituting a different dark data content portion than originally indicated before user context was factored in.

While some dark data contents may be extracted formlessly from a document, other dark data contexts may include some type of document form information, such as page numbers and the like, that are embedded. A method for recombining dark data extracted from an enterprise-specific document that may include some clue regarding form may include ingesting content of a plurality of documents that include at least a portion of dark data contents that are dark to search functions (e.g., where the contents not searchable within the documents by conventional search functions) prior to or apart from the ingestion. The ingested content may be processed to detect logical breaks in the dark data contents based on intra-document location information presented in the dark data contents. The groups of dark data contents and or elements that are based on their position relative to the logical breaks may be tagged. Next a semantic relationship among the groups of tagged dark data content elements may be determined based on, for example, similarity of dark data content elements to data content elements in a subject matter-specific knowledge graph of a world model 16 of the enterprise. With a semantic relationship defined, the world model 16 may be updated with a reference (e.g. a logical reference such as a URL or other link) to groups of dark data content elements and or updated to include a copy of the dark data content elements so that the groups of dark data content elements can be accessed through the subject matter-specific knowledge graph.

Dark data contents may be configured in a source document so that they visually include a structure, such as a table, graph, list, and the like. Preserving the intent of such a structure when dark data contents are extracted from the document may provide benefits when using the dark data for responding to queries related to the original document. In embodiments, recombining enterprise-specific dark data may include ingesting content of a plurality of documents that include at least a portion of dark data contents that are not searchable within the documents prior to the ingestion and assigning a structure type to portions of the dark data contents, such as based on the visual appearance of the document. The structure type may be determined based on structure types of other similar documents and/or structure types of similar dark data contents. In an example, an earlier dated version of a document may include a table on page 3. Therefore, the dark data contents in a later dated version of the document that are similar to the table on page 3, then the system may determine the structure type for the relevant dark data content is a table structure. Based on the assigned structure type, a rule may be configured that provides a result from the dark data contents that is consistent with a result based on the structure type. Providing a structure type-specific response may also include configuring a world model 16 of the enterprise to process the rule when a query indicates that the dark data contents comprise information responsive to a query being processed by the world model 16.

Dark data contents methods and systems described herein may be further characterized as follows. Dark data contents that include document location information may include intra-document location information that includes a section heading, a page break, a footnote, a figure number, a section number, a page number, a dark data element that is indicative of a location on a page, and the like. Dark data elements may include a footnote, a visual element (e.g., a figure, table format, and the like), an entry from a table, unformatted text, an image, and the like. When structure type information is combined with dark data, the order of entry/ingestion of dark data may be independent of a relationship of the dark data based on the structure type. In this way, structure type information may supersede dark data order as it is extracted from a document. This may be helpful when a form of a table is lost during extraction, yet the structure type of the dark data is understood.

In embodiments, document location information, such as may be found in-line with dark data extracted from a document may be an indicator of a semantic relationship among dark data elements. A footnote and/or a page time, and the like may be useful as indicators of semantic relationships of dark data elements. Other page-related indicators may include a page title that appears on every other page. Dark data elements that follow a page title maybe semantically related to the page title topic even if they appear on subsequent pages that do not have a page title.

Items such as publication date, source of the document and the like can be used as indicators of semantic relationship of dark data elements.

In embodiments, a structure type for dark data elements, such as a table structure type may facilitate indicating a semantic relationship among dark data elements and/or with information accessible through the world model 16, such as through a knowledge graph of the world model 16, and the like. Structure templates may be configured for various structure types in the world model 16 so that access to dark data sourced from a structured portion of a source document (e.g., the table and the like) may be processed through a corresponding structure template so that the dark data retrieved through the world model 16 reflects the original document structure of the dark data. In embodiments, an artificial intelligence agent as described elsewhere herein may apply the structure template to data values retrieved in response to a query that seeks at least one of the elements that are entries in the structured portion of the original document, such as entries in a table. A structure type for portions of dark data may be based on a keyword found in the dark data. In a keyword-structure type example, a table in the original document may be identified by a keyword of "table", optionally followed by a table number and the like, in the dark data. This keyword may trigger processing of dark data proximal to it to be configured with a "table" structure type, such as by tagging the proximal dark data elements with table entry location tags and the like. A table entry location tag may include a row and column number of the entry. A table entry location tag may include a column heading value and a row heading value for the entry. Other table entry location tags may also be envisioned, such as an offset into a plurality of lists, where each list recites entries in a row or column, and the like.

Figure 29:
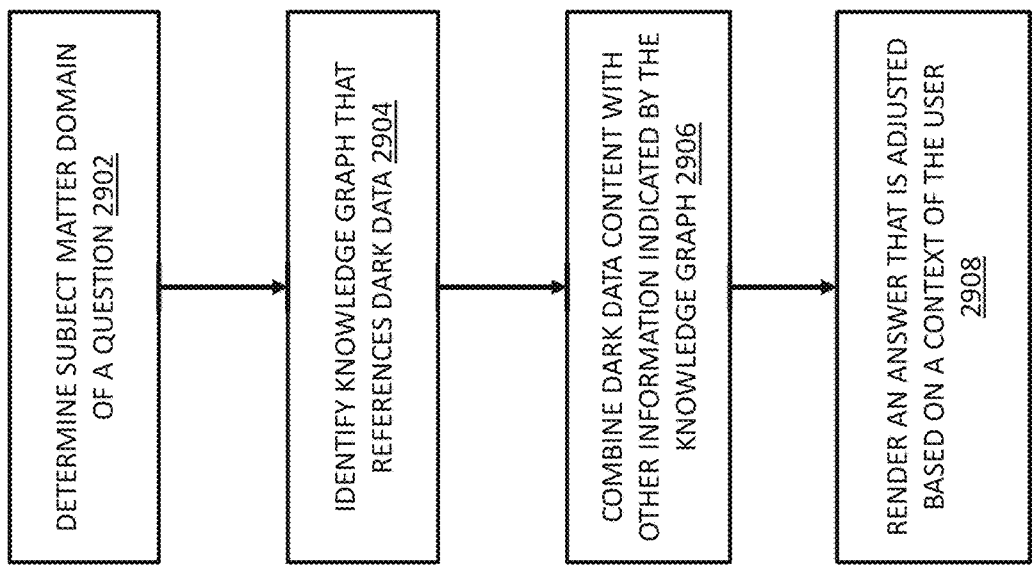
FIG. 29 depicts a flow diagram of recombining dark data in a response to a query.

Referring to FIG. 29, in a method of dark data recombination, a subject matter domain of a question may be determined at step 2902. A knowledge graph relevant to the subject matter domain that references dark data may be identified at step 2904. The dark data may be combined with other information indicated by the knowledge graph at step 2906. An answer that includes the dark data and is adjusted based on a context of the user asking the question may be rendered at step 2908.

In embodiments, a world model 16 of knowledge of an enterprise may be serially configured, such as over time, to enable knowledge gathering and relationship building based on working situations and the like of the enterprise. Sub-elements of a business may be enabled in knowledge graphs and the like of the world model 16 based on events and the like that may prompt access to information sources for the elements and sub-elements. Sub-elements, such as product lines, worker roles, components, business objects and the like may be enabled and then aggregated over time to seed and improve knowledge and other elements of the world model 16 and related operational aspects, such as an artificial intelligent agent, a dialogue manager, world model 16, speech recognition, context-based answering, and the like that are described herein.

In embodiments, serial configuring a world model 16 of an enterprise may include a step of receiving identification information for an element of the enterprise, such as s product line, worker role, component, department, goal, workflow, and the like of the enterprise. The enterprise element identification information may be used to access enterprise information resources for extracting information related to the enterprise element. An initial portion of a knowledge graph for the enterprise element may be formed with the identification information and the enterprise information related thereto retrieved from the enterprise information resources and other information resources as may be available. The initial portion may also be tagged with at least one class of information of the enterprise. The initial formed knowledge base may be augmented by processing business workflow information, which may be retrieved from the same or different enterprise information resources, with an association engine that determines association, such as semantic associations between the business work flow and the enterprise element. Processing business workflow information may be done by applying natural language processing of at least unstructured data referenced in the workflow. Processing the business workflow information may include determining a role of the enterprise element in the workflow. In embodiments, processing the business workflow information may include determining an impact on the enterprise element due to executing the workflow. Augmenting the knowledge base may be accomplished so that it contains references to the business workflow information, portions of the business workflow information, or combinations thereof.

In embodiments, an alternate method for serially enabling elements of knowledge in a world model 16 of enterprise knowledge may include receiving information sourced from an enterprise, such as from enterprise information databases, worker communications, worker direct input, worker observations, meeting notes, and the like. The received information may be processed with similarity detection algorithms that detect similarity of terms in the received information with one or more portions of a knowledge graph of the world model 16. Various approaches to determining what portions of the received information may be useful for similarity detection may be applied including automatic speech recognition, natural language processing, natural language understanding, search engine-like processing, and the like. The received information may be processed with an integration engine, such as the integration engine described herein, and the like that applies semantic models of content accessible through the world model 16 to determine how to reference the enterprise-sourced information in the world model 16. The knowledge graph determined to be similar to the received information may be updated so that it contains references to the enterprise-sourced information, portions of the enterprise-sourced information, or combinations thereof based on the semantic model. Updating may also be based on semantic models applied during processing of the enterprise information. In embodiments, updating the knowledge graph may be done by associating a portion of the information in the knowledge graph with an information class of the enterprise. Other techniques for updating the knowledge graph may include tagging portions of the extracted information with properties that the world model 16 processes, and/or referencing a portion of the world model 16 that contains a definition of terms in the initial portion of the knowledge graph. Yet other techniques for updating a knowledge graph as described herein may include creating a subgraph within the knowledge graph, creating a node through which the enterprise-sourced information is accessible in the knowledge graph, selecting at least one of a subgraph and a node through which the enterprise-sourced information will be accessible. In embodiments, determining how to reference the received information in the world model 16 may include determining if the information comprises an axiom (e.g., a fact), an entity (e.g., a worker, a product, a department, or other identifiable item, or type of item), and/or a logical expression (e.g., a rule, operator, function, or the like). In embodiments determining how to reference the received information in the world model 16 may include determining if the information is to be referenced in a global ontology layer, an enterprise ontology layer, a linked data layer, and a user knowledge layer.

In embodiments, an alternate method for serially enabling elements of knowledge in a world model 16 of enterprise knowledge may include receiving information sourced from an enterprise, such as from enterprise information databases, worker communications, worker direct input, worker observations, meeting notes, and the like. The received information may be processed with similarity detection algorithms that detect similarity of terms in the received information with one or more portions of a knowledge graph of the world model 16. Various approaches to determining what portions of the received information may be useful for similarity detection may be applied including automatic speech recognition, natural language processing, natural language understanding, search engine-like processing, and the like. The received information may be processed with an integration engine, such as the integration engine described herein, and the like that applies semantic models of content accessible through the world model 16 to determine how to reference the enterprise-sourced information in the world model 16. The knowledge graph determined to be similar to the received information may be updated by creating at least one of a subgraph, a knowledge graph, a node in an existing knowledge graph, a node-connection edge in an existing knowledge graph, an enterprise-knowledge class, a link to the enterprise-sourced information, and the like. In embodiments, creating a subgraph may include preparing a subgraph that reflects aspects of the workflow that relate to the enterprise element. Updating may also be based on semantic models applied during processing of the enterprise information. In embodiments, updating the knowledge graph may be done by associating a portion of the information in the knowledge graph with an information class of the enterprise. Other techniques for updating the knowledge graph may include tagging portions of the extracted information with properties that the world model 16 processes, and/or referencing a portion of the world model 16 that contains a definition of terms in the initial portion of the knowledge graph. Yet other techniques for updating a knowledge graph as described herein may include creating a subgraph within the knowledge graph, creating a node through which the enterprise-sourced information is accessible in the knowledge graph, selecting at least one of a subgraph and a node through which the enterprise-sourced information will be accessible. In embodiments, determining how to reference the received information in the world model 16 may include determining if the information comprises an axiom (e.g., a fact), an entity (e.g., a worker, a product, a department, or other identifiable item, or type of item), and a logical expression. In embodiments determining how to reference the received information in the world model 16 may include determining if the information is to be referenced in a global ontology layer, an enterprise ontology layer, a linked data layer, and a user knowledge layer.

In embodiments an integration used to process the received information may generate statistical data about the enterprise information to facilitate determining how to reference it in the world model 16. Referencing such information may be done through linking to the enterprise information resource. This may be useful when the information is configured as a data cube, a table of data, and the like that may best be accessed in its native format.

In embodiments, through use of a dialogue manager, artificial intelligence agent, and the like, a worker of the enterprise may be solicited for additional information about the received information, such as to facilitate determining an enterprise class for the enterprise-sourced information or determining how to reference the enterprise-sourced information in the world model 16.

In embodiments, a world model 16 of knowledge of an enterprise as described herein may facilitate change implementation, news propagation and the like including delivering an organizational change via the world model 16, such as through a combination of proactive messaging and context-based answers.

Figure 30:
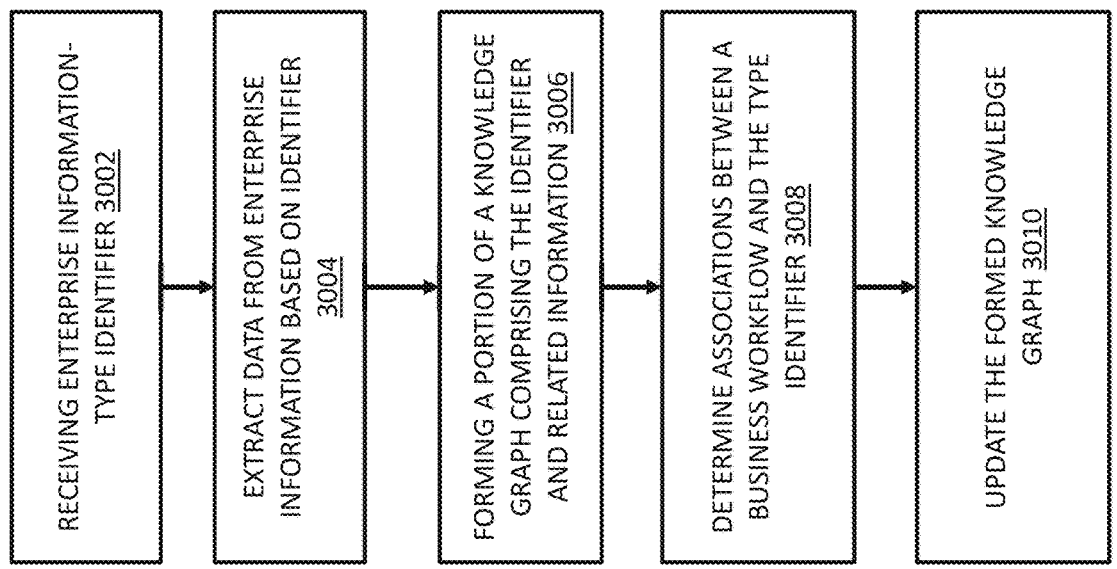
FIG. 30 depicts a flow diagram of incremental update of a knowledge graph.

Referring to FIG. 30, a method of information management may include receiving an enterprise information type identifier at step 3002. Data from an enterprise information base may be extracted at step 3004 based on the identifier. A portion of a knowledge graph may be formed at step 3006 that may comprise the identifier and the related information. Association between a business workflow and the type identifier may be determined at step 3008. The formed knowledge graph may be further updated based on the workflow association at step 3010.

In embodiments, communicating enterprise information may include determining an impact of information received on the enterprise, such as information relating to a process change, news and the like. This in turn may impact or relate to portions of a world model 16 of an enterprise, such as knowledge graphs and the like, including ones that relate to particular roles, such as worker roles for the enterprise. Relationships between the portions of the enterprise or world model 16 being impacted and worker roles may be expressed through the world model 16. These relationships may be identified to facilitate configuring a message for each of the worker roles based on the impact of change, a relationship of the worker role with the changed portion, and context of each worker in the worker roles. A message for each of the workers may be provided in a worker-centric format; therefore, a format for delivering the message to each worker may be based on at least the context of the worker. To ensure the message is delivered to the worker in a manner and timing that is appropriate, the message may be delivered directly or provided when a worker accesses a world model 16. For delivery cases the message may be delivered in the developed format to each worker so that a worker role that requires timely notification will receive the message. However, all workers may receive the message because the message may be integrated into a knowledge graph that is associated with the world model 16 such that a worker receives the message upon delivery of a portion of the knowledge graph in response to a query. In embodiments, delivering the message may include conducting an oral dialogue with the worker. It may also include changing a workflow that the worker role uses. In embodiments the impact on an enterprise is a desired change in a process for a worker having the worker role, and the change in the process is propagated to the worker by changing a part of a knowledge graph that is accessed when the worker performs the role. For example, a knowledge graph may contain instructions for performing maintenance on a machine, stored in a portion of a world model 16 that corresponds to the machine, and a change in the maintenance protocol may be propagated to the knowledge graph, so that a worker obtains the new protocol when next querying the enterprise information system about performing a maintenance task for the machine. As a result, the worker receives up-to-date information at the point and time it is needed to perform a task, without having to remember the information between the time the information is created and sent to the worker and the time at which maintenance is needed. Among other benefits, this system allows workers to avoid unnecessarily learning interim versions of a procedure that may be created, then become obsolete, before they are ever needed by a worker. Thus, communications of process changes are streamlined, and workers can spend time working on relevant processes with up-to-date information, rather than on trying to keep track of unnecessary or out-of-date information. In embodiments the impact on an enterprise is informational for a worker role, such as providing information about news relevant to a product, a customer, a market, or the enterprise in general. As the same information may have different Impacts on different roles, the information may be propagated by associating various versions of the information into portions of the knowledge graph of a world model 16 for the knowledge of an enterprise, where the portions correspond to different roles or topics. For example, a portion of the knowledge graph supporting a sales role may include detailed information in a news story about a customer, helping a sales worker understand the needs or circumstances of the customer, while the same news story may be omitted, or provided only in summary form, with respect to the knowledge graph associated with another role, such as that of an accounting role. In embodiments the impact on the enterprise is an instruction for a worker having a worker role to take an action, which may include an immediate action (such as propagating a message to one or more workers whose role is appropriate for taking the action, such as to perform maintenance on a product now) or an action that is deferred, such as initiated when a worker of a given role next accesses a portion of a knowledge graph (such as instructing a worker to inform a customer about available upgrades to a product at the next point in time that the worker accesses information about the product by virtue of interacting with the knowledge graph, such as by asking about the product). In embodiments the impact on the enterprise is associated with a need to perform a customer service activity, and the knowledge graph may be used to assign a customer service ticket to a worker having a worker role, where relevant information in a knowledge graph is associated with the ticket to facilitate efficient completion of the customer service action. In embodiments the impact of information on an enterprise is related to communication needs, such as where a knowledge graph provides direction of a responsibility for communication of information to a worker having a worker role (such as directing a sales person to inform a customer about a new product by sharing a portion of a knowledge graph about the product with the sales person, either proactively or in response to a query).

In embodiments, a method of propagating news in an enterprise may include determining a relationship between an article of news and a plurality of workers in an enterprise. It may include determining an impact on a business process that characterizes at least a portion of a role in the enterprise filed by each worker. In embodiments, determining an impact on a business process may be performed by a data service that synchronizes change information with a world model 16 representation of the business process. Determining a relationship may be based on logical links between a data structure for each worker in a world model 16 of the enterprise and a knowledge graph in the world model 16 impacted by the news. Determining a relationship may also be based on a relevance of a knowledge graph in the world model 16 impacted by the news to a data structure for each worker in a world model 16. Additionally, a relevance of the news to each worker based on the determined impact may be determined. Thus, the news may be propagated to each worker based on at least one of the determined relevance, context of the user, and enterprise news propagation rules accessible in a world model 16 of business information associated with the enterprise.

In embodiments, propagating news in an enterprise may include determining a relationship between an item of news and a topic in a knowledge graph associated with an enterprise-specific world model 16 of information of the enterprise for which the news is to be propagated. Determining a relationship may be based on logical links between a data structure for each worker in a world model 16 of the enterprise and a knowledge graph in the world model 16 impacted by the news. Determining a relationship may also be based on a relevance of a knowledge graph in the world model 16 impacted by the news to a data structure for each worker in a world model 16. By integrating content based on the news into a portion of the knowledge graph relevant to the topic, workers and others may receive the news upon delivery of an answer that is based upon the portion of the knowledge graph into which the new is integrated in response to a query involving the topic.

In embodiments, tracking compliance with a process change in an enterprise may include determining a set of workers in an enterprise impacted by a process change in the enterprise and communicating a message that embodies at least one of a description of and a reference to the process change to at least a portion of the set of workers. Determining a set of workers may include accessing a world model 16 of information about the enterprise that maps relationships of workers with processes. In an example, at least one map of relationships may be accessed through a knowledge graph of the world model 16 that is selected based on a similarity of terms in the change with terms that describe the knowledge graph. For tracking compliance, the method may include gathering feedback from the portion of the set of workers that is responsive to the process change. Compliance with the process change may be validated based on the gathered feedback (e.g., a user confirming the process change has been implemented) and/or through investigating knowledge about the state of the change where this knowledge may be in the form of a record of user's actions (e.g., a record of a worker's actions show that the worker has changed his or her actions to comply with the process change) in response to the communicating message. This feedback may then be used to facilitate coordinating implementation of the change for a portion of the set of workers based on a measure of change compliance of each worker. Workers who have not yet complied with the process change may be engaged in an oral dialogue conducted by a dialogue manager function that references a world model 16 of knowledge of the enterprise, including the process change, to coordinate implementation of the process change. In embodiments, the feedback may include an action taken by the worker in response to the delivered message, or it may include an indication of user receipt of the message. The feedback may be integrated so that it updates a relationship between the worker and the portion of the world model 16 impacted.

In embodiments, configuring the message may include determining a relevance of the change to each worker and based thereon setting a priority for delivering the message, so that a timing, manner, and urgency of delivering the message is based on the priority set for delivering the message. Additionally, delivering the message comprises delivering additional messages to select workers based on the feedback from each worker. In embodiments, delivering the message is performed through a CCY module 264 executing on a processor that communicates with workers, gathers feedback, validates change compliance, and performs automated follow-up communications based on the gathered feedback, such as if a user needs to be reminded to complete an action.

With regard to determining relevance of news to workers, the relevance may be determined by calculating a likelihood that the worker will execute the impacted business process within a preset time frame, such as a business day, a calendar day, a business week, and the like. Additionally, determining relevance of the news to each worker may include calculating a number of links between a dataset representing the worker and the impacted business process. Each link may be weighted based on a distance between the worker and the business process, or a count of nodes in a knowledge graph in between the worker and the business process. Relevance of the news to each worker may also be dependent on a role of the worker in the enterprise, so that relevance of a change for a worker with a role that uses the business process is greater than for a worker with a role that does not use the business process.

Figure 31:
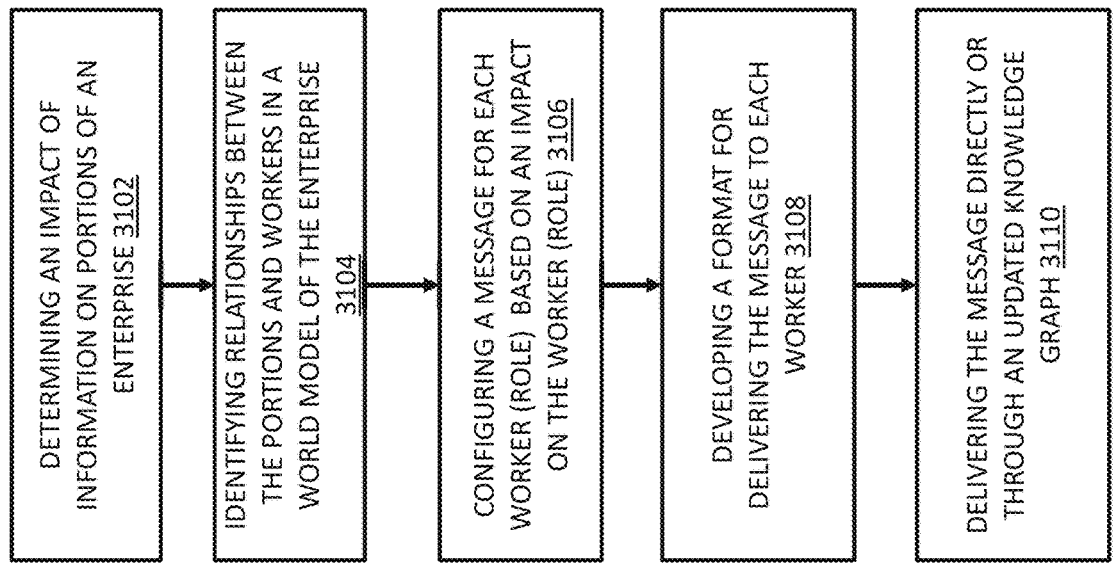
FIG. 31 depicts a flow diagram of processing an impact of update enterprise information to facilitate worker (role)-specific communication of the impact.

Referring to FIG. 31, a method of handling propagation of enterprise information may include determining an impact of information on portions of an enterprise based on information about the enterprise in a world model 16 at step 3102. The world model 16 may be used again in step 3104 to facilitate identifying relationships between the portions of the enterprise and workers. Step 3106 may cause a message to be configured for each worker (role) based on an impact of the information on the worker (role). A worker-specific format for delivering a message related to the information may be determined at step 3108. The formatted message may be delivered directly to the user or through an updated knowledge graph when the user performs a workflow that references the knowledge graph at step 3110.

In embodiments, a world model 16-based platform for enterprise information aggregation, relationship building, and query response generation may be coupled with enterprise operation systems to facilitate allowing a user to take an action, log an entry, delegate an action, and the like based on a notification. Unlike a notification system that requires a user to take a multi-step process even to determine details of the notification, in embodiments, a user may receive an alert that may embody a set of action choices directly in a user interface.

In embodiments, processing a notification associated with an enterprise may include sending an enterprise action notification signal to a user's computing device that activates a user interface that presents at least one notification and at least one visual element through which the user is enabled to take an action responsive to the notification. The action may include allowing a user to record a log entry, add information, delegate an action, take no action, request delegating an action to another user, and the like. In embodiments, the notification sent to the user's computing device may include a terminal function through which the user gains partial control of a world model 16 of enterprise-specific information relationships, so that the user may implement a change or respond to the notification through control of the information relationships. The notification may include a description of completing a goal of the enterprise. In such a situation, the notification may be communicated to workers who have completion of the goal in their list of goals and the like. In embodiments, a notification may be communicated through a communication module executing on a platform of the world model 16, so that the communication module may solicit and track a response to the notification from the user.

In embodiments, processing a notification associated with an enterprise may include sending the notification that includes an auto-start user interface function that upon receipt by a user's computing device controls an electronic interface of the device by presenting a description of the notification and enabling the user to take a notification-responsive action. The action may include allowing a user to record a log entry, add information, delegate an action, take no action, request delegating an action to another user, and the like. In embodiments, the notification sent to the user's computing device may include a terminal function through which the user gains partial control of a world model 16 of enterprise-specific information relationships, so that the user may implement a change or respond to the notification through control of the information relationships. The notification may include a description of completing a goal of the enterprise. In such a situation, the notification may be communicated to workers who have completion of the goal in their list of goals and the like. In embodiments, a notification may be communicated through a communication module executing on a platform of the world model 16, so that the communication module may solicit and track a response to the notification from the user.

In embodiments, processing a notification associated with an enterprise may include receiving a notification associated with an enterprise and processing the notification with an artificial intelligence agent that determines an intent of the notification, a knowledge graph providing access to enterprise information pertinent to the notification, or a combination of both. At least one of the intent and knowledge graph may be processed with a world model 16 that facilitates determining a notification-relevant subset of users configured to receive notifications in the enterprise. This subset of users may be sent an enterprise action notification signal to their computing devices that activates an interface on the computing devices that presents at least one notification and at least one visual element through which a user of the computing devices is enabled to take an action responsive to the notification. The action may include allowing a user to record a log entry, add information, delegate an action, take no action, request delegating an action to another user, and the like. In embodiments, a notification may be communicated through a communication module executing on a platform of the world model 16, so that the communication module may solicit and track a response to the notification from the user.

In embodiments, a voice system may include a plurality of interconnected circuits that perform different functions on speech that detect aspects of the speech, such as intent, and the like. In embodiments, an output from one of the circuits can be used like a control system to influence a previous circuit function, such as to bring the output from the previous circuit to a more precise and definite result, and the like. In example, an Automatic Speech Recognizer (ASR) block circuit may be connected with a Natural Language Understanding (NLU) block circuit that includes a feedback loop from the NLU to the ASR. In embodiments, an ASR circuit may include a front end that may extract features of speech, such as coefficients that may be used by a back end of the ASR circuit to determine aspects, such as a sequence of phonemes that may group up into words and how words may be syntactically grouped into a sentence, phrase, and the like. Processing speech with ASR circuit may result in a large variant of words and sentences; however, when these variants are fed into the NLU circuit, which may perform domain classification of elements of speech, the NLU circuit may determine an intent of the speech, typically a question, which can be useful to get at the specific topic the user is talking about. Domain classification of elements of speech may include classifying intents, such as described above, and entities, which can be useful to get at the specific entity being referenced in the speech. In embodiments, domain classification may be used to facilitate tagging parts of speech.

In embodiments, the world model 16 methods and systems described herein may facilitate narrowing speech well beyond a basic domain, such as "weather", to a knowledge graph in the world model 16 that not only may be a much smaller universe of topics than such a basic domain, but may also be linked to a wide range of other information, data, and know-how. However, even a coarse domain understanding, such as from an NLU circuit provided as feedback into speech recognition, such as an ASR circuit can greatly improve speech recognition accuracy and usefulness, while significantly reducing the computation required to effectively use recognition of speech, such as output from the ASR circuit, and the like.

In embodiments, not only can an NLU circuit feedback into an ASR circuit, but a Dialogue Manager (DM) circuit may interact with a knowledge base such as a world model 16, as described herein, to, for example facilitate improving effectivity and efficiency of recognition, understanding and other related speech functions. In an example, a domain may include machine tool types, such as bucket, hammer, and the like. However, even a tool type, such as bucket may be further refined so that a more precise understanding of "bucket" in a speech record may be achieved within the operational function of an ASR without significantly increasing computing load or complexity, particularly for a highly compute intensive operation, such as ASR.

In embodiments, a speech system may be configured with a single ASR that may feed output to a plurality of separately tuned NLU circuits. These lighter weight computing blocks can be operated in parallel to more quickly reach a classification of a domain of parts of speech, such as intents, entities and the like. In embodiments, the speech system may be configured with a unified model for the NLU circuit that may provide understanding of a plurality of content without relying on ranking NLU circuit output.

Determining features of speech, such as intents, entities, and the like can be enhanced through feedback provided by a world model 16 as described herein. In embodiments, running a feedback loop may facilitate loading a sub-domain model in the speech recognition process that may contain more details as a result of even one pass of natural language understanding operation. This may enable getting higher accuracy from speech recognition by re-running recognition using the sub-domain model on the features already extracted. In embodiments, this analogy may be extended to other speech components, such as applying feedback to control loops from the Dialogue Manager to the NLU and ASR and to speech synthesis components, such as NLG and TTS. This use of feedback looks for recognition and synthesis may facilitate mimicking how a human understands spoken language.

Figure 32:
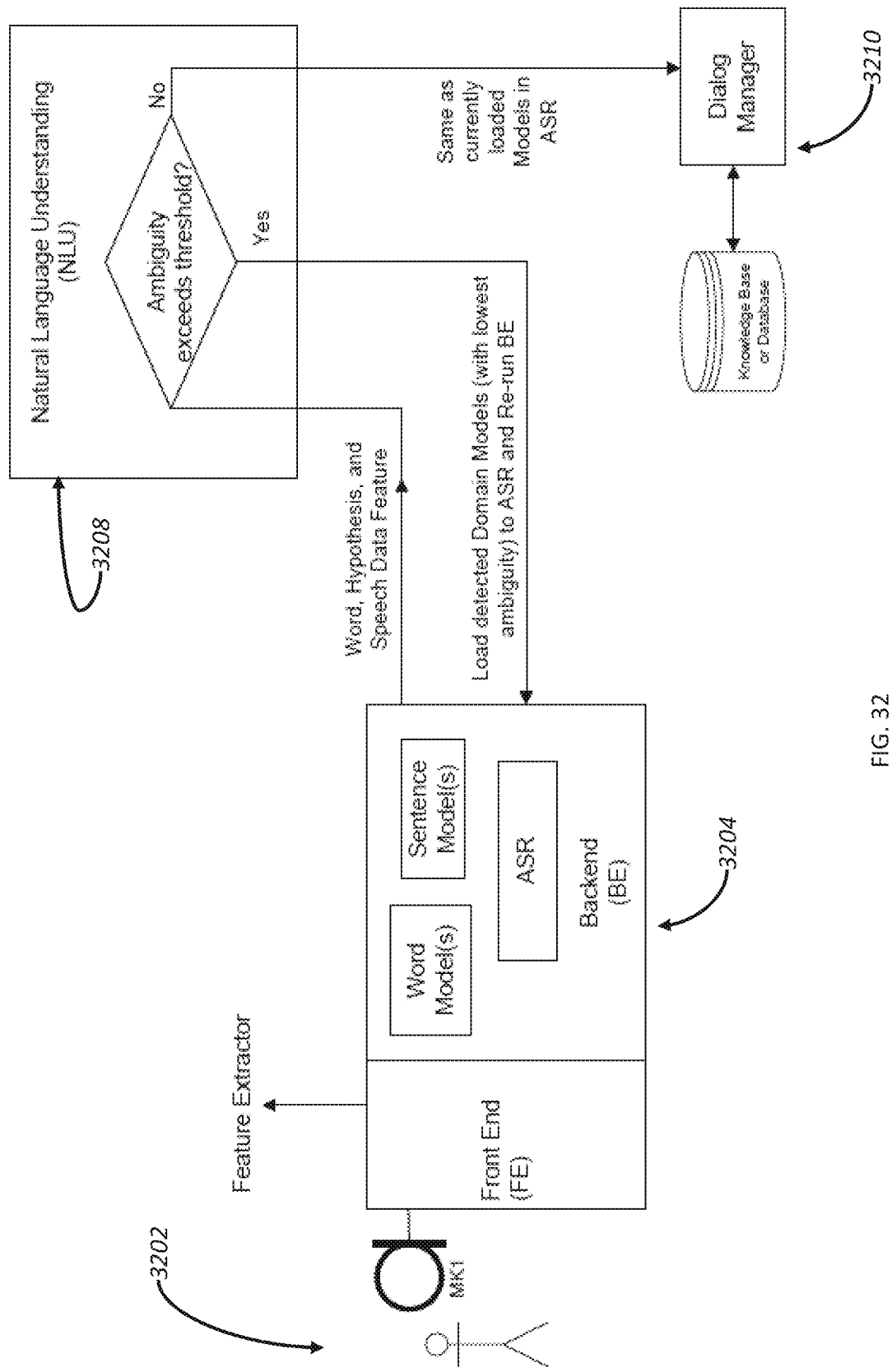
FIGS. 32, 33, and 34 are example flow diagrams of feedback in a speech processing embodiment as described herein.

Referring to FIG. 32, which depicts an embodiment of a multi-functional speech system, features, including those described above are arranged into an exemplary functional and data flow diagram. A speaker 3202 may talk to the speech system that receives and processes the speaker's spoken words with an ASR circuit 3204, which may be configured with a front end (FE) for extracting features (using feature extraction) that are fed into a backend (BE) that processes the speech further with word models and sentence models to produce at least one of words, sentences, phrases, and the like along with one or more hypothesis about the intent of the speech, and various data features descriptive of and/or derived from the speech. These may be fed into an NLU circuit 3208 that may evaluate a degree of recognition ambiguity found in the information forwarded from the back end (BE) of the ASR circuit 3204. Depending on the degree of recognition ambiguity detected, such as if it exceeds a recognition ambiguity threshold, control and information regarding the speech (e.g., currently loaded domain models, and the like) and optionally regarding the ambiguity may be returned to the ASR circuit (e.g., as detected domain models with the lowest ambiguity, and the like) or may be forwarded onto a Dialogue Manager (DM) circuit 3210 for further processing including interacting with a knowledge base 3212, such as a world model 16 of knowledge of an enterprise, and the like.

Figure 33:
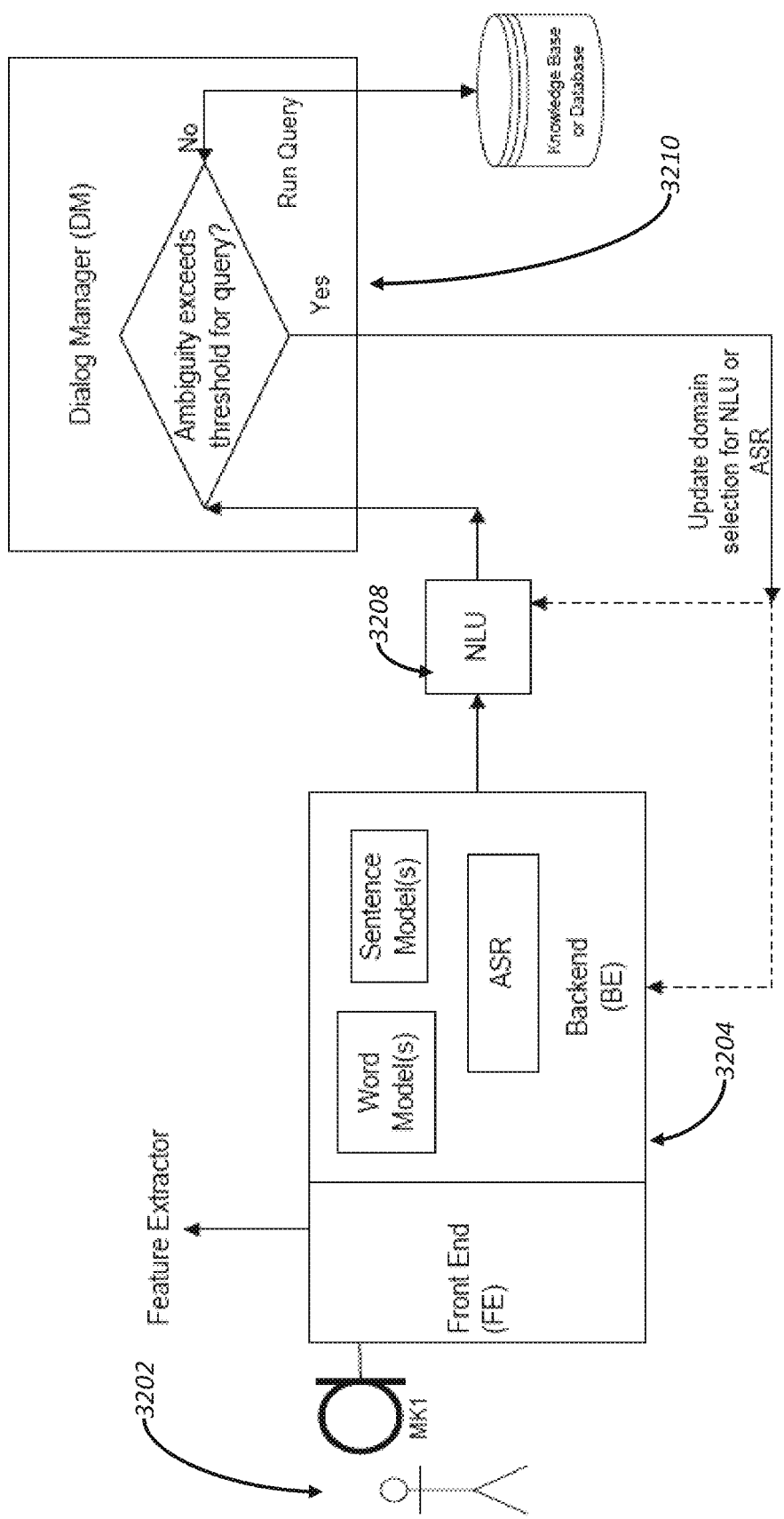

Referring to FIG. 33, which depicts a detailed view of the embodiment of FIG. 32 and further presents a detailed view of a feedback loop with the DM 3210 as another embodiment. The embodiment of FIG. 33 further tests DM ambiguity of domain related information output from the NLU 3208, which may be passed through it from the ASR 3204 or may be adjusted by the NLU based on the degree of ASR ambiguity in the domain related information provided to the NLU from the ASR. If, for example, the ambiguity of the domain presented by the NLU exceeds the DM ambiguity threshold, then an updated domain selection may be forwarded to the NLU or the ASR. If, on another hand, the ambiguity is no more than the threshold, a query may be formed and run on the Knowledge Base 3212 to further enhance speech processing.

Figure 34:
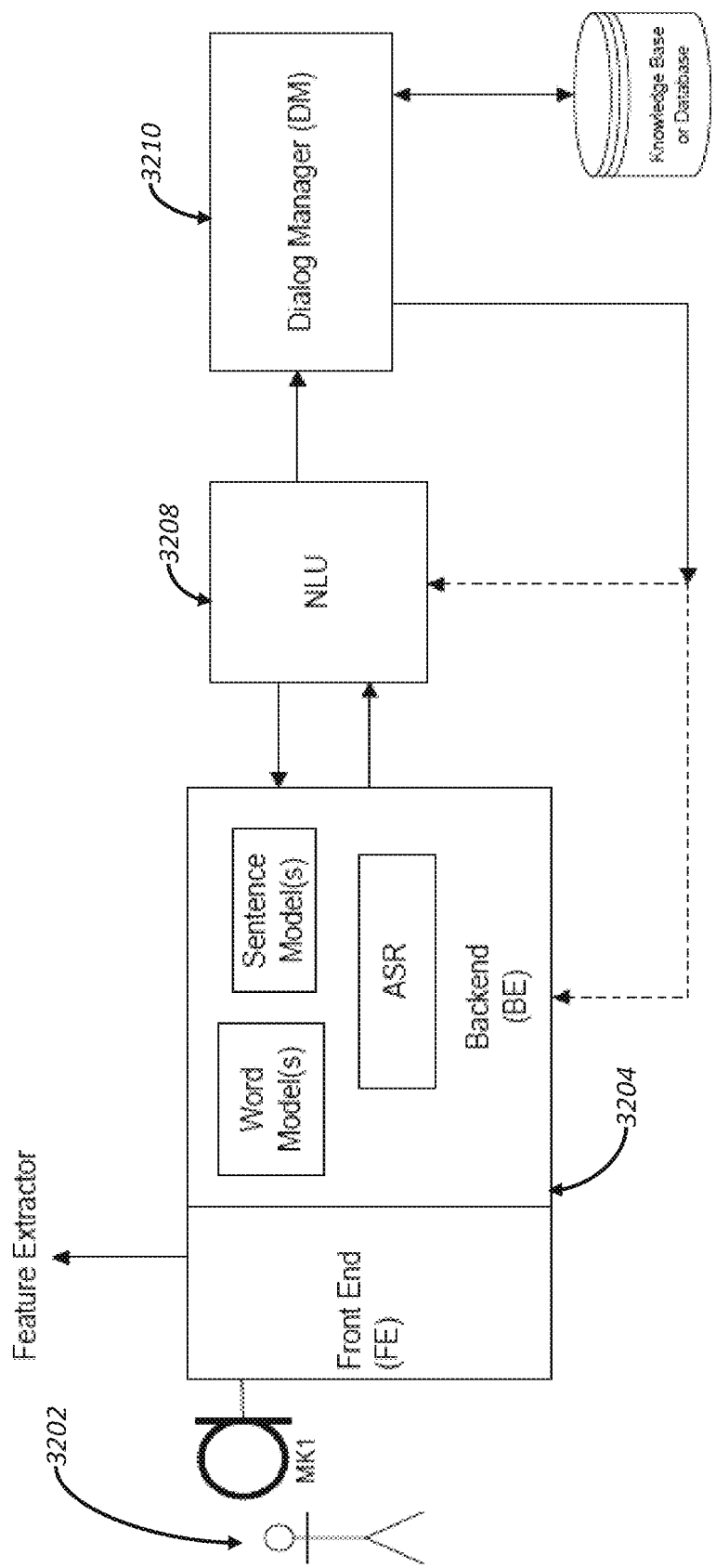

Referring to FIG. 34, which depicts a composite embodiment of a speech system, the DM 3210 may pass feedback to the NLU 3208 and/or to ASR 3204 to facilitate improving speech processing performance.

In embodiments, a system for utilizing feedback loops with a conversational agent may utilize an NLU to trigger alternate domain selection by an ASR by feeding back NLU domain suggestions to the ASR. Such a system may include a feature extraction facility that may apply word models and sentence models to detect features of received speech content. Embodiments of the system may include an automatic speech recognition (ASR) module that may generate at least one candidate subject matter domain of the speech by processing the detected features. A candidate subject matter domain may be selected by the ASR module from a library of subject matter domains based on a similarity of a recognized concept of the speech with information that describes subject matter domains in the library. In embodiments, the similarity can be based on prior successful matches of ASR output with entries in the library. Alternatively, the candidate subject matter domain may be selected based at least in part on knowledge base contextual information derived from an output of the ASR. A candidate subject matter domain may also be selected from the library based at least in part on contextual information received from a knowledge base responsive to a query of the knowledge base formed from the recognized speech. The ASR may use, among other techniques, Natural Language Processing (NLP) of the speech to determine a candidate subject matter domain. The ASR module may, in embodiments, be implemented as a neural network so that feedback received by the ASR bypasses a feature extraction portion (e.g., front end as described herein). Embodiments of the system may include a natural language understanding (NLU) module that receives the at least one candidate subject matter domain and at least a portion of the speech (e.g., decoded speech), develops an understanding of the speech and responds to the received at least one candidate subject matter domain by providing feedback to the ASR module that the ASR module uses to select an alternate subject matter domain or a new subject matter domain if the developed understanding exceeds an ambiguity threshold. The new subject matter domain may be one of an alternate domain and a greater detailed version of the candidate subject matter domain. In embodiments, the alternate subject matter domain selected may have a lower ambiguity score than the original domain and others that the further processing may detect. Embodiments of the system may include a dialogue manager (DM) that receives information descriptive of the speech from the NLU module for received content that does not exceed the ambiguity threshold. The dialogue manager may further query a knowledge base. Embodiments may also include a knowledge base with which the dialogue manager exchanges the query and a response to the query for managing a dialogue between the conversational agent and a user. In embodiments, the dialogue manager may retrieve a set of answers to the query and may coordinate communication of the set of answers to the user through the conversational agent. The dialogue manager may also receive at least one query response from the knowledge base, the query response including an ambiguity metric that the dialogue manager uses to determine if the query received from the NLU exceeds the query ambiguity threshold.

In embodiments, an alternate system for utilizing feedback loops with a conversational agent may improve NLU and/or ASR quality, efficiency, and effectiveness by using feedback from the Dialogue Manager (DM) as described herein. Such a system may include a feature extraction facility that extracts features of received speech content. The system may also include an automatic speech recognition (ASR) module that generates at least one candidate subject matter domain of the speech by processing the extracted features. A candidate subject matter domain may be selected by the ASR module from a library of subject matter domains based on a similarity of a recognized concept of the speech with information that describes subject matter domains in the library. In embodiments, the similarity can be based on prior successful matches of ASR output with entries in the library. Alternatively, the candidate subject matter domain may be selected based at least in part on knowledge base contextual information derived from an output of the ASR. A candidate subject matter domain may also be selected from the library based at least in part on contextual information received from a knowledge base responsive to a query of the knowledge base formed from the recognized speech. The ASR may use, among other techniques, Natural Language Processing (NLP) of the speech to determine a candidate subject matter domain. The ASR module may, in embodiments, be implemented as a neural network so that feedback received by the ASR bypasses a feature extraction portion (e.g., front end as described herein). The system may also include a natural language understanding (NLU) module that receives the at least one candidate subject matter domain from the ASR module and generates a subject matter domain specific understanding of the speech based thereon. The system may also include a dialogue manager that receives the understanding from the NLU module and provides updated subject matter domain feedback to at least one of the NLU module and the ASR module when the understanding received from the NLU module exceeds a knowledge base query ambiguity threshold. Additionally, the system may also include a knowledge base with which the dialogue manager exchanges the query and a response to the query for managing a dialogue between the conversational agent and a user. In embodiments, the dialogue manager may retrieve a set of answers to the query and may coordinate communication of the set of answers to the user through the conversational agent. The dialogue manager may also receive at least one query response from the knowledge base, the query response including an ambiguity metric that the dialogue manager uses to determine if the query received from the NLU exceeds the query ambiguity threshold.

In embodiments, a system that facilitates improving ASR and/or NLU operation (e.g., accuracy of subject matter determination and the like) may include a system for utilizing feedback loops with a conversational agent. The system may include a feature extraction facility that applies word models and sentence models to detect features of received speech content. The system may further include an automatic speech recognition (ASR) module that generates at least one candidate subject matter domain of the speech by processing the detected features. A candidate subject matter domain may be selected by the ASR module from a library of subject matter domains based on a similarity of a recognized concept of the speech with information that describes subject matter domains in the library. In embodiments, the similarity can be based on prior successful matches of ASR output with entries in the library. Alternatively, the candidate subject matter domain may be selected based at least in part on knowledge base contextual information derived from an output of the ASR. A candidate subject matter domain may also be selected from the library based at least in part on contextual information received from a knowledge base responsive to a query of the knowledge base formed from the recognized speech. The ASR may use, among other techniques, Natural Language Processing (NLP) of the speech to determine a candidate subject matter domain. The ASR module may, in embodiments, be implemented as a neural network so that feedback received by the ASR bypasses a feature extraction portion (e.g., front end as described herein). A natural language understanding (NLU) module may also be included that receives the at least one candidate subject matter domain and at least a portion of the speech, develops an understanding of the speech and responds to the received at least one candidate subject matter domain by providing feedback to the ASR module that the ASR module uses to select an alternate subject matter domain if the developed understanding exceeds an ambiguity threshold. In embodiments, the alternate subject matter domain selected may have a lower ambiguity score than the original domain and others that the further processing may detect. Additionally, a dialogue manager may receive the understanding from the NLU module and provide updated subject matter domain feedback to at least one of the NLU module and the ASR module when the understanding received from the NLU module exceeds a knowledge base query ambiguity threshold. Such a system may also include a knowledge base with which the dialogue manager exchanges the query and a response to the query for managing a dialogue between the conversational agent and a user. In embodiments, the dialogue manager may retrieve a set of answers to the query and may coordinate communication of the set of answers to the user through the conversational agent. The dialogue manager may also receive at least one query response from the knowledge base, the query response including an ambiguity metric that the dialogue manager uses to determine if the query received from the NLU exceeds the query ambiguity threshold.

In embodiments, a system for utilizing feedback loops with a conversational agent, may include a feature extraction facility that applies word models and sentence models to detect features of received speech content. The system may further include an automatic speech recognition (ASR) module that generates at least one candidate subject matter domain of the speech by processing the detected features. Yet further the system may include a natural language understanding (NLU) module that receives the at least one candidate subject matter domain and at least a portion of the speech, develops an understanding of the speech and responds to the received at least one candidate subject matter domain by providing feedback to at least one of a Natural Language Generation (NLG) module and a Text To Speech (TTS) module that facilitates use of an alternate subject matter domain if the developed understanding exceeds an ambiguity threshold. The system may further include a dialogue manager that receives information descriptive of the speech from the NLU module for received content that does not exceed the ambiguity threshold, the dialogue manager further generating a knowledge base query based on feedback. Additionally, the system may include a knowledge base with which the dialogue manager exchanges the query and a response to the query for managing a dialogue between the conversational agent and a user.

In embodiments, the NLU module and/or the DM module may process an output of the ASR when evaluating if the ambiguity exceeds a corresponding threshold. An output of the ASR may include a fact, an entity, an intent of the speech, and a logical expression derived from the speech.

In embodiments, ASR function may be improved through use of knowledge graph information. A process for attempting to improve ASR in this way may include receiving a candidate subject matter domain of speech processed by an automatic speech recognition module and developing an understanding of the speech based on information derived from a knowledge graph indicated by the candidate subject matter domain. A candidate subject matter domain may be selected by the ASR module from a library of subject matter domains based on a similarity of a recognized concept of the speech with information that describes subject matter domains in the library. In embodiments, the similarity can be based on prior successful matches of ASR output with entries in the library. Alternatively, the candidate subject matter domain may be selected based at least in part on knowledge base contextual information derived from an output of the ASR. A candidate subject matter domain may also be selected from the library based at least in part on contextual information received from a knowledge base responsive to a query of the knowledge base formed from the recognized speech. The ASR may use, among other techniques, Natural Language Processing (NLP) of the speech to determine a candidate subject matter domain. The knowledge graph may be accessed through a world model 16 of knowledge of an enterprise. In embodiments, at least a portion of the candidate subject matter domain is represented in the world domain as at least a portion of a knowledge graph. Processing further may include scoring the understanding for ambiguity represented in a degree of variability of information derived from the knowledge graph and identifying at least one alternate subject matter domain that has a degree of variability that is lower than other alternate subject matter domains indicated by the knowledge graph. Scoring may include evaluating a degree of ambiguity of at least one of an intent and an entity derived from the speech. Feedback may be generated at this point and used to facilitate generating a new candidate subject matter domain with the ASR module based on the speech and the alternate subject matter domain.

Embodiments may include a single ASR with multiple NLU modules. Operation of such embodiments may include receiving a candidate subject matter domain of speech processed by an automatic speech recognition (ASR) module and selecting one of a plurality of natural language understanding (NLU) modules configured to develop an understanding of a subject matter domain, the selection may be based on the candidate subject matter domain. The selected NLU module(s) may develop an understanding of the speech, such as based on information derived from a knowledge graph indicated by the candidate subject matter domain. Scoring the understanding for ambiguity may be based on a degree of variability of information derived from the knowledge graph. Scoring may include evaluating a degree of ambiguity of at least one of an intent and an entity derived from the speech. Greater degree of variability suggests greater ambiguity. Some knowledge graphs may express less ambiguity than others. To improve operation of the system, at least one alternate subject matter domain that has a degree of variability that is lower than other alternate subject matter domains indicated by the knowledge graph may be selected and provide to the ASR where a new candidate subject matter domain may be selected by the ASR module based, for example, on the speech and the alternate subject matter domain. In embodiments, a single NLU module may be utilized, which may have access to models for a plurality of domains. Such embodiments may increase NLU resource utilization. In embodiments, although many models may be useful for broad NLU applications, 2-3 instances of the single NLU may be running in parallel to facilitate faster throughput through the NLU processing stage. Such a multi domain NLU model may require greater computing resources than single domain NLU models, but may be kept active throughout the lifetime of the system, thereby reducing processing load to activate inactive NLU models, and the like.

In embodiments, feedback in a multi-module speech processing system may facilitate improving natural language understanding. A process by which NLU may be improved may include receiving a candidate subject matter domain of speech processed by an automatic speech recognition module and developing an understanding of the speech based on information derived from a knowledge graph indicated by the candidate subject matter domain. Such a process may further include retrieving information accessible through the knowledge graph that forms a portion of an answer to a question determined in the speech and scoring the portion for ambiguity represented in a degree of variability of information accessed through the knowledge graph. This degree of variability may be different for different portions of knowledge graphs in that some portions may have a greater similarity to an intent of the portion of speech being processed. Therefore, a further step may include identifying at least one alternate subject matter domain that has a degree of variability that is lower than other alternate subject matter domains indicated by the knowledge graph. The understanding may be improved by feeding back at least the one alternate subject matter domain with lower degree of variability and regenerating a new understanding with the natural language understanding module by processing the speech and the alternate subject matter domain again through, for example the NLU module.

In embodiments, natural language understanding may be enhanced through the use of a knowledge base that facilitates mapping intent portions of parts of speech, such as based on other aspects including entities in the speech and the like. By relying on information in the world model 16 for developing an understanding of different parts of speech, natural language understanding may operate quickly. Information in the world model 16, such as may be determined through use of knowledge graphs and the like, may facilitate understanding what an entity may have the capability to do, e.g., what could an intent of the entity most likely be. By using the information linked through, for example knowledge graphs in the world model 16, a natural language understanding system may reduce training burden by training on intents, entities, and the like that are accessible and that are linked through the world model 16. In embodiments, a phrase such as "buy a book" may be understood through use of the world model 16 to include an intent—an action "buy" and at least one entity "book". However, the world model 16 linkages and knowledge base provide greater insight into such a phrase by linking, for example, to other information associated with the entity "book", such as a title, an author, a publication year, and the like. Natural language understanding of a phrase that include one or more of these elements can be accelerated because these optional elements are already at least partially understood by, for example, a link between a "book" entity and these elements in the world model 16. A natural language understanding process operating on speech can quickly determine that, for example, a date in this query would likely be a publication date, or that a name in such a query would likely be an author's name and the like.

In embodiments, a knowledge graph may have a hierarchy or the like of elements that relate to each other, such as an automobile with an engine. Elements such as an engine block, piston, rings, crankshaft, bearings, and the like may be linked, such as hierarchically, to an automobile engine so that natural language understanding processes may be trained on such a linked hierarchy. When training for natural language understanding on, for example speech related to an automobile engine, parts of speech may be trained to connect a piston to an engine and rings to a piston and the like. In this way, training is not on individual entities, but on hierarchies of entity terms that can be tagged to facilitate access into a knowledge graph based on entities found in parts of speech. By maintaining the linkages and/or hierarchies of information when training natural language understanding, the same information is available when an entity is extracted from speech. In embodiments, a term such as "book" can be both an entity (e.g., noun) and an intent (e.g., verb). A tagged hierarchy of terms may result in pulling two or more different portions of a world model 16 (e.g., two different portions of a "book" knowledge graph, or two or more different knowledge graphs (e.g., a verb and a noun knowledge graph)). By using the linked/hierarchal information in the accessed portions, disambiguation of this term may readily be accomplished, such as based on alignment of other terms in the speech. In embodiments, if other terms are detected to be entities, then the ambiguous "book" term may likely be an intent.

In embodiments, validation of speech processing, including determined understanding, intent, selection of a subject matter domain and/or portion of a knowledge graph and the like may be accomplished through automatic generation of language queries to facilitate training on success of delivering relevant answers to questions, such as unstructured content (e.g., free-form) questions, rather than training only on voice recognition. In embodiments, the world model could contain selected syntactically correct queries that may be processed, such as with Natural Language Generation to generate variants or semi variants thereof.

Validating a selection of or content of a knowledge graph responsive to received speech may include applying speech, received during a speech-based dialog, to a semantic database that generates an understanding of at least one of an entity and an intent of the received speech. By using the understanding and a subject matter domain knowledge graph aligned with the understanding, one can generate at least one question to be asked in the dialog. Validating the understanding and/or the selected knowledge graph may be accomplished by applying a reply to the question asked in the dialogue (e.g., a user's verbal or non-verbal reply the question asked) to a validation process that validates the understanding and the selected knowledge graph. Validation may contribute to robustness by, for example strengthening an association between the understanding and the knowledge graph for a positive reply and strengthening an association between the understanding and a different knowledge graph for a negative reply. In cases where the reply contains unstructured data, a natural language understanding process may be applied to facilitate efficient validation based on the reply.

Automatic generation of queries may also benefit from machine learning techniques. In embodiments, voice system training via machine learning from responses to a subject matter domain-specific validation query may include generating an understanding of speech received during a speech-based dialog, such as with a Natural Language Understanding (NLU) module and based at least in part on information in a semantic database that facilitates determining at least one of an entity, an intent, and a subject matter domain of the received speech. Communicating a response to the speech received that is based at least in part on information derived from a knowledge graph aligned with the understanding may prompt a reply. The reply may be analyzed to determine at least one measure of success of the reply. This may enable applying a machine learning process that improves generating the understanding and/or selecting the knowledge graph based at least in part on the measure of success of the reply. A result of applying the machine learning outputs may include adjusting weighting of speech recognition elements. In embodiments, the machine learning process may include determining semantic content of the reply that relates to the understanding. This may be used to adjust a natural language understanding algorithm based on the semantic content to improve the understanding of the received speech. In embodiments, the machine learning process may include determining semantic content of the reply that relates to the knowledge graph. This may be used to adjust a knowledge graph selection algorithm based on the semantic content to improve selecting a knowledge graph in response to the received speech.

In embodiments, a response to the received speech may be a question for validating the understanding, the selection of the knowledge graph, and the like.

In embodiments, validating speech may be based at least in part on an inferred intent of the speech. Validating speech in this way may include configuring a knowledge graph with at least one of nodes and edges that are tagged with intents inferable from speech, wherein the intents facilitate linking speech elements to subject matter domains. Analyzing speech with a natural language understanding (NLU) module to select at least one intent of the speech among a plurality of candidate intents. Validating speech may further include selecting a knowledge graph based on a subject matter domain detected in the speech and comparing the selected at least one intent with at least one tagged intent in the knowledge graph. Based at least in part on a result of the comparing, a process for validating speech may signal to the NLU module if the selected intent corresponds to the detected subject matter domain or if the selected intent does not correspond to the detected subject matter domain. The NLU may use the signal of correspondence of the intent to adjust analysis and produce a new intent. While NLU may be used on a range of speech types, in embodiments, NLU may be used to analyze speech that has been processed by an ASR. Following with use of the ASR, the subject matter domain may be detected with the ASR or the NLU or both.

In embodiments, validating speech may be based at least in part on an inferred entity of the speech. Validating speech in this way may include configuring a knowledge graph with at least one of nodes and edges that are tagged with entities inferable from speech, wherein the entities facilitate linking speech elements to subject matter domains. Analyzing speech with a natural language understanding (NLU) module to select at least one entity of the speech among a plurality of candidate intents. Validating speech may further include selecting a knowledge graph based on a subject matter domain detected in the speech and comparing the selected at least one entity with at least one tagged entity in the knowledge graph. Based at least in part on a result of the comparing, a process for validating speech may signal to the NLU module if the selected entity corresponds to the detected subject matter domain or if the selected entity does not correspond to the detected subject matter domain. The NLU may use the signal of correspondence of the entity to adjust analysis and produce a new intent. While NLU may be used on a range of speech types, in embodiments, NLU may be used to analyze speech that has been processed by an ASR. Following with use of the ASR, the subject matter domain may be detected with the ASR or the NLU or both.

In embodiments, a common entity or intent may be derived from different speech content, such as if two people ask for a common action (e.g., turning on a light) in different ways, using different words. By deriving a common entity or intent, the speech may direct access to a common knowledge graph that addresses questions about the derived entity, the derived intent, or a combination of both. Therefore, associating speech with intents so that a range of speech content references a common intent may include recognizing content of the speech that indicates an intent and determining a knowledge graph in a world model 16 of an enterprise that provides access to content related to the indicated intent. By mapping the recognized content to the knowledge graph, subsequent speech recognizing activity may readily link to the knowledge graph without needing to explicitly determine the intent, thereby reducing required computing resources. A result may be that a plurality of recognized content is linked to the knowledge graph over time and that different speech content links to the same knowledge graph.

Validating speech processing in the context of a world model 16 of knowledge of an enterprise may include updating links (e.g., edges, nodes, node metadata, and the like) in a knowledge graph based on a user's reply to a suggested knowledge graph derived from an intent and/or an entity determined from speech. Updating an intent attribute in a knowledge graph through language queries for validating speech processing may include preparing a response to speech received in a dialogue based on an intent determined from the speech and a subject matter domain determined from the speech. The response may be derived from at least one knowledge graph that contains at least one of the intent and information relevant to the subject matter domain. The response may include a combination of information and know-how associated with the subject matter of the processed speech. A user reply to the response, which may be received in a dialogue with the user, may be used to determine at least one of an intent and a subject matter domain of the reply by processing the reply with at least one of an Automatic Speech Recognition (ASR) module and a Natural Language Understanding (NLU) module. The intent determined in the reply can be used to adjust the intent in the identified knowledge graph to comport therewith. Adjusting the intent in the knowledge graph may include reducing a confidence factor of the intent, replacing the intent with the intent determined in the reply, adding the intent determined in the reply to the knowledge graph, and the like.

In embodiments, improving voice processing based on a relationship between intent/entity of the speech with subject matter determined in processed speech may include determining an intent and an entity of a question posed in a dialogue by applying ASR and NLU to the question. Additionally, information from a world model 16 of information associated with the subject matter may be used to improve the voice processing. Therefore, a knowledge graph in the world model 16 may be identified based at least in part on a similarity of a combination of the intent and entity of the speech with intent and entity attributes of a plurality of knowledge graphs that are accessible through an enterprise information-specific embodiment of a world model 16. Further, by comparing a subject matter domain of the question output from at least one of the ASR and the NLU with a subject matter domain of the identified knowledge graph, one may adjust at least one of an algorithm for determining the intent and the entity and an algorithm for determining a subject matter domain of the question so that the combination of intent and entity better aligns with intents and entities found through the knowledge graph that provides access to the subject matter of the speech. In embodiments, a failure to respond by a knowledge graph, such as when a confidence of an intent or entity is high may indicate that at least one of the intent or entity is not properly detected or is missing from or misplaced in the knowledge graph.

In embodiments, a dialogue manager function may establish and maintain a state of a dialog, such as which participant in the dialogue is responsible for the next output, and the like. Additionally, a state of dialogue may include a degree of understanding. In embodiments, if a user has asked a question, then a dialogue manager state may indicate that the dialogue manager owns the next output action of a direct response. However, if the dialogue manager, through interaction with, for example, a world model 16, determines that there is a degree of ambiguity that cannot be resolved, then a state might be changed to a disambiguation state, which may direct the dialogue manager to ask a clarifying question rather than attempt to provide a correct response to a query or statement. A dialogue manager state may be based, at least in part, on an intent-entity pair of a dialog. When either one of these two parts is unclear, a dialogue manager may adjust an intent of the dialogue temporarily from an intent in the received speech to a disambiguation intent and provide that to a natural language generation system for preparing a natural language response that promotes disambiguation. The dialogue manager may then continue the dialogue with questions provided by the natural language generation facility to resolve the lack of clarity so that the original intent-entity pair can be acted on. This may include referring to training sets (e.g., from real world conversations and the like) to generate, via natural language generation, questions that facilitate disambiguation.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "set" includes a set of one or more members. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system comprising:
a world model comprising a knowledge graph, the knowledge graph representing a portion of enterprise knowledge;
an artificial intelligence agent system that uses the world model to facilitate responding to a query with enterprise domain-directed dialog by defining where in an enterprise system relevant data to the query is found;
an enterprise system in communication with the artificial intelligence agent system and for providing enterprise specific information for the enterprise domain-directed dialog associated with the query being processed by the artificial intelligence agent system; and
a client system that facilitates human interaction with the artificial intelligence agent system with a speech input.

2. The system of claim 1, wherein the artificial intelligence agent system is deployed on at least one of the enterprise system, the client system, or a cloud-based system.

3. The system of claim 1, wherein the artificial intelligence agent system is deployed on the client system and interacts with at least one of the enterprise system or the world model via a network.

4. The system of claim 1, wherein the artificial intelligence agent system is deployed with the enterprise system on one or more enterprise servers for direct interaction between the artificial intelligence agent system and resources of the enterprise system and interacts with the client system via a network.

5. The system of claim 1, wherein the client system comprises an item of equipment that performs a non-communication function selected from a list of functions consisting of sensing, security, and home automation.

6. The system of claim 1, wherein the system further comprises a set of application programming interfaces (APIs) that facilitate interfacing the artificial intelligence agent system with the client system.

7. The system of claim 6, wherein the set of APIs includes a query API that facilitates coordination of the world model and enterprise system resources to at least one of prepare or obtain information for responding to the query.

8. The system of claim 6, wherein the set of APIs includes a cloud-based call initiating API that facilitates real-time, event-based notification of users of the enterprise system that is coupled to the artificial intelligence agent system.

9. The system of claim 1, wherein the artificial intelligence agent system comprises a platform portion that operates the world model and an integration engine portion that facilitates interaction between the platform portion and enterprise specific information sources of the enterprise system to respond to queries about the enterprise specific information from the enterprise specific information sources.

10. The system of claim 9, wherein the integration engine is deployed with the enterprise system.

11. The system of claim 9, wherein the integration engine converts the enterprise specific information from the enterprise specific information sources to knowledge and stores the knowledge in the world model.

12. The system of claim 9, wherein the platform portion accesses portions of the world model, thereby activating the integration engine to provide access to a corresponding source of the enterprise specific information.

13. The system of claim 1, wherein elements in the knowledge graph are linked based on logical and semantic relationships.

14. The system of claim 13, wherein the knowledge graph facilitates mapping an intent of the query with the enterprise specific information.

15. The system of claim 13, wherein the knowledge graph facilitates mapping information accessible in the enterprise system with at least one fact accessible in the world model that is relevant to an intent of the query.

16. The system of claim 1, wherein the world model facilitates semantic understanding of uses of words and terms of an enterprise.

17. The system of claim 1, wherein the world model is a semantic model that facilitates the artificial intelligence agent system in responding to the query based on semantic relationships of the enterprise specific information representing a portion of enterprise knowledge.

18. The system of claim 1, wherein the world model comprises information on how to interpret data from the enterprise system.

19. The system of claim 1, wherein the world model is a graph model comprising a plurality of groups, subgroups, and nodes.

20. The system of claim 1, wherein the world model comprises a formal ontology and wherein the artificial intelligence agent system uses the world model ontology to match a concept from the query to terminology that has been assigned to the concept.

21. The system of claim 1, wherein the world model is organized to include at least one quadrant selected from group consisting of internal data, external data, internal knowledge and external knowledge quadrants.

22. The system of claim 1, wherein the knowledge graph comprises a plurality of layers of knowledge that represents a portion of enterprise knowledge of an enterprise such that elements in the knowledge graph are linkable based on semantic relationships, the plurality of layers comprising:
 a global ontology layer of industry-specific knowledge;
 a company ontology layer of company-specific knowledge; and
 a content layer including links to external data.

23. A computer-implemented method comprising:
 receiving a query and facilitating human interaction by enabling dialog with a natural language speech processing technology;
 utilizing a world model to facilitate responding to the query by defining where in an enterprise system relevant data to the query is found, wherein the world model ties various types of data to each other and comprises at least one knowledge graph representing a portion of enterprise knowledge;
 enabling enterprise domain-directed dialog using the natural language speech processing technology;
 providing enterprise specific information for the enterprise domain-directed dialog associated with the query; and
 processing the query.

24. A system to engage in an enterprise domain-directed dialog with a user comprising:
 a world model comprising a knowledge graph, the knowledge graph representing a portion of enterprise knowledge with nodes that reference a set of semantic topics and links that represent relationships between the set of semantic topics, wherein the world model defines a location of relevant data responsive to a query;
 an artificial intelligence agent system that utilizes (a) the world model and (b) a natural language processing system, to process the query, generate a response to the query, and engage in the enterprise domain directed dialog with the user;
 an enterprise system in communication with the artificial intelligence agent system, the enterprise system providing enterprise specific information associated with the query for the enterprise domain-directed dialog; and
 a client system that receives speech input from the user and interfaces with the artificial intelligence agent system, wherein the speech input comprises the query.

\* \* \* \* \*